US007856410B2

(12) United States Patent
Burgess et al.

(10) Patent No.: US 7,856,410 B2
(45) Date of Patent: Dec. 21, 2010

(54) SIMULATION ENABLED RETAIL MANAGEMENT TUTORIAL SYSTEM

(75) Inventors: Olivia Ruth Burgess, London (GB); Benoit Patrick Bertrand, Brossard (CA); Joseph Michael Ciancaglini, Milwaukee, WI (US); Lauren E. Haff, Paoli, PA (US); Eric Jeffrey Lannert, Chicago, IL (US); Murray David Levitt, Plymouth, MN (US); Mark Stewart Nichols, Burr Ridge, IL (US); Alexander Han Leung Poon, Canton, GA (US); John Kenneth Smith, Madison, WI (US); Karen Therese Smith, Chicago, IL (US); Maureen Therese Zabloudil, Chicago, IL (US); Michael Joseph Walsh, Newington, CT (US); Michael James Willow, Naperville, IL (US); Kerry Russell Wills, Middletown, CT (US)

(73) Assignee: Accenture Global Services Limited, Dublin (IE)

( * ) Notice: Subject to any disclaimer, the term of this patent is extended or adjusted under 35 U.S.C. 154(b) by 2358 days.

(21) Appl. No.: 09/887,188

(22) Filed: Jun. 22, 2001
(Under 37 CFR 1.47)

(65) Prior Publication Data

US 2003/0163361 A1 Aug. 28, 2003

Related U.S. Application Data

(63) Continuation of application No. PCT/US99/02719, filed on Feb. 8, 1999, and a continuation of application No. PCT/US99/02727, filed on Feb. 8, 1999, and a continuation of application No. PCT/US99/02738, filed on Feb. 8, 1999, and a continuation of application No. PCT/US99/02740, filed on Feb. 8, 1999, and a continuation of application No. PCT/US99/02745, filed on Feb. 8, 1999.

(51) Int. Cl.
*G06N 5/00* (2006.01)

(52) U.S. Cl. .................................................. 706/45
(58) Field of Classification Search ................ 434/362; 705/10; 706/45, 61; 715/717
See application file for complete search history.

(56) References Cited

U.S. PATENT DOCUMENTS 4,622,013 A 11/1986 Cherchio
(Continued)

FOREIGN PATENT DOCUMENTS

EP 0 689 132 A2 12/1995
(Continued)

OTHER PUBLICATIONS

"Evaluating the effectiveness of feedback in SQL-tutor", IEEE, proc. Int. workshop IWALT, pp. 143-144.
(Continued)

*Primary Examiner*—Wilbert L Starks, Jr.

(57) ABSTRACT

A system is disclosed that provides a goal based learning system utilizing a rule based expert training system to provide a cognitive educational experience. The system provides the user with a simulated environment that presents a business opportunity to understand and solve optimally. Mistakes are noted and remedial educational material presented dynamically to build the necessary skills that a user requires for success in the business endeavor. The system utilizes an artificial intelligence engine driving individualized and dynamic feedback with synchronized video and graphics used to simulate real-world environment and interactions. Multiple "correct" answers are integrated into the learning system to allow individualized learning experiences in which navigation through the system is at a pace controlled by the learner. A robust business model provides support for realistic activities and allows a user to experience real world consequences for their actions and decisions and entails realtime decision-making and synthesis of the educational material. A store management tutorial system is enabled for providing active coaching on aspects of inventory management, stocking, advertising, return on revenue, markdown, assortment strategy and other aspects of retail management. Techniques for process sensitive help are also integrated into the system to provide contextual examples to guide a user in performing a task.

79 Claims, 16 Drawing Sheets

U.S. PATENT DOCUMENTS

| | | | |
|---|---|---|---|
| 4,847,784 | A | 7/1989 | Clancey |
| 4,891,766 | A | 1/1990 | Derr et al. |
| 4,931,950 | A | 6/1990 | Isle et al. |
| 4,964,077 | A | 10/1990 | Eisen et al. |
| 4,977,529 | A | 12/1990 | Gregg et al. |
| 5,002,491 | A | 3/1991 | Abrahamson et al. |
| 5,170,464 | A | 12/1992 | Hayes et al. |
| 5,189,402 | A | 2/1993 | Naimark et al. |
| 5,208,745 | A | 5/1993 | Quentin et al. |
| 5,208,898 | A | 5/1993 | Funabashi et al. |
| 5,239,617 | A | 8/1993 | Gardner et al. |
| 5,259,766 | A | 11/1993 | Sack et al. |
| 5,267,865 | A | 12/1993 | Lee et al. |
| 5,310,349 | A | 5/1994 | Daniels et al. |
| 5,311,422 | A | 5/1994 | Loftin et al. |
| 5,317,688 | A | 5/1994 | Watson et al. |
| 5,326,270 | A | 7/1994 | Ostby et al. |
| 5,359,571 | A | 10/1994 | Chiang et al. |
| 5,372,507 | A | 12/1994 | Goleh |
| 5,395,243 | A | 3/1995 | Lubin et al. |
| 5,441,415 | A | 8/1995 | Lee et al. |
| 5,491,743 | A | 2/1996 | Shilo et al. |
| 5,533,903 | A | 7/1996 | Kennedy |
| 5,535,422 | A | 7/1996 | Chang et al. |
| 5,537,141 | A | 7/1996 | Harper et al. |
| 5,539,869 | A | 7/1996 | Spoto et al. |
| 5,566,291 | A | 10/1996 | Boulton et al. |
| 5,576,844 | A | 11/1996 | Anderson et al. |
| 5,577,186 | A | 11/1996 | Mann, II et al. |
| 5,597,312 | A * | 1/1997 | Bloom et al. ............... 434/362 |
| 5,616,033 | A | 4/1997 | Kerwin |
| 5,630,070 | A * | 5/1997 | Dietrich et al. ................ 705/8 |
| 5,644,686 | A | 7/1997 | Hekmatpour |
| 5,644,727 | A | 7/1997 | Atkins |
| 5,666,493 | A * | 9/1997 | Wojik et al. ................... 705/26 |
| 5,673,369 | A | 9/1997 | Kim |
| 5,690,496 | A | 11/1997 | Kennedy |
| 5,696,885 | A | 12/1997 | Hekmatpour |
| 5,701,400 | A | 12/1997 | Amado |
| 5,720,007 | A | 2/1998 | Hekmatpour |
| 5,727,161 | A | 3/1998 | Purcell, Jr. |
| 5,727,950 | A | 3/1998 | Cook et al. |
| 5,745,652 | A | 4/1998 | Bigus |
| 5,758,329 | A * | 5/1998 | Wojik et al. ................... 705/28 |
| 5,772,446 | A | 6/1998 | Rosen |
| 5,779,486 | A | 7/1998 | Ho et al. |
| 5,788,508 | A | 8/1998 | Lee et al. |
| 5,791,907 | A | 8/1998 | Ramshaw et al. |
| 5,799,151 | A | 8/1998 | Hoffer |
| 5,799,292 | A | 8/1998 | Hekmatpour |
| 5,806,056 | A | 9/1998 | Hekmatpour |
| 5,810,747 | A | 9/1998 | Brudney et al. |
| 5,822,745 | A | 10/1998 | Hekmatpour |
| 5,823,781 | A | 10/1998 | Hitchcock et al. |
| 5,823,788 | A | 10/1998 | Lemelson et al. |
| 5,835,683 | A | 11/1998 | Corella et al. |
| 5,868,575 | A | 2/1999 | Kuczewski |
| 5,870,768 | A | 2/1999 | Hekmatpour |
| 5,875,437 | A | 2/1999 | Atkins |
| 5,889,845 | A | 3/1999 | Staples et al. |
| 5,893,123 | A | 4/1999 | Tuinenga |
| 5,911,581 | A | 6/1999 | Knight et al. |
| 5,956,024 | A * | 9/1999 | Strickland et al. ........... 715/717 |
| 5,974,446 | A | 10/1999 | Sonnenreich et al. |
| 5,987,443 | A | 11/1999 | Nichols et al. |
| 6,003,021 | A * | 12/1999 | Zadik et al. ................... 706/47 |
| 6,015,348 | A | 1/2000 | Lambright et al. |
| 6,016,486 | A | 1/2000 | Nichols |
| 6,018,730 | A | 1/2000 | Nichols et al. |
| 6,018,731 | A | 1/2000 | Bertrand et al. |
| 6,018,732 | A | 1/2000 | Bertrand et al. |
| 6,023,691 | A * | 2/2000 | Bertrand et al. ................ 706/2 |
| 6,023,692 | A * | 2/2000 | Nichols ....................... 706/14 |
| 6,026,386 | A | 2/2000 | Lannert et al. |
| 6,029,156 | A * | 2/2000 | Lannert et al. ................ 706/11 |
| 6,029,158 | A | 2/2000 | Bertrand et al. |
| 6,029,159 | A | 2/2000 | Zorba et al. |
| 6,032,141 | A | 2/2000 | O'Connor et al. |
| 6,064,998 | A | 5/2000 | Zabloudil et al. |
| 6,067,525 | A * | 5/2000 | Johnson et al. ............... 705/10 |
| 6,067,537 | A | 5/2000 | O'Connor et al. |
| 6,067,538 | A | 5/2000 | Zorba et al. |
| 6,073,127 | A | 6/2000 | Lannert et al. |
| 6,085,184 | A | 7/2000 | Bertrand et al. |
| 6,101,489 | A | 8/2000 | Lannert et al. |
| 6,125,358 | A | 9/2000 | Hubbell et al. |
| 6,134,539 | A | 10/2000 | O'Connor et al. |
| 6,301,573 | B1 * | 10/2001 | McIlwaine et al. ............ 706/61 |
| 6,321,205 | B1 * | 11/2001 | Eder .............................. 705/7 |
| 6,474,992 | B2 * | 11/2002 | Marshall ..................... 434/167 |
| 6,493,690 | B2 * | 12/2002 | Bertrand et al. ............... 706/45 |

FOREIGN PATENT DOCUMENTS

| | | |
|---|---|---|
| EP | 0 710 942 A2 | 5/1996 |
| EP | 0 798 655 A2 | 10/1997 |
| WO | WO 97/44766 | 11/1997 |
| WO | WO 98/03953 | 1/1998 |
| WO | WO 98/25251 | 6/1998 |
| WO | WO 98/32109 | 7/1998 |
| WO | WO 00/04478 | 1/2000 |

OTHER PUBLICATIONS

"Automated Exercise Progression in Simulation-Based Training," IEEE Trans. On Systems, Man, and Cybernetics, vol. 24(6), pp. 863-874, Jun. 1994.

"ACM Transactions on Information Systems," 1988 at www.acm.org/pubs/toc/Abstracts/tois/59298.html.

The Virtual Classroom: Great Expectations. Delivering Graduate Education by Computer. A Success Sto0ry, 1996.

"A Special Section—Goal Based Scenarios: A New Approach to Professional Education: Reengineering Education at Andersen Consulting," Educational Technology, Nov.-Dec. 1994.

"Goal-Based Scenarios and the Problem of Situated Learning: A Commentary on Andersen Consulting's Design of Goal-Based Scenarios," Educational Technology, Nov.-Dec. 1994.

"DDD—A Free Graphical Front-End for UNIX Debuggers," Jan. 1996, ACM Sigplan Notices, vol. 31, No. 1, pp. 22-27.

"Automated Training of Legal Reasoning" at http://www.bileta.ac.uk/94papers/muntjew.html.

"The Virtual Learning Environment System," 28th Annual Frontiers in Education Conference, Conference Proceedings, vol. 2, Nov. 4-7, 1998.

"Developing a Design System into an Intelligent Tutoring System," Int'l J. Engr. Eud., vol. 13(5), pp. 341-346, Dec. 1997.

"CAPTOR a model for delivering web based intelligent tutoring system technology", IEEE Proc. DASC vol. 2, pp. 5.C.4.1-5.

"Bridging the Virtual and the Physical: The InterSim as a Collaborative Support Interface," Proc. Of 1997 World Conf. On Artificial Intelligence in Education, pp. 556-558, Dec. 1997.

"Task-Oriented Learning on the Web"; Innovations in Education and Training International, vol. 36, No. 1, Feb. 1999.

"Applications of BrainMaker Neural Network to stocks, business, medical, manufacturing" at www.calsci.com/Applications.html.

"KBLPS Overview" at www.cgi.com/CGIWEB/KBLPS/overindex4.html.
"Smartlaw: adapting classic expert system techniques for the legal research domain", ACM pp. 133-141.
"Interactive Multimedia Instructs the Individual," Oct. 1994, Occupational Health & Safety vol. 63, No. 10, pp. 144-145.
"Practical methods for automatically generating typed links", ACM Hypertext, pp. 31-41.
"Popular Theory Supporting the Use of Computer Simulation for Experiential Learning," http://www.centurionsys.com/rtcl57.html, Aug. 1997.
"Technical Report: Computer Aided Education and Training Initiative" at http://advlearn.lrdc.pitt.edu/advlearn/papers/FINALREP.html.
"FRA: Teaching Financial Accounting with a Goal-Based Scenario," Intelligent Systems in Accounting, Finance and Management, vol. 4, 1995.
"Teaching Real-World Analysis Skills for Goal-Based Scenario," pp. 68-74.
"Artificial Intelligence and Mathematics Education" at http://www.rand.org/hot/mcarthur/Papers/aied.html.
"The Roles of Artificial Intelligence in Education: Current Progress and Future Prospects" at http://www.nib.unicamp.br/recursos...education/intelligent-tutoring.html.
"WITS: A Reusable Architecture for a VR-Based ITS" at http://advlearn.lrdc.pitt.edu/its-arch/papers/tam.html.
"Brainmaker" at www.npiec.on.ca/~echoscan/28-04.htm.
"News for ESAP" at www.hops.wharton.upenn.edu/~esap/news.html.
"Learning with Computers," May 1994, Accountancy vol. 113, No. 1209, pp. 60-64.
"User-Sensitive Multimedia Presentation System," Mar. 1, 1996, vol. 39, No. 3, pp. 93-94.
"Microworlds and Simuworlds: Practice Fields for the Learning Organization," Spring 1996, Organizational Dynamics vol. 24, No. 4, pp. 36-49.
"What are Intelligent Coaching Systems and Why are they (in)evitable?" IEEE Colloquium on Artificial Intelligence in Educational Software, pp. 2/1-2/5, Jun. 1998.
"Development of an Integrated Simulator and Real Time Plant Information System," Advances in Operational Safety of Nuclear Power Plants, Proceedings of an International Symposium 1996.
"A Goal-Centered Architecture for Intelligent Tutoring Systems," Proc. Of 7th World Conf. On Artificial Intelligence in Education, pp. 307-314, Aug. 1995.
"Smart Avatars in JackMOO," Proceedings of the 1999 IEEE Conference on Virtual Reality, pp. 156-163.
"Embedding an Intelligent Tutoring System in a Business Gaming-Simulation Environment," Proc. Of the 1994 Winter Simulation Conference, pp. 1399-1406, Dec. 1994.
"Evaluating Intelligent Tutoring with Gaming Simulations," Proc. Of the 1995 Winter Simulation Conf., pp. 1376-1383, Dec. 1995.
"Persistent Issues in the Application of Virtual Environment Systems to Training," Aug. 1996, Proceedings. Third Annual Symposium on Human Interaction with Complex Systems, IEEE, pp. 124-132.
"The Lisp Tutor," Byte, pp. 159-175, Apr. 1985.
"Pedagogical, natural language and knowledge engineering techniques in SOPHIE I, II, and III," in Intelligent Tutoring Systems, D. Sleeman & J.S. Brown eds., pp. 227-282, Dec. 1982.
Interactive Multimedia Distance Learning (IMDL): The Prototype of the Virtual Classroom, 1994.

"Understanding Organizational Dynamics of IT-Enabled Change: A Multipedia Simulation Approach," Winter 1997/1998, Journal of Mangement Information Systems: JMIS, vol. 14, No. 3, pp. 109-140.
"Intelligent Computer-Aided Instruction: A Survey Organized Around System Components," Jan. 1989, IEEE Inc., New York, vol. 49, No. 1, pp. 40-57.
"Conducting and Supporting a Goal-Based Scenario Learning Environment," Educational Technology, Nov.-Dec. 1994.
"Interface design issue for advicing giving expert systems", Comm. Of theACM, vol. 30, No. 1, pp. 14-31.
"An Object-Oriented Architecture for Evolutional Development of Interactive Learning Environment with Coached Problem-Solving," Proc. Of 1997 World Conf. On Artificial Intelligence in Education, pp. 592-594, Dec. 1997.
"Architecture of an Intelligent Tutoring System on the WWW," Proc. Of 1997 World Conf. On Artificial Intelligence in Education, pp. 39-46 Dec. 1997.
"Socialized Collaborative Learning in Multimedia Virtual Worlds" URL: http://www.iscs.nus.edu.sg/labs/learning/lels/VRML.html; viewed Feb. 16, 1999.
Flexible Learning, Feb. 1998, Credit Union Management vol. 21, No. 2, pp. 32-33+.
"Teaching Through Case-Based Reasoning: An ITS Engine Applied to Business Communication," Proc. Of 1997 World Conf. On Artificial Intelligence in Education, pp. 111-118 Dec. 1997.
"Train with Less Pain," Oct. 13, 1997, Informationweek No. 652, pp. 150-154.
"Virtual Learning: A Revolutionary Approach to Building a Highly Skilled Workforce," Autumn 1998, Personnel Psychology vol. 51, No. 3, pp. 767-771.
"Intelligent Tutoring Systems: An Overview" at http://www.intellectbooks.com/authors/lawler/its.htm.
"No More Boring CPE," Jul. 1997, Accounting Technology, pp. 27-35.
Computer Dictionary, 1997, pp. 264, 276, 383, 446, 462, 507.
"Rule-Based Programming with OPS5" at www.mkp.com/books_catalog/O-934613-51-6.asp.
"From Computer-Assisted Instruction to Intelligent Tutoring Systems," J. Artificial Intelligence in Education, V. 2(3), pp. 39-50, Dec. 1997.
"MUSE U.S. Patents" at www.muser.com/html/patents.html.
"Distributed Intelligent Tutoring on the Web," Proc. Of 1997 World Conf. On Artificial Intelligence in Education, pp. 482-489, Dec. 1997.
"RadTutor: The Theoretical and Empirical Basis for the Design of a Mammography Interpretation Tutor," Proc. Of 1997 World Conf. On Artificial Intelligence in Education, pp. 386-393 Dec. 1997.
"Using the Wizard of Oz Technique to Prototype a Scenario-Based Simulation Tutor," Proc. Of 1997 World Conf. On Artificial Intelligence in Education, pp. 458-465, Dec. 1997.
"Using Planning Techniques to Provide Feedback in Interactive Learning Environments," Proc. Sixth Int'l Conf. On Tools with Artificial Intelligence, pp. 700-703, Nov. 1994.
"An Electronic Infrastructure for a Virtual University," Communications of the ACM, vol. 40, No. 9, Sep. 1997.
"Simulation Technology and Parallelism in Learning Environments" at http://www.to.utwente.nl/prj/min/Book/chapter1.htm.
"Engines for Education" URL: http://www.ils.nwu.edu/~e_for_e/nodes/I-M-INTRO-ZOOMER-pg.html; viewed Feb. 15, 1999.
"FinPlan System" at www.rriai.org.ru/FinPlan/.

"Enhancing Simulation Education with Intelligent Tutoring Systems," Proc. Of the 1996 Winter Simulation Conf., pp. 675-680, Dec. 1996.

"Computer Aided Instruction for Statistics: A Knowledge-Based Systems Approach," Int'l J. Of Computers in Adult Education and Training, vol. 5(1), pp. 3-14.

"Teaching with the internet" 1998, JAI Press Inc., USA. vol. No. 3, pp. 217-222.

"Development of a Simulation-Based Intelligent Tutoring System for Assisting PID Control Learning," Jan. 1994, IEICE Transactions on Information and Systems, E77-D, No. 1, Tokyo Japan, pp. 108-117.

"Authoring Intelligent Tutoring Systems: An Analysis of the State of the Art" at http://www.cs.umass/edu/~tmurray/papers/ATSummary/AuthTools.html.

Multimedia Training "Get Lemonade, Not a Lemon!" Jun. 1997, Journal for Quality and Participation vol. 20, No. 3, pp. 22-26.

"SMART Evaluation: Cognitive Diagnosis, Mastery Learning & Remediation," Proc. Of 7th World Conf. On Artificial Intelligence in Education, pp. 123-130, Aug. 1995.

"Decision Pro3.0" at www.vanguardsw.com/.

"A Fuzzy Logic-Based Intelligent Tutoring System," Information Processing 92, vol. II, pp. 66-72, Dec. 1992.

"The SimQuest Authoring System for Simulation-Based Discovery Learning," Proc. Of 1997 World Conf. On Artificial Intelligence in Education, pp. 79-86, Dec. 1997.

"A Browser-Based System to Support & Deliver DE," 28th Annual Frontiers in Education Conference, Conference Proceedings, vol. 1, Nov. 4-7, 1998.

"Goal-Based Scenarios and Business Training: A Conversation with Roger C. Schank," Educational Technology, Nov.-Dec. 1994.

"Automate Your Business Plan" at www.business-plan.com/screen2.html.

"Kiplinger TaxCut Press Releases" at http://www.taxcut.com/taxcut/98press_releases/pr98_nowshipping.html.

"TurboTax Deluxe Product Information" at http://www.intuit.com/turbotax/prodinfo/ttdlx.html.

"Why Should the Teens Have All the Best Games? Management Skill with Oil, Health, Housing Games," Computergram Int'l, Jun. 176, 1996.

Template Software Business Simulator, Chapter 8, Aug. 1997.

Template Software Workflow Simulator, Chapter 8, Jun. 1998.

"Goal-Based Scenarios", Technical Report # 36, Northwestern University, The Institute for the Learning Sciences, Dec. 1992, pp. 1-30.

"Eight Goal-Based Scenario Tools", Technical Report # 67, Northwestern University, The Institute for the Learning Sciences, Jan. 1996, pp. 1-37.

"A Role for AI in Education: Using Technology to Reshape Education", Northwestern University, The Institute for the Learning Sciences, Journal of Artificial Intelleigence in Education, Winter 1990, Jan. 1990, pp. 1-24 and 2 pgs. of references.

"The Design of Goal-Based Scenarios", Technical Report # 39, Northwestern University, The Institute for the Learning Sciences, Mar. 1993, pp. 1-58.

* cited by examiner

1 Get Correct ID

8480 Insurance Expense = ID#1202

Credit field = ID#3022

2 Make mapping

ID#1202 mapped to target ID#3022

FIGURE 21

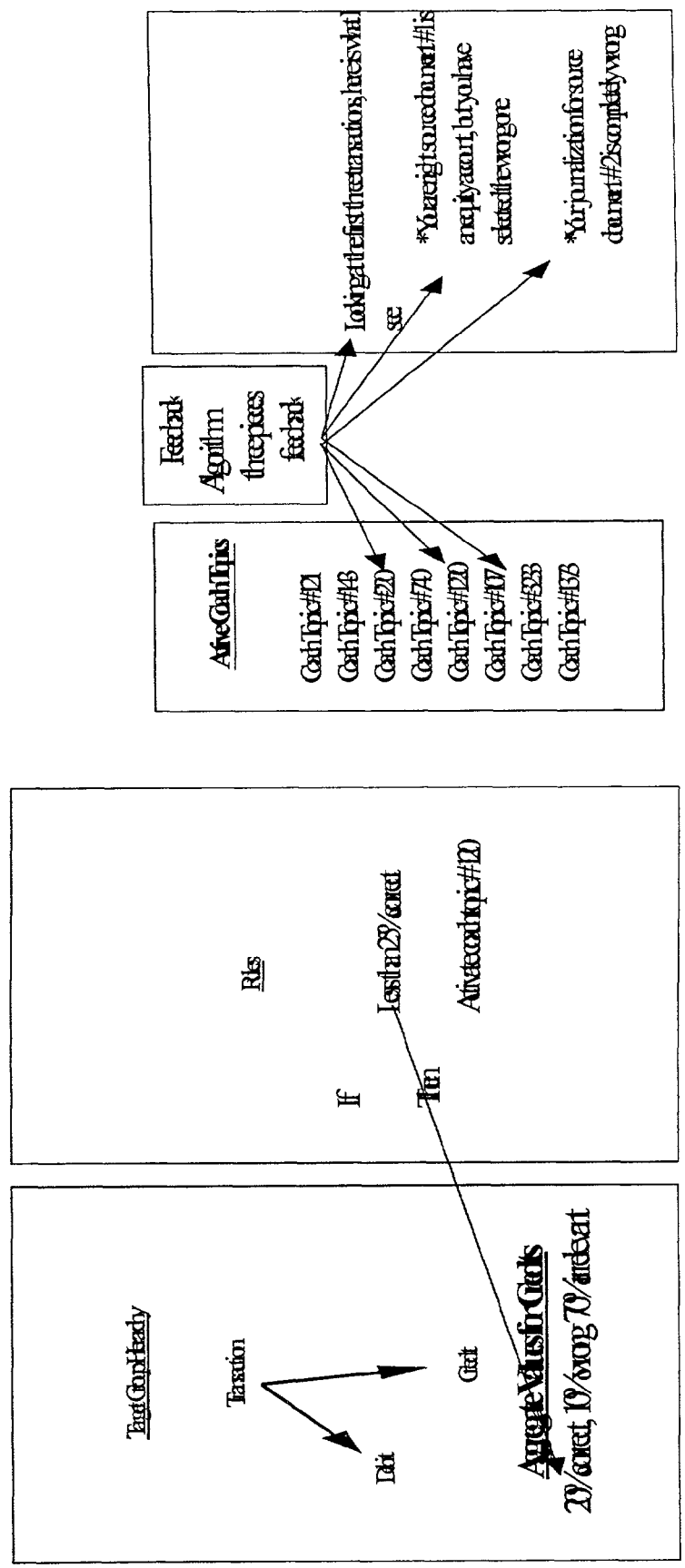

SIMULATION ENABLED RETAIL MANAGEMENT TUTORIAL SYSTEM

PRIORITY CLAIM

This is a continuation of the following International Applications filed on Feb. 8, 1999:
1. PCT/US99/02719, which claims priority to U.S. application Ser. No. 09/221,138, filed Dec. 22, 1998,
2. PCT/US99/02727, which claims priority to U.S. application Ser. No. 09/219,070, filed Dec. 22, 1998,
3. PCT/US99/02738, which claims priority to U.S. application Ser. No. 09/219,524, filed Dec. 22, 1998,
4. PCT/US99/02740, which claims priority to U.S. application Ser. No. 09/219,201, filed Dec. 22, 1998, and
5. PCT0US99/02745, which claims priority to U.S. application Ser. No. 09/218,977, filed Dec. 22, 1998.

FIELD OF THE INVENTION

The present invention relates to education systems and more particularly to a rule based tutorial system that utilizes business simulations of a retail environment to teach new store management skills.

BACKGROUND OF THE INVENTION

When building a knowledge based system or expert system, at least two disciplines are necessary to properly construct the rules that drive the knowledge base, the discipline of the knowledge engineer and the knowledge of the expert. The domain expert has knowledge of the domain or field of use of the expert system. For example, the domain expert of an expert for instructing students in an automotive manufacturing facility might be a process control engineer while the domain expert for a medical instruction system might be a doctor or a nurse. The knowledge engineer is a person that understands the expert system and utilizes the expert's knowledge to create an application for the system. In many instances, the knowledge engineer and domain expert are separate people who have to collaborate to construct the expert system.

Typically, this collaboration takes the form of the knowledge engineer asking questions of the domain expert and incorporating the answers to these questions into the design of the system. This approach is labor intensive, slow and error prone. The coordination of the two separate disciplines may lead to problems. Although the knowledge engineer can transcribe input from the expert utilizing videotape, audio tape, text and other sources, efforts from people of both disciplines have to be expended. Further, if the knowledge engineer does not ask the right questions or asks the questions in an incorrect way, the information utilized to design the knowledge base could be incorrect. Feedback to the knowledge engineer from the expert system is often not available in prior art system until the construction is completed. With conventional system, there is a time consuming feedback loop that ties together various processes from knowledge acquisition to validation.

Educational systems utilizing an expert system component often suffer from a lack of motivational aspects that result in a user becoming bored or ceasing to complete a training program. Current training programs utilize static, hard-coded feedback with some linear video and graphics used to add visual appeal and illustrate concepts. These systems typically support one "correct" answer and navigation through the system is only supported through a single defined path which results in a two-dimensional generic interaction, with no business model support and a single feedback to the learner of correct or incorrect based on the selected response. Current tutorial systems do not architect real business simulations into the rules to provide a creative learning environment to a user.

SUMMARY OF THE INVENTION

According to a broad aspect of a preferred embodiment of the invention, a goal based learning system utilizes a rule based expert training system to provide a cognitive educational experience. The system provides the user with a simulated environment that presents a business opportunity to understand and solve optimally. Mistakes are noted and remedial educational material presented dynamically to build the necessary skills that a user requires for success in the business endeavor. The system utilizes an artificial intelligence engine driving individualized and dynamic feedback with synchronized video and graphics used to simulate real-world environment and interactions. Multiple "corrects" answers are integrated into the learning system to allow individualized learning experiences in which navigation through the system is at a pace controlled by the learner. A robust business model provides support for realistic activities and allows a user to experience real world consequences for their actions and decisions and entails realtime decision-making and synthesis of the educational material. A dynamic feedback system is utilized that narrowly tailors feedback and focuses it based on the performance and characteristics of the student to assist the student in reaching a predefined goal. A store management tutorial system is enabled for providing active coaching on aspects of inventory management, stocking, advertising, return on revenue, markdown, assortment strategy and other aspects of retail management. Techniques for process sensitive help are also integrated into the system to provide contextual examples to guide a user in performing a task.

DESCRIPTION OF THE DRAWINGS

The foregoing and other objects, aspects and advantages are better understood from the following detailed description of a preferred embodiment of the invention with reference to the drawings, in which:

FIG. 10 illustrates a journal entry simulation in accordance with a preferred embodiment;

FIG. 11 illustrates a simulated Bell Phone Bill journal entry in accordance with a preferred embodiment;

FIG. 20 illustrates the objects for the journalization task in accordance with a preferred embodiment;

FIG. 21 illustrates the mapping of a source item to a target item in accordance with a preferred embodiment;

FIG. 22 illustrates an analysis of rules in accordance with a preferred embodiment;

FIG. 23 illustrates a feedback selection in accordance with a preferred embodiment;

DETAILED DESCRIPTION

Figure 1:
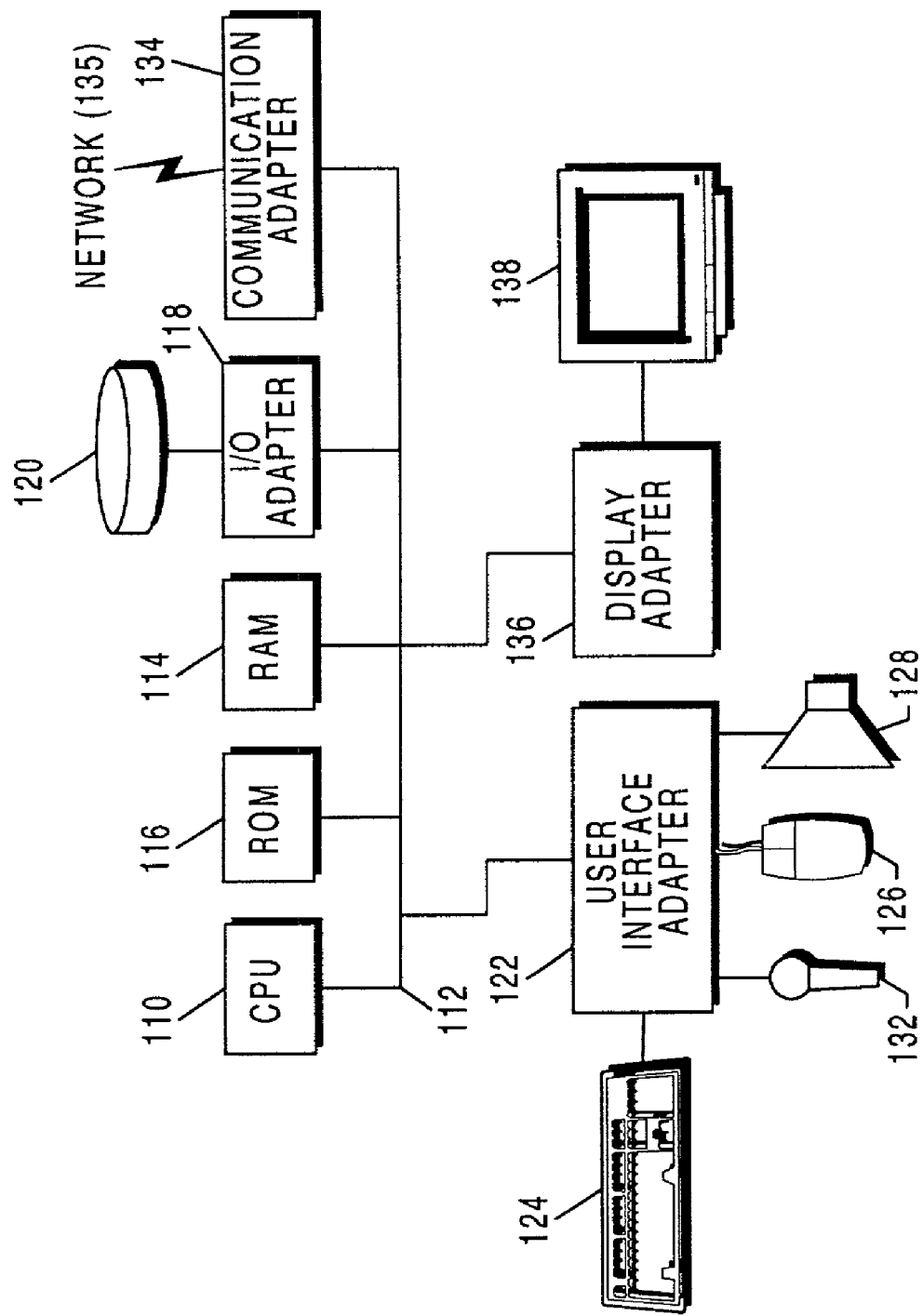
FIG. 1 is a block diagram of a representative hardware environment in accordance with a preferred embodiment.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided. A simulation engine in accordance with a preferred embodiment is based on a Microsoft Visual Basic component developed to help design and test feedback in relation to a Microsoft Excel spreadsheet. These spreadsheet models are what simulate actual business functions and become a task that will be performed by a student The Simulation Engine accepts simulation inputs and calculates various outputs and notifies the system of the status of the simulation at a given time in order to obtain appropriate feedback.

Relationship of Components

The simulation model executes the business function that the student is learning and is therefore the center point of the application. An activity 'layer' allows the user to visually guide the simulation by passing inputs into the simulation engine and receiving an output from the simulation model. For example, if the student was working on an income statement activity, the net sales and cost of goods sold calculations are passed as inputs to the simulation model and the net income value is calculated and retrieved as an output. As calculations are passed to and retrieved from the simulation model, they are also passed to the Intelligent Coaching Agent (ICA). The ICA analyzes the Inputs and Outputs to the simulation model and generates feedback based on a set of rules. This feedback is received and displayed through the Visual Basic Architecture.

Figure 2:
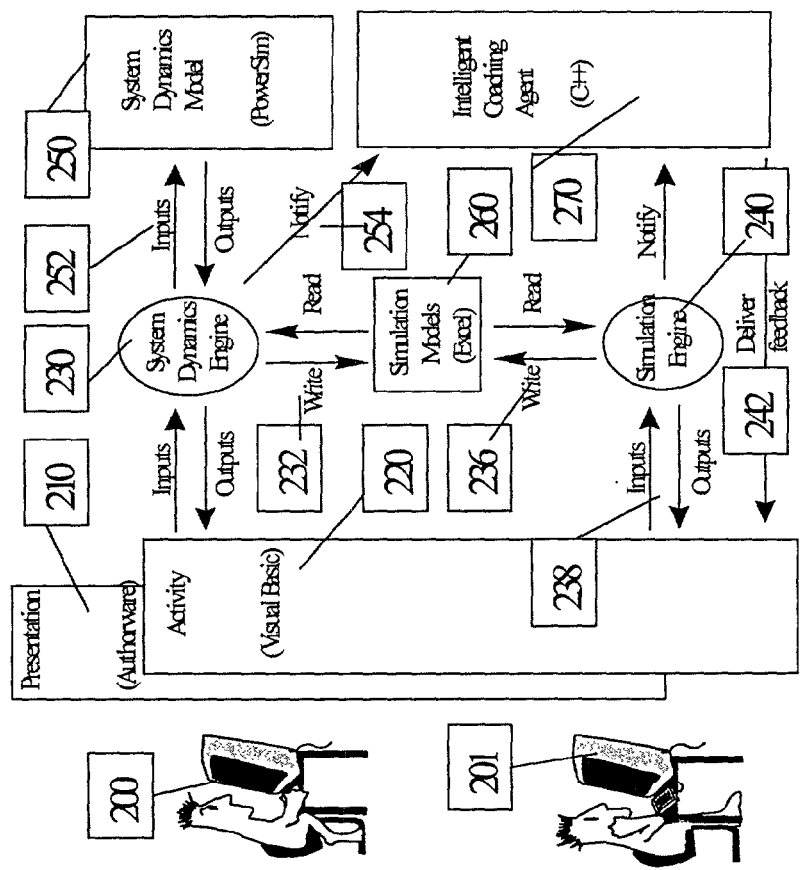
FIG. 2 is a block diagram of a system architecture in accordance with a preferred embodiment.

FIG. 2 is a block diagram of a system architecture in accordance with a preferred embodiment. The Presentation 'layer' 210 is separate from the activity 'layer' 220 and communication is facilitated through a set of messages 230 that control the display specific content topics. A preferred embodiment enables knowledge workers 200 & 201 to acquire complex skills rapidly, reliably and consistently across an organization to deliver rapid acquisition of complex skills. This result is achieved by placing individuals in a simulated business environment that "looks and feels" like real work, and challenging them to make decisions which support a business strategic objectives utilizing highly effective learning theory (e.g., goal based learning, learn by doing, failure based learning, etc.), and the latest in multimedia user interfaces, coupled with three powerful, integrated software components. The first of these components is a software Solution Construction Aid (SCA) 230 consisting of a mathematical modeling tool 234 which simulates business outcomes of an individual's collective actions over a period of time. The second component is a knowledge system 250 consisting of an HTML content layer which organizes and presents packaged knowledge much like an online text book with practice exercises, video war stories, and a glossary. The third component is a software tutor 270 comprising an artificial intelligence engine 240 which generates individualized coaching messages based on decisions made by learner.

Feedback is unique for each individual completing the course and supports client cultural messages 242 "designed into" the course. A business simulation methodology that includes support for content acquisition, story line design, interaction design, feedback and coaching delivery, and content delivery is architected into the system in accordance with a preferred embodiment. A large number of "pre-designed" learning interactions such as drag and drop association of information 238, situation assessment/action planning, interviewing (one-on-one, one-to-many), presenting (to a group of experts/executives), metering of performance (handle now, handle later), "time jumping" for impact of decisions, competitive landscape shift (while "time jumping", competitors merge, customers are acquired, etc.) and video interviewing with automated note taking are also included in accordance with a preferred embodiment.

Business simulation in accordance with a preferred embodiment delivers training curricula in an optimal manner. This is because such applications provide effective training that mirrors a student's actual work environment. The application of skills "on the job" facilitates increased retention and higher overall job performance. While the results of such training applications are impressive, business simulations are very complex to design and build correctly. These simulations are characterized by a very open-ended environment, where students can go through the application along any number of paths, depending on their learning style and prior experiences/knowledge.

A category of learning approaches called Learn by Doing, is commonly used as a solution to support the first phase (Learn) of the Workforce Performance Cycle. However, it can also be a solution to support the second phase (Perform) of the cycle to enable point of need learning during job performance. By adopting the approach presented, some of the benefits of a technology based approach for building business simulation solutions which create more repeatable, predictable projects resulting in more perceived and actual user value at a lower cost and in less time are highlighted.

Most corporate training programs today are misdirected because they have failed to focus properly on the purpose of their training. These programs have confused the memorization of facts with the ability to perform tasks; the knowing of "that" with the knowing of "how". By adopting the methods of traditional schools, businesses are teaching a wide breadth of disconnected, decontextualized facts and figures, when they should be focused on improved performance. How do you teach performance, when lectures, books, and tests inherently are designed around facts and figures? Throw away the lectures, books, and tests. The best way to prepare for high performance is to perform; experience is the best teacher! Most business leaders agree that workers become more effective the more time they spend in their jobs. The best approach for training novice employees, therefore, would be letting them learn on the job, acquiring skills in their actual work environment. The idea of learning-by-doing is not revolutionary, yet it is resisted in business and academia. Why is this so, if higher competence is universally desired?

Learners are reluctant to adopt learning-by-doing because they are frightened of failure. People work hard to avoid making mistakes in front of others. Business leaders are hesitant to implement learning-by-doing because novice failure may have dramatic safety, legal and financial implications. Imagine a novice pilot learning-by-doing as he accelerates a large jet plane down a runway; likewise, consider a new financial analyst learning-by-doing as he structures a multi-million dollar financial loan. Few employers are willing to endure such failures to have a more competent workforce.

Figure 3:
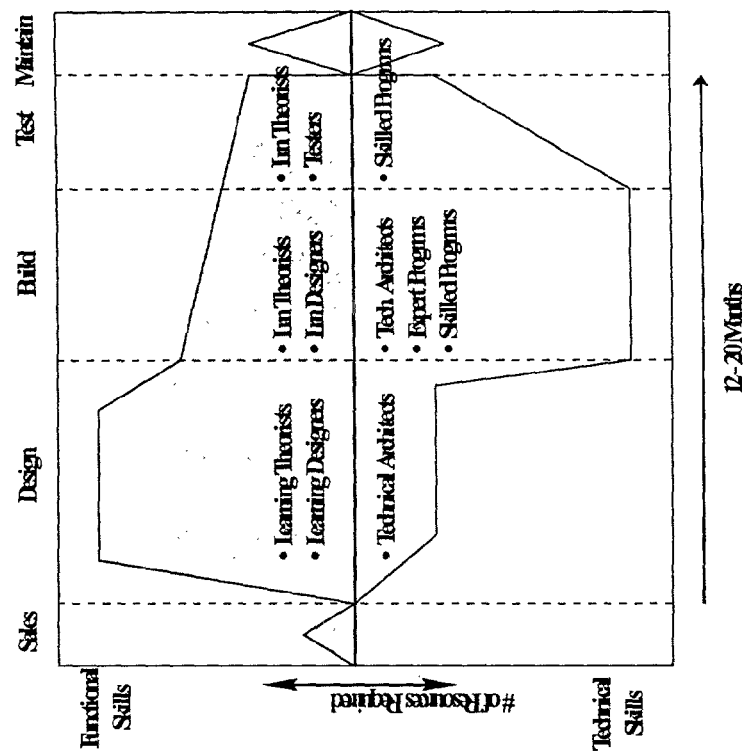
FIG. 3 depicts the timeline and relative resource requirements for each phase of development for a typical application development in accordance with a preferred embodiment.

The key to such a support system is that it is seamlessly integrated into the business system that the knowledge worker uses to execute their job tasks. Workers don't need to go "off-line" or seek out cryptic information buried within paper manuals and binders for guidance or to find the answer to queries. All the support components are made available through the same applications the worker's use, at the point in which they need them, tailored to the individual to show "how", not just "what". Learning would be occurring all the time, with little distinction between performing and improving performance. Establishing that training should focus on performance (how), rather than facts (what), and extending the model of learning to include assistance while performing, rather than only before performance, still leaves us dangerously exposed in preparing to compete in the new, chaotic economy. As was mentioned in the opening of this paper, the pace of change in business today is whiplash fast. Not only are new methods of doing business evolving every 18-24 months, new competitors emerge, dominate, and fade in time periods businesses used to take to perform demographic studies. Now more than ever, those who do not reinvent themselves on a regular basis will be fossilized by the pace of change. A typical BusSim engagement takes between one and two years to complete and requires a variety of both functional and technical skills. FIG. 3 depicts the timeline and relative resource requirements for each phase of development for a typical application development in accordance with a preferred embodiment. The chart clearly depicts the relationship between the large number of technical resources required for both the build and test phases of development. This is because the traditional development process used to build BusSim solutions reflects more of a "one off" philosophy, where development is done from scratch in a monolithic fashion, with little or no reuse from one application to the next. This lack of reuse makes this approach prohibitively expensive, as well as lengthy, for future BusSim projects.

The solution to this problem is to put tools in the hands of instructional designers that allows them to create their BusSim designs and implement them without the need for programmers to write code. And to put application architectures that integrate with the tools in the hands of developers, providing them with the ability to quickly deliver solutions for a number of different platforms. The reuse, then, comes in using the tools and architectures from one engagement to another. Both functional and technical resources carry with them the knowledge of how to use the technology, which also has an associated benefit of establishing a best-practice development methodology for BusSim engagements.

Development Cycle Activities

In the Design Phase, instructional designers become oriented to the content area and begin to conceptualize an instructional approach. They familiarize themselves with the subject matter through reading materials and interviews with Subject Matter Experts (SMEs). They also identify learning objectives from key client contacts. Conceptual designs for student interactions and interface layouts also begin to emerge. After the conceptual designs have taken shape, Low-Fi user testing (a.k.a. Conference Room Piloting) is performed. Students interact with interface mock-ups while facilitators observe and record any issues. Finally, detailed designs are created that incorporate findings. These detailed designs are handed off to the development team for implementation. The design phase has traditionally been fraught with several problems. Unlike a traditional business system, BusSim solutions are not rooted in tangible business processes, so requirements are difficult to identify in a concrete way. This leaves instructional designers with a 'blue sky' design problem. With few business-driven constraints on the solution, shallow expertise in the content area, and limited technical skills, instructional designers have little help in beginning a design. Typically, only experienced designers have been able to conjure interface, analysis, and feedback designs that meet the learning objectives yet remain technically feasible to implement. To compound the problem, BusSim solutions are very open ended in nature. The designer must anticipate a huge combination of student behavior to design feedback that is helpful and realistic.

During the build phase, the application development team uses the detailed designs to code the application. Coding tasks include the interfaces and widgets that the student interacts with. The interfaces can be made up of buttons, grids, check boxes, or any other screen controls that allow the student to view and manipulate his deliverables. The developer must also code logic that analyzes the student's work and provides feedback interactions. These interactions may take the form of text and/or multimedia feedback from simulated team members, conversations with simulated team members, or direct manipulations of the student's work by simulated team members. In parallel with these coding efforts, graphics, videos, and audio are being created for use in the application. Managing the development of these assets have their own complications. Risks in the build phase include misinterpretation of the designs. If the developer does not accurately understand the designer's intentions, the application will not function as desired. Also, coding these applications requires very skilled developers because the logic that analyzes the student's work and composes feedback is very complex.

The Test Phase, as the name implies, is for testing the application. Testing is performed to verify the application in three ways: first that the application functions properly (functional testing), second that the students understand the interface and can navigate effectively (usability testing), and third that the learning objectives are met (cognition testing). Functional testing of the application can be carded out by the development team or by a dedicated test team. If the application fails to function properly, it is debugged, fixed, recompiled and retested until its operation is satisfactory. Usability and cognition testing can only be carried out by test students who are unfamiliar with the application. If usability is unsatisfactory, parts of the interface and or feedback logic may need to be redesigned, recoded, and retested. If the learning objectives are not met, large parts of the application may need to be removed and completely redeveloped from a different perspective. The test phase is typically where most of the difficulties in the BusSim development cycle are encountered. The process of discovering and fixing functional, usability, and cognition problems is a difficult process and not an exact science.

For functional testing, testers operate the application, either by following a test script or by acting spontaneously and documenting their actions as they go. When a problem or unexpected result is encountered, it too is documented. The application developer responsible for that part of the application then receives the documentation and attempts to duplicate the problem by repeating the tester's actions. When the problem is duplicated, the developer investigates further to find the cause and implement a fix. The developer once again repeats the testers actions to verify that the fix solved the problem. Finally, all other test scripts must be rerun to verify that the fix did not have unintended consequences elsewhere in the application. The Execution Phase refers to the steady state operation of the completed application in its production environment. For some clients, this involves phone support for students. Clients may also want the ability to track students' progress and control their progression through the course. Lastly, clients may want the ability to track issues so they may be considered for inclusion in course maintenance releases.

One of the key values of on-line courses is that they can be taken at a time, location, and pace that is convenient for the individual student. However, because students are not centrally located, support is not always readily available. For this reason it is often desirable to have phone support for students. Clients may also desire to track students' progress, or control their advancement through the course. Under this strategy, after a student completes a section of the course, he will transfer his progress data to a processing center either electronically or by physically mailing a disk. There it can be analyzed to verify that he completed all required work satisfactorily. One difficulty commonly associated with student tracking is isolating the student data for analysis. It can be unwieldy to transmit all the course data, so it is often imperative to isolate the minimum data required to perform the necessary analysis of the student's progress.

A Delivery Framework for Business Simulation

As discussed earlier, the traditional development process used to build BusSim solutions reflects more of a "one off" philosophy, where development is done from scratch in a monolithic fashion, with little or no reuse from one application to the next. A better approach would be to focus on reducing the total effort required for development through reuse, which, in turn would decrease cost and development time. The first step in considering reuse as an option is the identification of common aspects of the different BusSim applications that can be generalized to be useful in future applications. In examination of the elements that make up these applications, three common aspects emerge as integral parts of each: Interface, Analysis and Interpretation. Every BusSim application must have a mechanism for interaction with the student. The degree of complexity of each interface may vary, from the high interactivity of a high-fidelity real-time simulation task, to the less complex information delivery requirements of a business case background information task. Regardless of how sophisticated the User Interface (UI), it is a vital piece of making the underlying simulation and feedback logic useful to the end user.

Every BusSim application does analysis on the data that defines the current state of the simulation many times throughout the execution of the application. This analysis is done either to determine what is happening in the simulation, or to perform additional calculations on the data which are then fed back into the simulation. For example, the analysis may be the recognition of any actions the student has taken on artifacts within the simulated environment (notebooks, number values, interviews conducted, etc.), or it may be the calculation of an ROI based on numbers the student has supplied. Substantive, useful feedback is a critical piece of any BusSim application. It is the main mechanism to communicate if actions taken by the student are helping or hurting them meet their performance objectives. The interpretation piece of the set of proposed commonalties takes the results of any analysis performed and makes sense of it. It takes the non-biased view of the world that the Analysis portion delivers (i.e., "Demand is up 3%") and places some evaluative context around it (i.e., "Demand is below the expected 7%; you're in trouble!", or "Demand has exceeded projections of 1.5%; Great job!").

There are several approaches to capturing commonalties for reuse. Two of the more common approaches are framework-based and component-based. To help illustrate the differences between the two approaches, we will draw an analogy between building an application and building a house. One can construct a house from scratch, using the raw materials, 2×4s, nails, paint, concrete, etc. One can also construct an application from scratch, using the raw materials of new designs and new code. The effort involved in both undertakings can be reduced through framework-based and/or component-based reuse. Within the paradigm of framework-based reuse, a generic framework or architecture is constructed that contains commonalties. In the house analogy, one could purchase a prefabricated house framework consisting of floors, outside walls, bearing walls and a roof. The house can be customized by adding partition walls, wallpaper, woodwork, carpeting etc. Similarly, prefabricated application frameworks are available that contain baseline application structure and functionality. Individual applications are completed by adding specific functionality and customizing the look-and-feel. An example of a commonly used application framework is Microsoft Foundation Classes. It is a framework for developing Windows applications using C++. MFC supplies the base functionality of a windowing application and the developer completes the application by adding functionality within the framework. Framework-based reuse is best suited for capturing template-like features, for example user interface management, procedural object behaviors, and any other features that may require specialization. Some benefits of using a framework include:

Extensive functionality can be incorporated into a framework. In the house analogy, if I know I am going to build a whole neighborhood of three bedroom ranches, I can build the plumbing, wiring, and partition walls right into the framework, reducing the incremental effort required for each house. If I know I am going to build a large number of very similar applications, they will have more commonalties that can be included in the framework rather than built individually.

Applications can override the framework-supplied functionality wherever appropriate. If a house framework came with pre-painted walls, the builder could just paint over them with preferred colors. Similarly, the object oriented principle of inheritance allows an application developer to override the behavior of the framework. In the paradigm of component-based reuse, key functionality is encapsulated in a component. The component can then be reused in multiple applications. In the house analogy, components correspond to appliances such as dishwashers, refrigerators, microwaves, etc. Similarly, many application components with pre-packaged functionality are available from a variety of vendors. An example of a popular component is a Data Grid. It is a component that can be integrated into an application to deliver the capability of viewing columnar data in a spreadsheet-like grid. Component-based reuse is best suited for capturing black-box-like features, for example text processing, data manipulation, or any other features that do not require specialization.

Several applications on the same computer can share a single component. This is not such a good fit with the analogy, but imagine if all the houses in a neighborhood could share the same dishwasher simultaneously. Each home would have to supply its own dishes, detergent, and water, but they could all wash dishes in parallel. In the application component world, this type of sharing is easily accomplished and results in reduced disk and memory requirements.

Components tend to be less platform and tool dependent. A microwave can be used in virtually any house, whether it's framework is steel or wood, and regardless of whether it was customized for building mansions or shacks. You can put a high-end microwave in a low-end house and vice-versa. You can even have multiple different microwaves in your house. Component technologies such as CORBA, COM, and Java Beans make this kind of flexibility commonplace in application development. Often, the best answer to achieving reuse is through a combination of framework-based and component-based techniques. A framework-based approach for building BusSim applications is appropriate for developing the user interface, handling user and system events, starting and stopping the applications, and other application-specific and delivery platform-specific functions. A component-based approach is appropriate for black-box functionality. That is, functionality that can be used as—is with no specialization required. In creating architectures to support BusSim application development, it is imperative that any assets remain as flexible and extensible as possible or reusability may be diminished. Therefore, we chose to implement the unique aspects of BusSim applications using a component approach rather than a framework approach. This decision is further supported by the following observations.

Delivery Framework for Business Simulation

Components are combined with an Application Framework and an Application Architecture to achieve maximum reuse and minimum custom development effort. The Application Architecture is added to provide communication support between the application interface and the components, and between the components. This solution has the following features: The components (identified by the icons) encapsulate key BusSim functionality. The Application Architecture provides the glue that allows application-to-component and component-to-component communication. The Application Framework provides structure and base functionality that can be customized for different interaction styles. Only the application interface must be custom developed. The next section discusses each of these components in further detail.

The Business Simulation Toolset

We have clearly defined why a combined component/framework approach is the best solution for delivering high-quality BusSim solutions at a lower cost. Given that there are a number of third party frameworks already on the market that provide delivery capability for a wide variety of platforms, the TEL project is focused on defining and developing a set of components that provide unique services for the development and delivery of BusSim solutions. These components along with a set of design and test workbenches are the tools used by instructional designers to support activities in the four phases of BusSim development. We call this suite of tools the Business Simulation Toolset. Following is a description of each of the components and workbenches of the toolset. A Component can be thought of as a black box that encapsulates the behavior and data necessary to support a related set of services. It exposes these services to the outside world through published interfaces. The published interface of a component allows you to understand what it does through the services it offers, but not how it does it. The complexity of its implementation is hidden from the user. The following are the key components of the BusSim Toolset. Domain Component—provides services for modeling the state of a simulation. Profiling Component—provides services for rule-based evaluating the state of a simulation. Transformation Component—provides services for manipulating the state of a simulation. Remediation Component—provides services for the rule-based delivering of feedback to the student The Domain Model component is the central component of the suite that facilitates communication of context data across the application and the other components. It is a modeling tool that can use industry-standard database such as Informix, Oracle, or Sybase to store its data. A domain model is a representation of the objects in a simulation. The objects are such pseudo tangible things as a lever the student can pull, a form or notepad the student fills out, a character the student interacts with in a simulated meeting, etc. They can also be abstract objects such as the ROI for a particular investment, the number of times the student asked a particular question, etc. These objects are called entities. Some example entities include: Vehicles, operators and incidents in an insurance domain; Journal entries, cash flow statements and balance sheets in a financial accounting domain and Consumers and purchases in a marketing domain.

Figure 4:
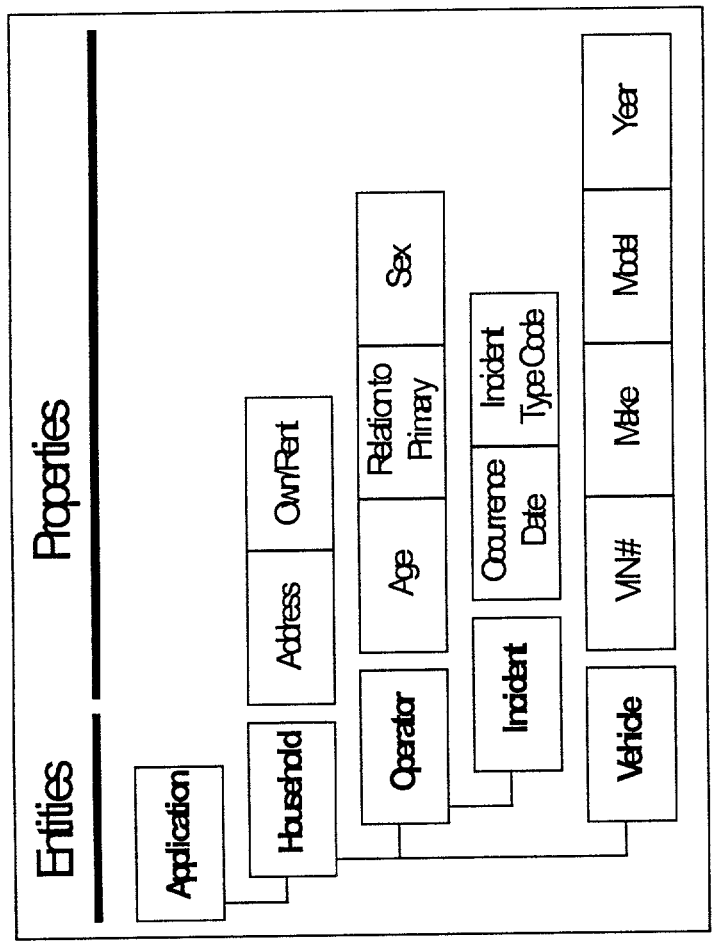
FIG. 4 illustrates a small segment of a domain model for claims handlers in the auto insurance industry in accordance with a preferred embodiment.

An entity can also contain other entities. For example, a personal bank account entity might contain an entity that represents a savings account. Every entity has a set of properties where each property in some way describes the entity. The set of properties owned by an entity, in essence, define the entity. Some example properties include: An incident entity on an insurance application owns properties such as "Occurrence Date", "Incident Type Code", etc. A journal entry owns properties such as "Credit Account", "Debit Account", and "Amount"; and a revolving credit account entity on a mortgage application owns properties such as "Outstanding Balance", "Available Limit", etc. FIG. 4 illustrates a small segment of a domain model for claims handlers in the auto insurance industry in accordance with a preferred embodiment.

Profiling Component

In the simplest terms, the purpose of the Profiling Component is to analyze the current state of a domain and identify specific things that are true about that domain. This information is then passed to the Remediation Component which provides feedback to the student. The Profiling Component analyzes the domain by asking questions about the domain's state, akin to an investigator asking questions about a case. The questions that the Profiler asks are called profiles. For example, suppose there is a task about building a campfire and the student has just thrown a match on a pile of wood, but the fire didn't start. In order to give useful feedback to the student, a tutor would need to know things like: was the match lit?, was the wood wet?, was there kindling in the pile?, etc. These questions would be among the profiles that the Profiling Component would use to analyze the domain. The results of the analysis would then be passed off to the Remediation Component which would use this information to provide specific feedback to the student. Specifically, a profile is a set of criteria that is matched against the domain. The purpose of a profile is to check whether the criteria defined by the profile is met in the domain. Using a visual editing tool, instructional designers create profiles to identify those things that are important to know about the domain for a given task. During execution of a BusSim application at the point that feedback is requested either by the student or pro-actively by the application, the set of profiles associated with the current task are evaluated to determine which ones are true. Example profiles include: Good productions strategy but wrong Break-Even Formula; Good driving record and low claims history; and Correct Cash Flow Analysis but poor Return on Investment (ROI)

Figure 5:
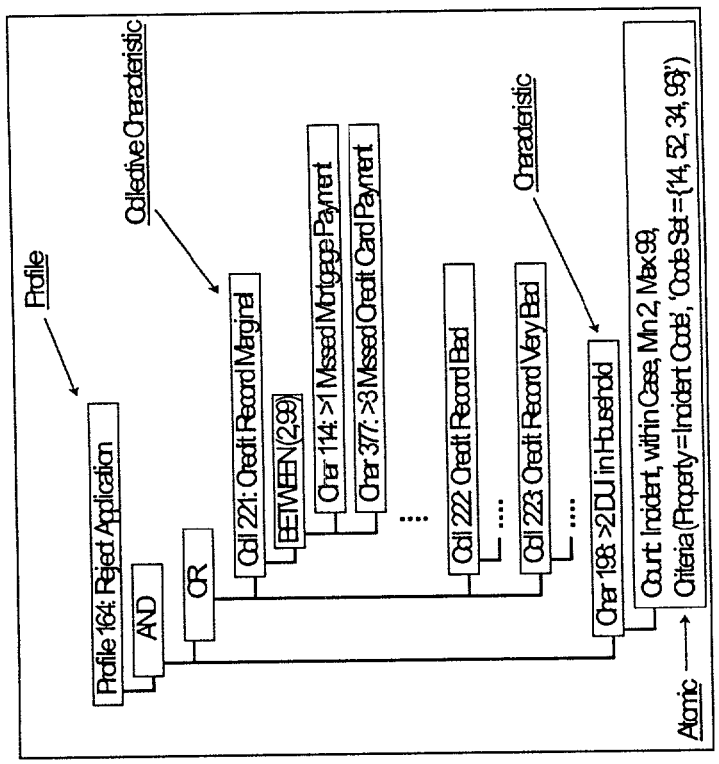
FIG. 5 illustrates an insurance underwriting profile in accordance with a preferred embodiment.

A profile is composed of two types of structures: characteristics and collective characteristics. A characteristic is a conditional (the if half of a rule) that identifies a subset of the domain that is important for determining what feedback to deliver to the student. Example characteristics include: Wrong debit account in transaction 1; Perfect cost classification; At Least 1 DUI in the last 3 years; More than $4000 in claims in the last 2 years; and More than two at-fault accidents in 5 years A characteristic's conditional uses one or more atomics as the operands to identify the subset of the domain that defines the characteristic. An atomic only makes reference to a single property of a single entity in the domain; thus the term atomic. Example atomics include: The number of DUI's>=1; ROI>10%; and Income between $75,000 and $110,000. A collective characteristic is a conditional that uses multiple characteristics and/or other collective characteristics as its operands. Collective characteristics allow instructional designers to build richer expressions (i.e., ask more complex questions). Example collective characteristics include: Bad Household driving record; Good Credit Rating; Marginal Credit Rating; Problems with Cash for Expense transactions; and Problems with Sources and uses of cash. Once created, designers are able to reuse these elements within multiple expressions, which significantly eases the burden of creating additional profiles. When building a profile from its elements, atomics can be used by multiple characteristics, characteristics can be used by multiple collective characteristics and profiles, and collective characteristics can be used by multiple collective characteristics and profiles. FIG. 5 illustrates an insurance underwriting profile in accordance with a preferred embodiment.

Example Profile for Insurance Underwriting

Figure 6:
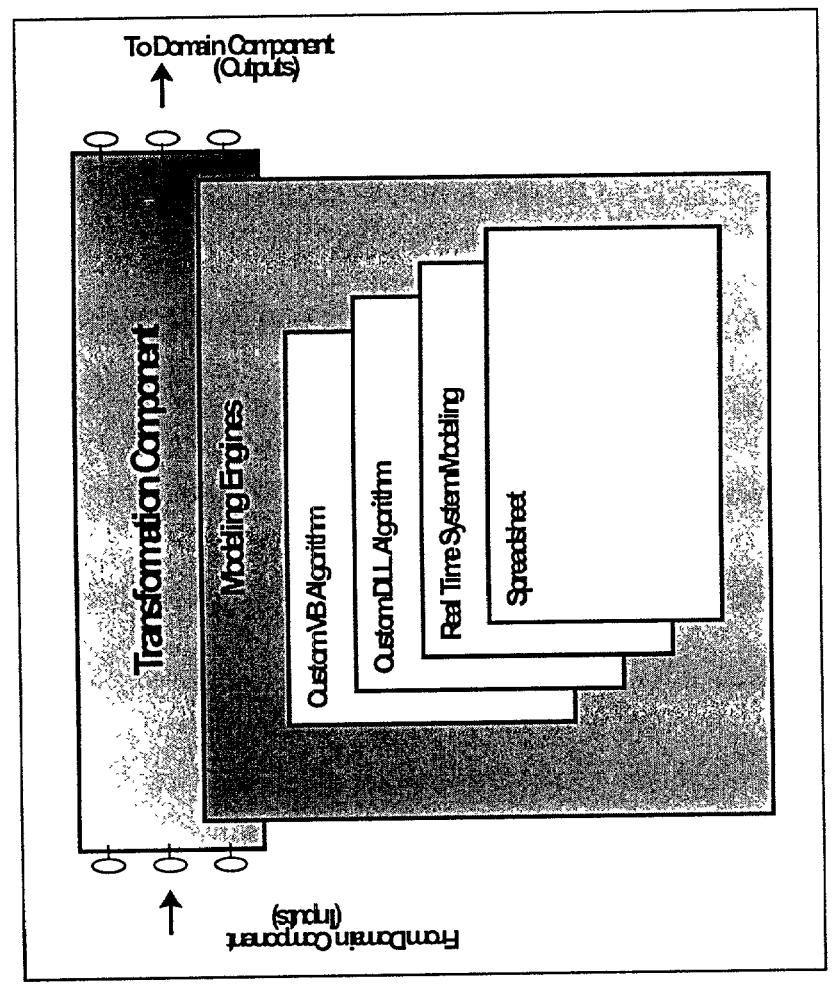
FIG. 6 illustrates a transformation component in accordance with a preferred embodiment.

Transformation Component—Whereas the Profiling Component asks questions about the domain, the Transformation Component performs calculations on the domain and feeds the results back into the domain for further analysis by the Profiling Component. This facilitates the modeling of complex business systems that would otherwise be very difficult to implement as part of the application. Within the Analysis phase of the Interface/Analysis/Interpretation execution flow, the Transformation Component actually acts on the domain before the Profiling Component does its analysis. The Transformation Component acts as a shell that wraps one or more data modeling components for the purpose of integrating these components into a BusSim application. The Transformation Component facilitates the transfer of specific data from the domain to the data modeling component (inputs) for calculations to be performed on the data, as well as the transfer of the results of the calculations from the data modeling component back to the domain (outputs). FIG. 6 illustrates a transformation component in accordance with a preferred embodiment. The data modeling components could be third party modeling environments such as spreadsheet-based modeling (e.g., Excel, Formula1) or discrete time-based simulation modeling (e.g., PowerSim, VenSim). The components could also be custom built in C++, VB, Access, or any tool that is ODBC compliant to provide unique modeling environments. Using the Transformation Component to wrap a third party spreadsheet component provides an easy way of integrating into an application spreadsheet-based data analysis, created by such tools as Excel. The Transformation Component provides a shell for the spreadsheet so that it can look into the domain, pull out values needed as inputs, performs its calculations, and post outputs back to the domain.

For example, if the financial statements of a company are stored in the domain, the domain would hold the baseline data like how much cash the company has, what its assets and liabilities are, etc. The Transformation Component would be able to look at the data and calculate additional values like cash flow ratios, ROI or NPV of investments, or any other calculations to quantitatively analyze the financial health of the company. Depending on their complexity, these calculations could be performed by pre-existing spreadsheets that a client has already spent considerable time developing.

Remediation Component—The Remediation Component is an expert system that facilitates integration of intelligent feedback into BusSim applications. It has the following features: Ability to compose high quality text feedback; Ability to compose multimedia feedback that includes video and/or audio; Ability to include reference material in feedback such as Authorware pages or Web Pages and Ability to actively manipulate the users deliverables to highlight or even fix users' errors. A proven remediation theory embedded in its feedback composition algorithm allows integration of digital assets into the Remediation of a training or IPS application. The Remediation model consists of three primary objects: Concepts; Coach Topics and Coach Items. Concepts are objects that represent real-world concepts that the user will be faced with in the interface. Concepts can be broken into sub-concepts, creating a hierarchical tree of concepts. This tree can be arbitrarily deep and wide to support rich concept modeling. Concepts can also own an arbitrary number of Coach Topics. Coach Topics are objects that represent a discussion topic that may be appropriate for a concept. Coach Topics can own an arbitrary number of Coach Items. Coach Items are items of feedback that may include text, audio, video, URL's, or updates to the Domain Model. Coach Items are owned by Coach Topics and are assembled by the Remediation Component algorithm.

Workbenches—The BusSim Toolset also includes a set of workbenches that are used by instructional designers to design and build BusSim applications. A workbench is a tool that facilitates visual editing or testing of the data that the BusSim Components use for determining an application's run-time behavior. The BusSim Toolset includes the following workbenches: Knowledge Workbench—The Knowledge Workbench is a tool for the creation of domain, analysis and feedback data that is used by the BusSim Components. It has the following features: Allows the designer to 'paint' knowledge in a drag-and-drop interface; Knowledge is represented visually for easy communication among designers; The interface is intelligent, allowing designers to only paint valid interactions; Designer's Task creations are stored in a central repository; The workbench supports check-in/check-out for exclusive editing of a task; Supports LAN-based or untethered editing; Automatically generates documentation of the designs; and it Generates the data files that drive the behavior of the components. Simulated Student Test Workbench—The Simulated Student Test Workbench is a tool for the creation of data that simulates student's actions for testing BusSim Component behaviors. It has the following features: The Test Bench generates a simulated application interface based on the Domain Model; The designer manipulates the objects in the Domain Model to simulate student activity; The designer can invoke the components to experience the interactions the student will experience in production; and The designer can fully test the interaction behavior prior to development of the application interface. Regression Test Workbench—The Regression Test Workbench is a tool for replaying and testing of student sessions to aid debugging. It has the following features: Each student submission can be individually replayed through the components; An arbitrary number of student submissions from the same session can be replayed in succession; Entire student sessions can be replayed in batch instantly; The interaction results of the student are juxtaposed with the results of the regression test for comparison.

Development Cycle Activities

The design phase of a BusSim application is streamlined by the use of the Knowledge Workbench. The Knowledge Workbench is a visual editor for configuring the objects of the component engines to control their runtime behavior. The components are based on proven algorithms that capture and implement best practices and provide a conceptual framework and methodology for instructional design. In conceptual design, the workbench allows the designer to paint a model of the hierarchy of Concepts that the student will need to master in the activity. This helps the designer organize the content in a logical way. The visual representation of the Concepts helps to communicate ideas to other designers for review. The consistent look and feel of the workbench also contributes to a streamlined Quality Assurance process. In addition, standard documentation can be automatically generated for the entire design. As the design phase progresses, the designer adds more detail to the design of the Concept hierarchy by painting in Coach Topics that the student may need feedback on. The designer can associate multiple feedback topics with each Concept. The designer also characterizes each topic as being Praise, Polish, Focus, Redirect or one of several other types of feedback that are consistent with a proven remediation methodology. The designer can then fill each topic with text, video war stories, Web page links, Authorware links, or any other media object that can be delivered to the student as part of the feedback topic.

The toolset greatly reduces effort during functionality testing. The key driver of the effort reduction is that the components can automatically track the actions of the tester without the need to add code support in the application. Whenever the tester takes an action in the interface, it is reported to the domain model. From there it can be tracked in a database. Testers no longer need to write down their actions for use in debugging; they are automatically written to disk. There is also a feature for attaching comments to a testers actions. When unexpected behavior is encountered, the tester can hit a control key sequence that pops up a dialog to record a description of the errant behavior. During the Execution Phase, the components are deployed to the student's platform. They provide simulated team member and feedback functionality with sub-second response time and error-free operation. If the client desires it, student tracking mechanisms can be deployed at runtime for evaluation and administration of students. This also enables the isolation of any defects that may have made it to production.

Scenarios for Using the Business Simulation Toolset

Figure 7:
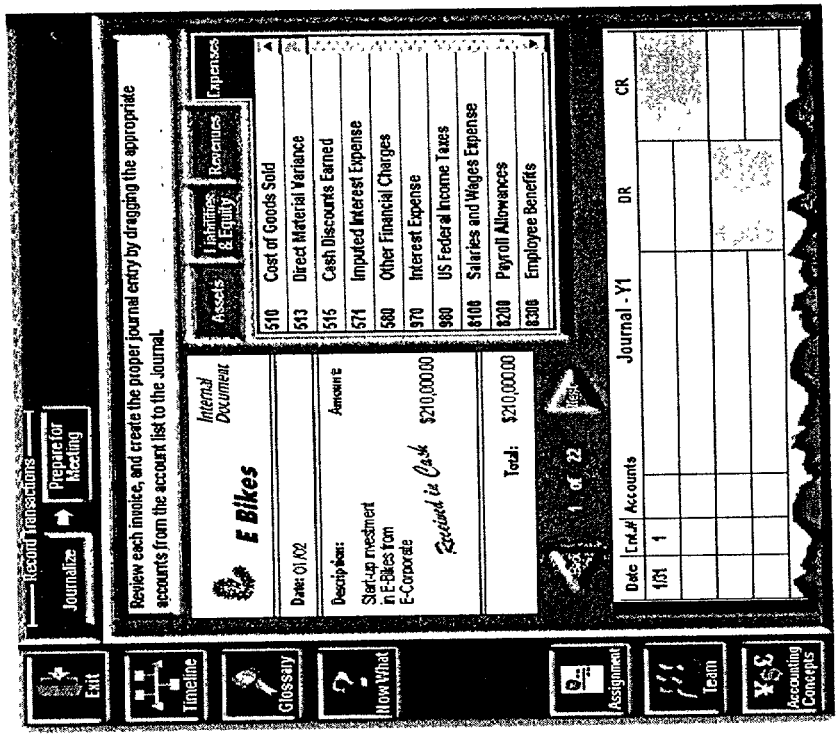
FIG. 7 illustrates the use of a toolbar to navigate and access application level features in accordance with a preferred embodiment.

A good way to gain a better appreciation for how the BusSim Toolset can vastly improve the BusSim development effort is to walk through scenarios of how the tools would be used throughout the development lifecycle of a particular task in a BusSim application. For this purpose, we'll assume that the goal of the student in a specific task is to journalize invoice transactions, and that this task is within the broader context of learning the fundamentals of financial accounting. A cursory description of the task from the student's perspective will help set the context for the scenarios. Following the description are five scenarios which describe various activities in the development of this task. The figure below shows a screen shot of the task interface. FIG. 7 illustrates the use of a toolbar to navigate and access application level features in accordance with a preferred embodiment. A student uses a toolbar to navigate and also to access some of the application-level features of the application. The toolbar is the inverted L-shaped object across the top and left of the interface. The top section of the toolbar allows the user to navigate to tasks within the current activity. The left section of the toolbar allows the student to access to access other features of the application, including feedback. The student can have his deliverables analyzed and receive feedback by clicking on the Team button.

In this task, the student must journalize twenty-two invoices and other source documents to record the flow of budget dollars between internal accounts. (Note: "Journalizing" or "Journalization", is the process of recording journal entries in a general ledger from invoices or other source documents during an accounting period. The process entails creating debit and balancing credit entries for each document. At the completion of this process, the general ledger records are used to create a trial balance and subsequent financial reports.) In accordance with a preferred embodiment, an Intelligent Coaching Agent Tool (ICAT) was developed to standardize and simplify the creation and delivery of feedback in a highly complex and open-ended environment. Feedback from a coach or tutor is instrumental in guiding the learner through an application. Moreover, by diagnosing trouble areas and recommending specific actions based on predicted student understanding of the domain student comprehension of key concepts is increased. By writing rules and feedback that correspond to a proven feedback strategy, consistent feedback is delivered throughout the application, regardless of the interaction type or of the specific designer/developer creating the feedback. The ICAT is packaged with a user-friendly workbench, so that it may be reused to increase productivity on projects requiring a similar rule-based data engine and repository.

Definition of ICAT in Accordance with a Preferred Embodiment

The Intelligent Coaching Agent Tool (ICAT) is a suite of tools—a database and a Dynamic Link Library (DLL) run-time engine—used by designers to create and execute just-in-time feedback of Goal Based training. Designers write feedback and rules in the development tools. Once the feedback is set, the run-time engine monitors user actions, fires rules and composes feedback which describes the business deliverable. The remediation model used within ICAT dynamically composes the most appropriate feedback to deliver to a student based on student's previous responses. The ICAT model is based on a theory of feedback which has been proven effective by pilot results and informal interviews. The model is embodied in the object model and algorithms of the ICAT. Because the model is built into the tools, all feedback created with the tool will conform to the model. ICAT plays two roles in student training. First, the ICAT is a teaching system, helping students to fully comprehend and apply information. Second, ICAT is a gatekeeper, ensuring that each student has mastered the material before moving on to additional information. ICAT is a self contained module, separate from the application. Separating the ICAT from the application allows other projects to use the ICAT and allows designers to test feedback before the application is complete. The ICAT Module is built on six processes which allow a student to interact effectively with the interface to compose and deliver the appropriate feedback for a student's mistakes. ICAT development methodology is a seven step methodology for creating feedback. The methodology contains specific steps, general guidelines and lessons learned from the field. Using the methodology increases the effectiveness of the feedback to meet the educational requirements of the course. The processes each contain a knowledge model and some contain algorithms. Each process has specific knowledge architected into its design to enhance remediation and teaching. There is a suite of testing tools for the ICAT. These tools allow designers and developers test all of their feedback and rules. In addition, the utilities let designers capture real time activities of students as they go through the course. The tools and run-time engine in accordance with a preferred embodiment include expert knowledge of remediation. These objects include logic that analyzes a student's work to identify problem areas and deliver focused feedback. The designers need only instantiate the objects to put the tools to work. Embodying expert knowledge in the tools and engine ensures that each section of a course has the same effective feedback structure in place. A file structure in accordance with a preferred embodiment provides a standard system environment for all applications in accordance with a preferred embodiment. A development directory holds a plurality of sub-directories. The content in the documentation directory is part of a separate installation from the architecture. This is due to the size of the documentation directory. It does not require any support files, thus it may be placed on a LAN or on individual computers. When the architecture is installed in accordance with a preferred embodiment, the development directory has an _Arch, _Tools, _Utilities, Documentation, QED, and XDefault development directory. Each folder has its own directory structure that is inter-linked with the other directories. This structure must be maintained to assure consistency and compatibility between projects to clarify project differences, and architecture updates.

The _Arch directory stores many of the most common parts of the system architecture. These files generally do not change and can be reused in any area of the project. If there is common visual basic code for applications that will continuously be used in other applications, the files will be housed in a folder in this directory. The sub-directories in the _Arch directory are broken into certain objects of the main project. Object in this case refers to parts of a project that are commonly referred to within the project. For example, modules and classes are defined here, and the directory is analogous to a library of functions, APIs, etc. . . . that do not change. For example the IcaObj directory stores code for the Intelligent Coaching Agent (ICA). The InBoxObj directory stores code for the InBox part of the project and so on. The file structure uses some primary object references as file directories. For example, the IcaObj directory is a component that contains primary objects for the ICA such as functional forms, modules and classes. The BrowserObj directory contains modules, classes and forms related to the browser functionality in the architecture. The HTMLGlossary directory contains code that is used for the HTML reference and glossary component of the architecture. The IcaObj directory contains ICA functional code to be used in an application. This code is instantiated and enhanced in accordance with a preferred embodiment. The InBoxObj directory contains code pertaining to the inbox functionality used within the architecture. Specifically, there are two major components in this architecture directory.

There is a new .ocx control that was created to provide functionality for an inbox in the application. There is also code that provides support for a legacy inbox application. The PracticeObj directory contains code for the topics component of the architecture. The topics component can be implemented with the HTMLGlossary component as well. The QmediaObj directory contains the components that are media related. An example is the QVIDctrl.cls. The QVIDctrl is the code that creates the links between QVID files in an application and the system in accordance with a preferred embodiment. The SimObj directory contains the Simulation Engine, a component of the application that notifies the tutor of inputs and outputs using a spreadsheet to facilitate communication. The StaticObj directory holds any component that the application will use statically from the rest of the application. For example, the login form is kept in this folder and is used as a static object in accordance with a preferred embodiment. The SysDynObj directory contains the code that allows the Systems Dynamics Engine (Powersim) to pass values to the Simulation Engine and return the values to the tutor. The VBObj directory contains common Visual Basic objects used in applications. For example the NowWhat, Visual Basic Reference forms, and specific message box components are stored in this folder. The _Tools directory contains two main directories. They represent the two most used tools in accordance with a preferred embodiment. The two directories provide the code for the tools themselves. The reason for providing the code for these tools is to allow a developer to enhance certain parts of the tools to extend their ability. This is important for the current project development and also for the growth of the tools. The Icautils directory contains a data, database, default, graphics, icadoc, and testdata directory. The purpose of all of these directories is to provide a secondary working directory for a developer to keep their testing environment of enhanced Icautils applications separate from the project application. It is built as a testbed for the tool only. No application specific work should be done here. The purpose of each of these directories will be explained in more depth in the project directory section. The TestData folder is unique to the _Tools/ICAUtils directory. It contains test data for the regression bench among others components in ICAUtils.

The Utilities directory holds the available utilities that a Business Simulation project requires for optimal results. This is a repository for code and executable utilities that developers and designers may utilize and enhance in accordance with a preferred embodiment. Most of the utilities are small applications or tools that can be used in the production of simulations which comprise an executable and code to go with it for any enhancements or changes to the utility. If new utilities are created on a project or existing utilities are enhanced, it is important to notify the managers or developers in charge of keeping track of the Business Simulation assets. Any enhancements, changes or additions to the Business Simulation technology assets are important for future and existing projects.

In the ICAT model of feedback, there are four levels of severity of error and four corresponding levels of feedback. The tutor goes through the student's work, identifies the severity of the error and then provides the corresponding level of feedback.

| Educational Categories of Feedback | | | |
|---|---|---|---|
| ERROR | | FEEDBACK | |
| Error Type | Description | Feedback Type | Description |
| None | No errors exist. The student's work is perfect. | Praise | Confirmation that the student completed the task correctly. Example: Great. You have journalized all accounts correctly. I am happy to see you recognized we are paying for most of our bills "on account". |
| Syntactic | There may be spelling mistakes or other syntactic errors. As a designer, you should be confident that the student will have mastered the material at this point. | Polish | Tells the student the specific actions he did incorrectly, and possibly correct them for him. Example: There are one or two errors in your work. It looks like you misclassified the purchase of the fax as a cash purchase when it is really a purchase on account. |
| Local | A paragraph of a paper is missing or the student has made a number of mistakes all in one area. The student clearly does not understand this area. | Focus | Focus the student on this area of his work. Point out that he does not understand at least one major concept. Example: Looking over your work, I see that you do not understand the concept of "on account". Why don't you review that concept and review your work for errors. |
| Global | The student has written on the wrong subject or there are mistakes all over the student's work | Redirect | Restate the goal of the activity and tell the student to review main concepts and retry the activity. "There are lots of mistakes throughout your work. You need to think about what type of transaction each source document represents before journalizing it." |

Returning to the analogy of helping someone write a paper, if the student writes on the wrong subject, this as a global error requiring redirect feedback. If the student returns with the paper rewritten, but with many errors in one area of the paper, focus feedback is needed. With all of those errors fixed and only spelling mistakes—syntactic mistakes—polish feedback is needed. When all syntactic mistakes were corrected, the tutor would return praise and restate why the student had written the correct paper. Focusing on the educational components of completing a task is not enough. As any teacher knows, student will often try and cheat their way through a task. Students may do no work and hope the teacher does not notice or the student may only do minor changes in hope of a hint or part of the answer. To accommodate these administrative functions, there are three additional administrative categories of feedback. The administrative and the educational categories of feedback account for every piece of feedback a designer can write and a student can receive. To provide a better understanding of how the feedback works together, an example is provided below.

Figure 9:
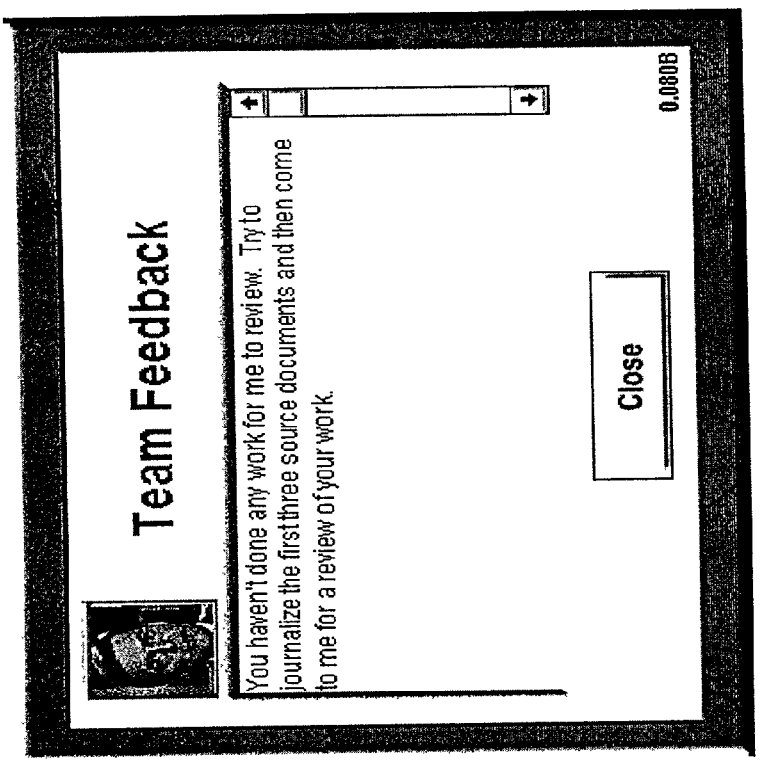
FIG. 9 is a feedback display in accordance with a preferred embodiment.
Figure 8:
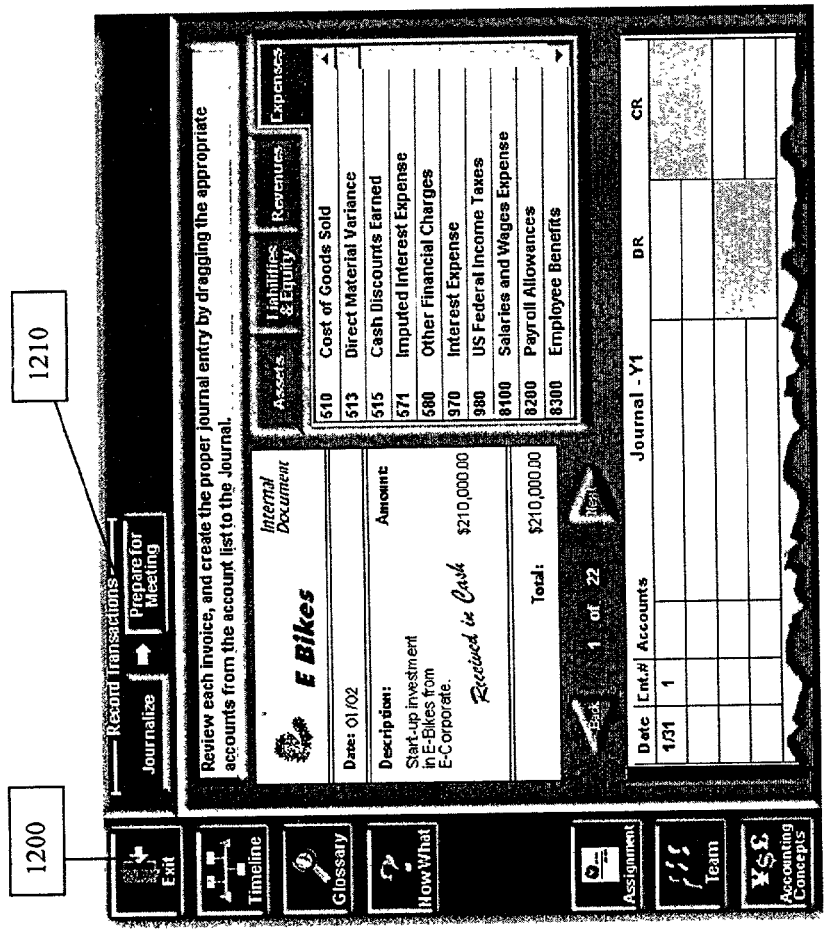
FIG. 8 is a GBS display in accordance with a preferred embodiment.
Figures 10, 11:
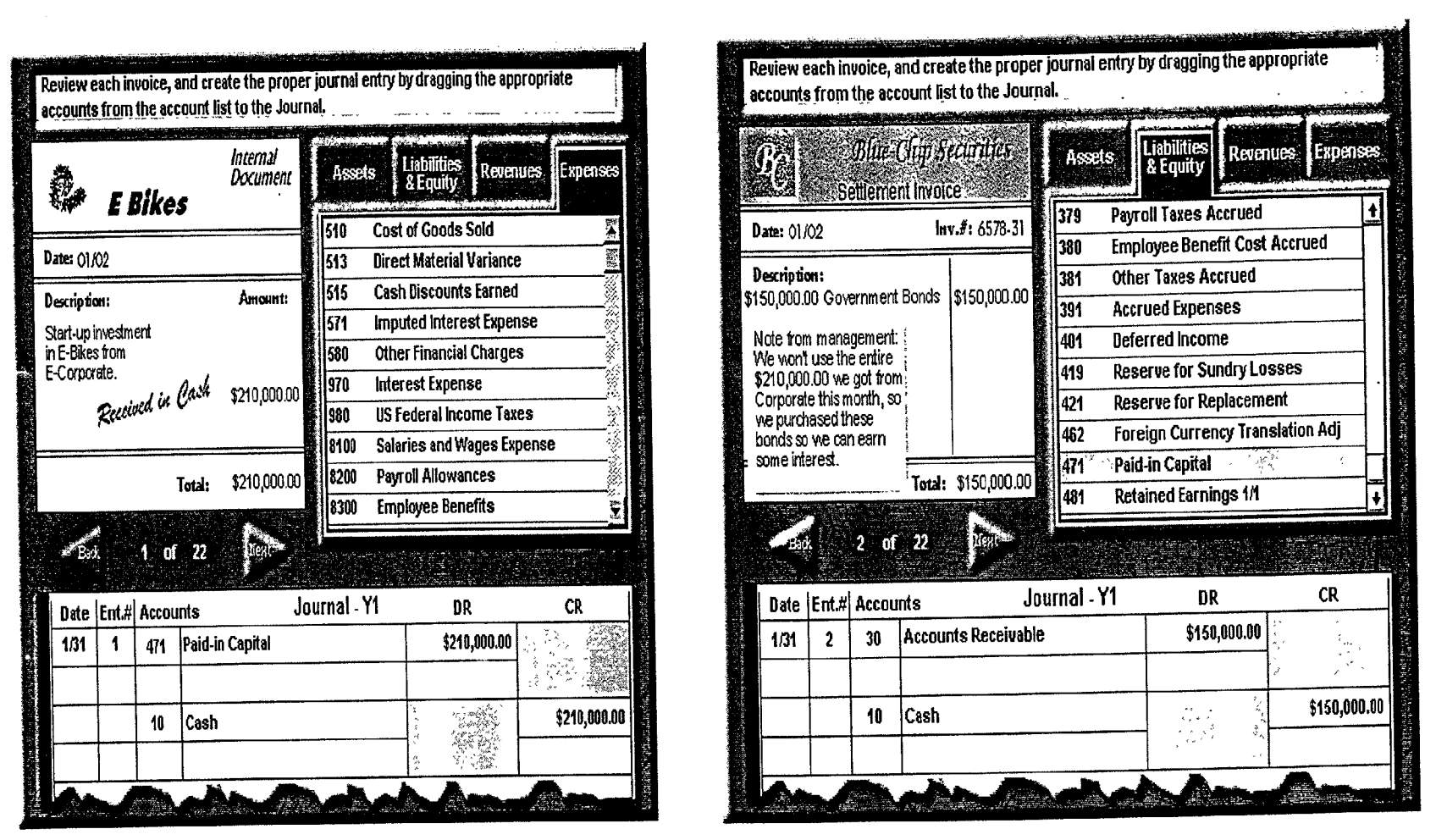
Figure 12:
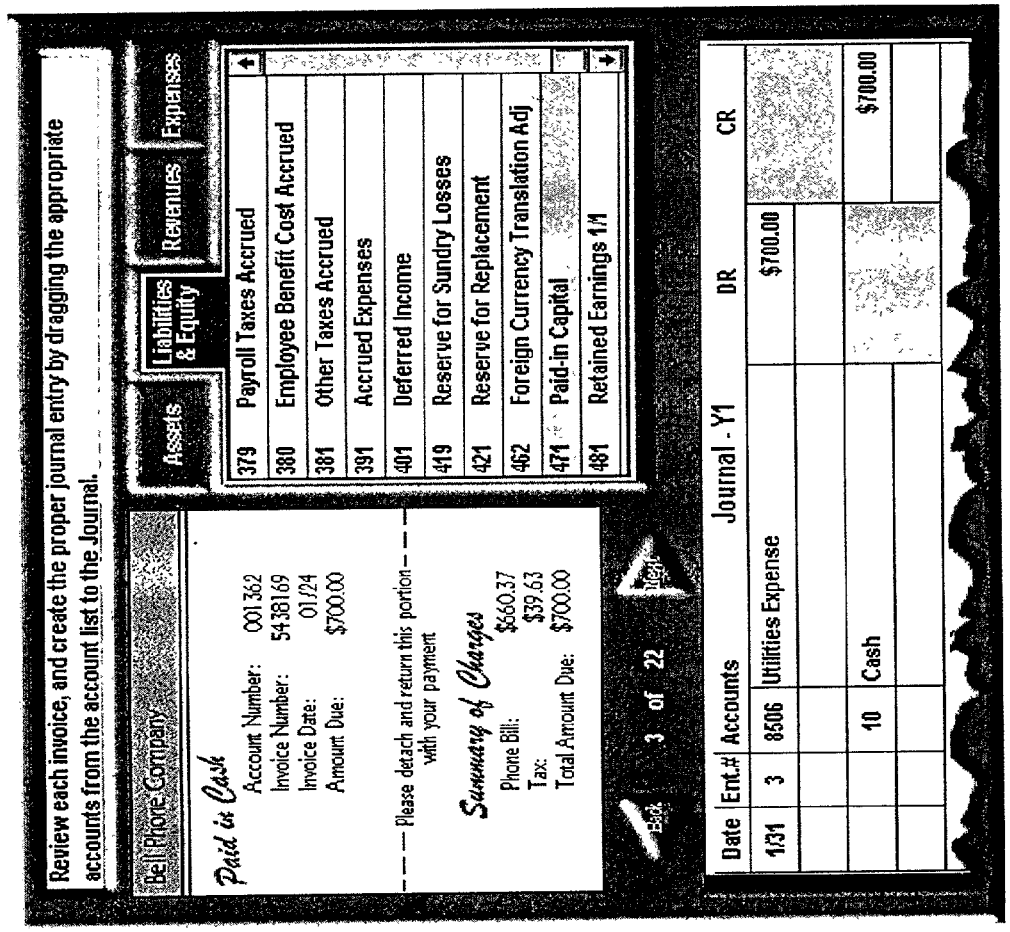
FIG. 12 illustrates a feedback display in accordance with a preferred embodiment.

FIG. 8 is a GBS display in accordance with a preferred embodiment. The upper right area of the screen shows the account list. There are four types of accounts: Assets, Liabilities & Equity, Revenues, and Expenses. The user clicks on one of the tabs to show the accounts of the corresponding type. The student journalizes a transaction by dragging an account from the account list onto the journal entry Debits or Credits. The student then enters the dollar amounts to debit or credit each account in the entry. In the interface, as in real life, the student can have multi-legged journal entries (i.e., debiting or crediting multiple accounts). A Toolbar 1200 and the first transaction of this Task 1210 appear prominently on the display. The student can move forward and back through the stack of transactions. For each transaction, the student must identify which accounts to debit and which to credit. When the student is done, he clicks the Team button. FIG. 9 is a feedback display in accordance with a preferred embodiment. The student may attempt to outsmart the system by submitting without doing anything. The ICAT system identifies that the student has not done a substantial amount of work and returns the administrative feedback depicted in FIG. 9. The feedback points out that nothing has been done, but it also states that if the student does some work, the tutor will focus on the first few journal entries. FIG. 10 illustrates a journal entry simulation in accordance with a preferred embodiment. FIG. 11 illustrates a simulated Bell Phone Bill journal entry in accordance with a preferred embodiment. The journal entry is accomplished by debiting Utilities Expenses and Crediting Cash for $700 each. FIG. 12 illustrates a feedback display in accordance with a preferred embodiment. After attempting to journalize the first three transactions, the student submits his work and receives the feedback depicted in FIG. 12. The feedback starts by focusing the student on the area of work being evaluated. The ICAT states that it is only looking at the first three journal entries. The feedback states that the first two entries are completely wrong, but the third is close. If the student had made large mistakes on each of the first three transactions, then the ICAT may have given redirect feedback, thinking a global error occurred. The third bullet point also highlights how specific the feedback can become, identifying near misses.

Figure 13:
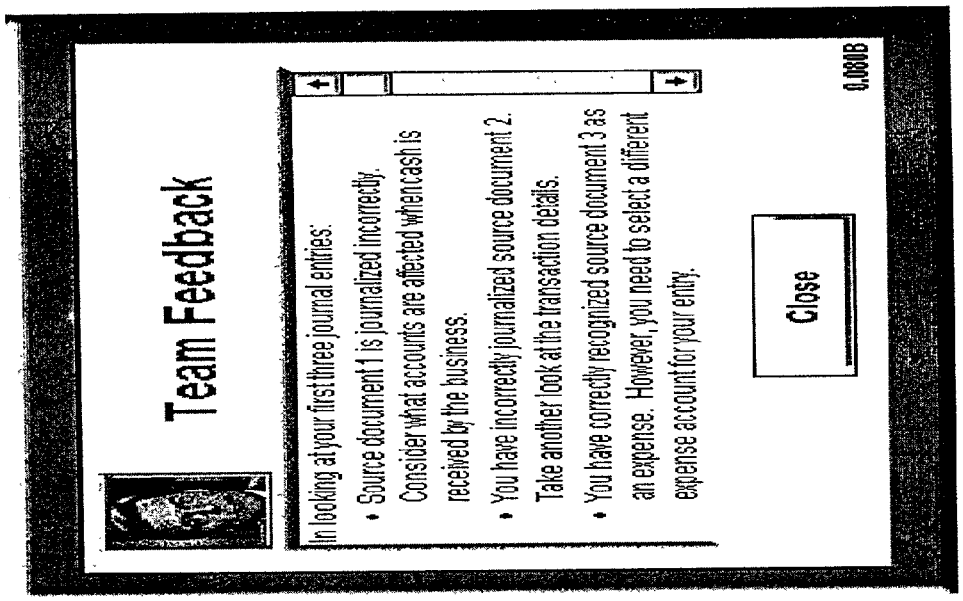
FIG. 13 illustrates the steps of the first scenario in accordance with a preferred embodiment.

Design Scenario—This Scenario illustrates how the tools are used to support conceptual and detailed design of a Bus-Sim application. FIG. 13 illustrates the steps of the first scenario in accordance with a preferred embodiment. The designer has gathered requirements and determined that to support the client's learning objectives, a task is required that teaches journalization skills. The designer begins the design first by learning about journalization herself, and then by using the Knowledge Workbench to sketch a hierarchy of the concepts she want the student to learn. At the most general level, she creates a root concept of 'Journalization'. She refines this by defining sub-concepts of 'Cash related transactions', 'Expense related Transactions', and 'Expense on account transactions'. These are each further refined to whatever level of depth is required to support the quality of the learning and the fidelity of the simulation. The designer then designs the journalization interface. Since a great way to learn is by doing, she decides that the student should be asked to Journalize a set of transactions. She comes up with a set of twenty-two documents that typify those a finance professional might see on the job. They include the gamut of Asset, Expense, Liability and Equity, and Revenue transactions. Also included are some documents that are not supposed to be entered in the journal. These 'Distracters' are included because sometimes errant documents occur in real life. The designer then uses the Domain Model features in the Knowledge Workbench to paint a Journal. An entity is created in the Domain Model to represent each transaction and each source document. Based on the twenty-two documents that the designer chose, she can anticipate errors that the student might make. For these errors, she creates topics of feedback and populates them with text. She also creates topics of feedback to tell the student when they have succeeded. Feedback Topics are created to handle a variety of situations that the student may cause.

The next step is to create profiles that the will trigger the topics in the concept tree (this task is not computational in nature, so the Transformation Component does not need to be configured). A profile resolves to true when its conditions are met by the student's work. Each profile that resolves to true triggers a topic. To do some preliminary testing on the design, the designer invokes the Student Simulator Test Workbench. The designer can manipulate the Domain Model as if she were the student working in the interface. She drags accounts around to different transactions, indicating how she would like them journalized. She also enters the dollar amounts that she would like to debit or credit each account. She submits her actions to the component engines to see the feedback the student would get if he had performed the activity in the same way. All of this occurs in the test bench without an application interface. The last step in this phase is low-fi user testing. A test student interacts with a PowerPoint slide or bitmap of the proposed application interface for the Journalization Task. A facilitator mimics his actions in the test bench and tells him what the feedback would be. This simplifies low-fi user testing and helps the designer to identify usability issues earlier in the design when they are much cheaper to resolve.

Figure 15:
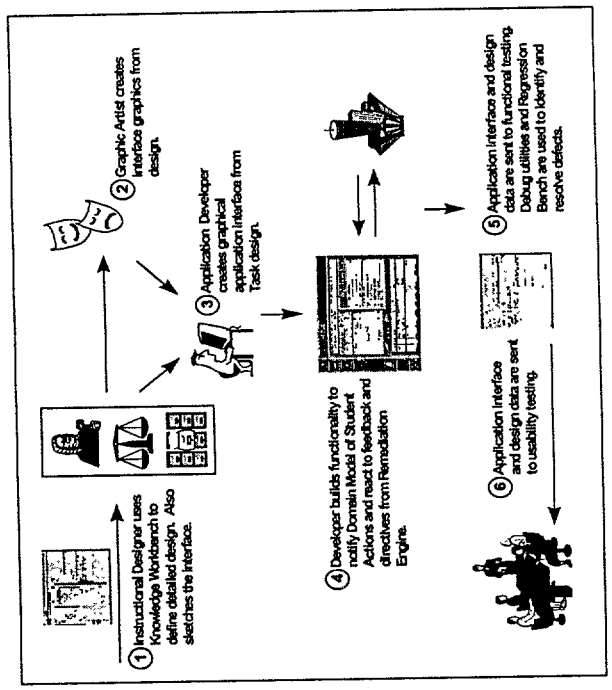
FIGS. 14 and 15 illustrate the steps associated with a build scenario in accordance with a preferred embodiment.
Figure 14:
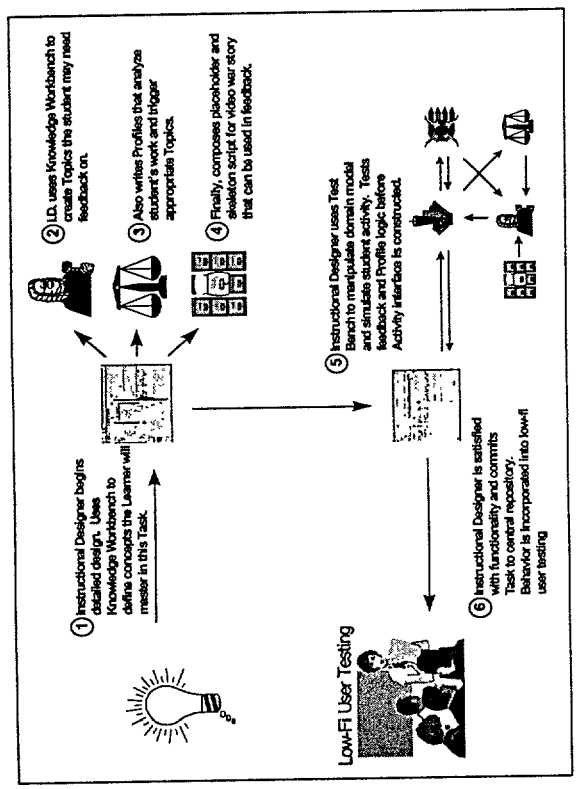

FIGS. 14 and 15 illustrate the steps associated with a build scenario in accordance with a preferred embodiment. The instructional designer completes the initial interaction and interface designs as seen in the previous Scenario. After low-fi user testing, the Build Phase begins. Graphic artists use the designs to create the bitmaps that will make up the interface. These include bitmaps for the buttons, tabs, and transactions, as well as all the other screen widgets. The developer builds the interface using the bitmaps and adds the functionality that notifies the Domain Model of student actions. Standard event-driven programming techniques are used to create code that will react to events in the interface during application execution and pass the appropriate information to the Domain Model. The developer does not need to have any deep knowledge about the content because she does not have to build any logic to support analysis of the student actions or feedback. The developer also codes the logic to rebuild the interface based on changes to the domain model. A few passes through these steps will typically be required to get the application communicating correctly with the components. The debug utilities and Regression Test Workbench streamline the process. After the application interface and component communication are functioning as designed, the task is migrated to Usability testing.

Figure 16:
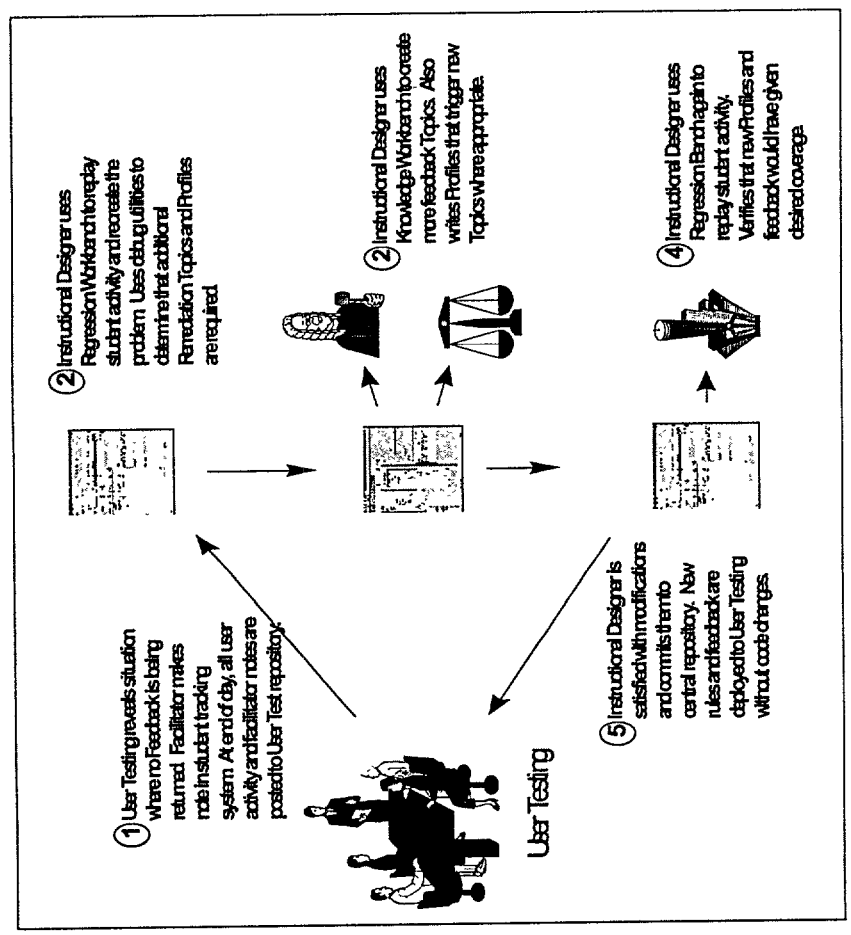
FIG. 16 illustrates a test scenario in accordance with a preferred embodiment. The test students work through the journalization activity.

The Test Scenario demonstrates the cycle that the team goes through to test the application. It specifically addresses usability testing, but it is easy to see how the tools also benefit functional and cognition testing. Again, we will use the Journalization Task as an example. FIG. 16 illustrates a test scenario in accordance with a preferred embodiment. The test students work through the journalization activity. One of the students has made it over half way through the task and has just attempted to journalize the sixteenth transaction. The student submits to the Financial Coach, but the feedback comes back blank. The student notifies the facilitator who right-clicks on the Financial Coach's face in the feedback window. A dialog pops up that shows this is the twenty-seventh submission and shows some other details about the submission. The facilitator (or even the student in recent efforts) enters a text description of the problem, and fills out some other fields to indicate the nature and severity of the problem. All the student's work and the feedback they got for the twenty-seven submissions is posted to the User Acceptance Test (UAT) archive database. The instructional designer can review all the student histories in the UAT database and retrieve the session where the student in question attempted the Journalization Task. The designer then recreates the problem by replaying the student's twenty-seven submissions through the component engines using the Regression Test Workbench. The designer can then browse through each submission that the student made and view the work that the student did on the submission, the feedback the student got, and the facilitator comments, if any. Now the designer can use the debugging tools to determine the source of the problem. In a few minutes, she is able to determine that additional profiles and topics are needed to address the specific combinations of mistakes the student made. She uses the Knowledge Workbench to design the new profiles and topics. She also adds a placeholder and a script for a video war story that supports the learning under these circumstances. The designer saves the new design of the task and reruns the Regression Test Workbench on the student's session with the new task design. After she is satisfied that the new profiles, topics, and war stories are giving the desired coverage, she ships the new task design file to user testing and it's rolled out to all of the users.

Figure 17:
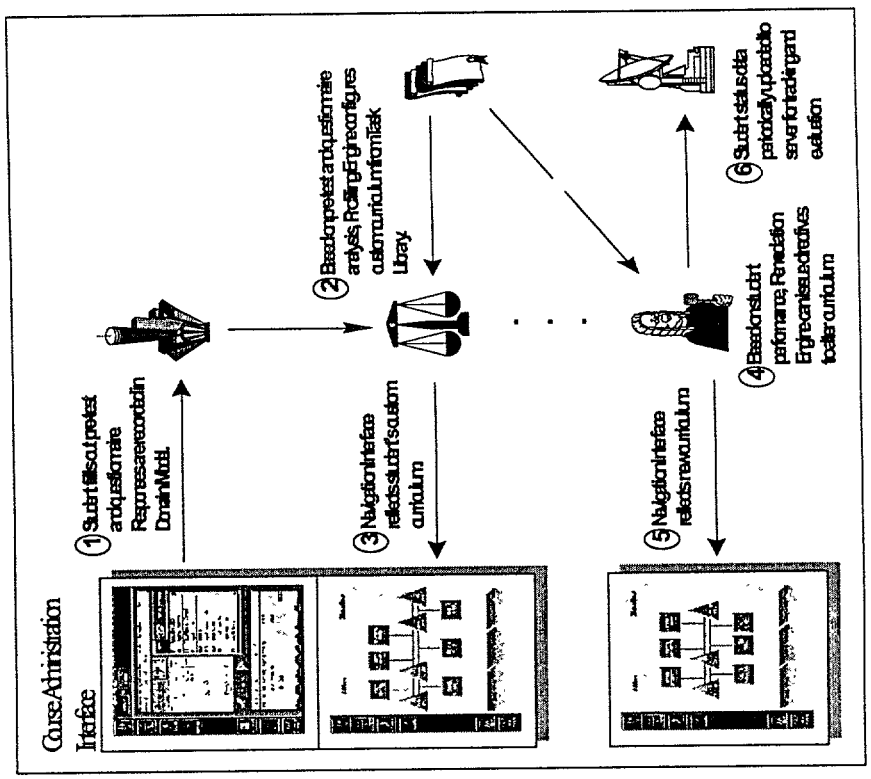
FIG. 17 illustrates how the tool suite supports student administration in accordance with a preferred embodiment.

Execution Scenario: Student Administration—FIG. 17 illustrates how the tool suite supports student administration in accordance with a preferred embodiment. When a student first enters a course she performs a pre-test of his financial skills and fills out an information sheet about his job role, level, etc. This information is reported to the Domain Model. The Profiling Component analyzes the pre-test, information sheet, and any other data to determine the specific learning needs of this student. A curriculum is dynamically configured from the Task Library for this student. The application configures its main navigational interface (if the app has one) to indicate that this student needs to learn Journalization, among other things. As the student progresses through the course, his performance indicates that his proficiency is growing more rapidly in some areas than in others. Based on this finding, his curriculum is altered to give him additional Tasks that will help him master the content he is having trouble with. Also, Tasks may be removed where he has demonstrated proficiency. While the student is performing the work in the Tasks, every action he takes, the feedback he gets, and any other indicators of performance are tracked in the Student Tracking Database. Periodically, part or all of the tracked data are transmitted to a central location. The data can be used to verify that the student completed all of the work, and it can be further analyzed to measure his degree of mastery of the content.

Figure 18:
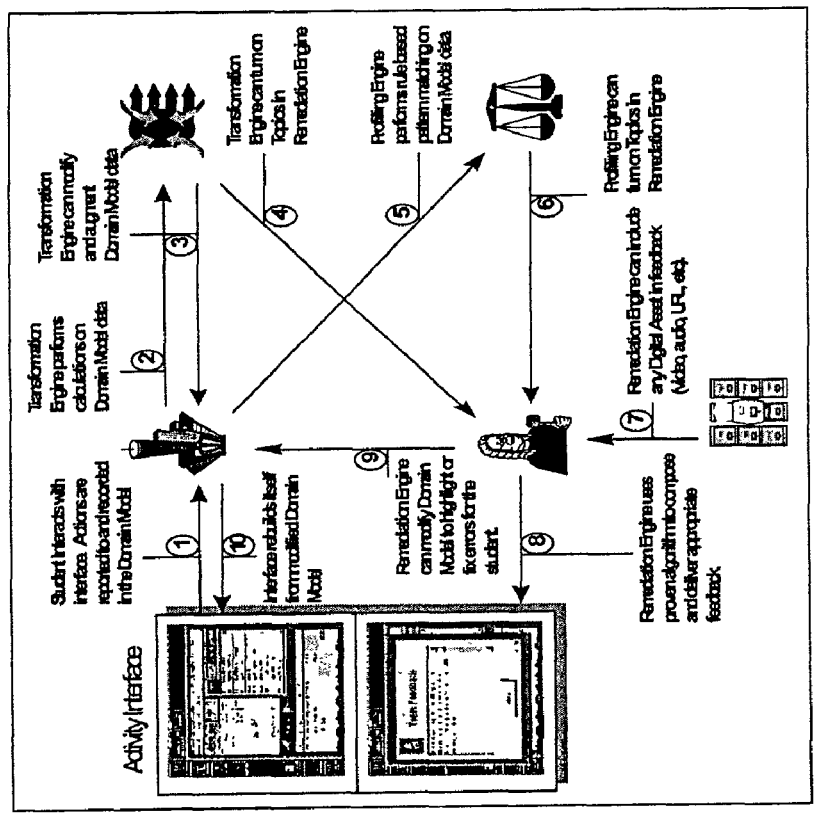
FIG. 18 illustrates a suite to support a student interaction in accordance with a preferred embodiment.

Execution Scenario: Student Interaction—FIG. 18 illustrates a suite to support a student interaction in accordance with a preferred embodiment. In this task the student is trying to journalize invoices. He sees a chart of accounts, an invoice, and the journal entry for each invoice. He journalizes a transaction by dragging and dropping an account from the chart of accounts onto the 'Debits' or the 'Credits' line of the journal entry and entering the dollar amount of the debit or credit. He does this for each transaction. As the student interacts with the interface, all actions are reported to and recorded in the Domain Model. The Domain Model has a meta-model describing a transaction, its data, and what information a journal entry contains. The actions of the student populates the entities in the domain model with the appropriate information. When the student is ready, he submits the work to a simulated team member for review. This submission triggers the Analysis-Interpretation cycle. The Transformation Component is invoked and performs additional calculations on the data in the Domain Model, perhaps determining that Debits and Credits are unbalanced for a given journal entry. The Profiling Component can then perform rule-based pattern matching on the Domain Model, examining both the student actions and results of any Transformation Component analysis. Some of the profiles fire as they identify the mistakes and correct answers the student has given. Any profiles that fire activate topics in the Remediation Component. After the Profiling Component completes, the Remediation Component is invoked. The remediation algorithm searches the active topics in the tree of concepts to determine the best set of topics to deliver. This set may contain text, video, audio, URLs, even actions that manipulate the Domain Model. It is then assembled into prose-like paragraphs of text and media and presented to the student. The text feedback helps the student localize his journalization errors and understand why they are wrong and what is needed to correct the mistakes. The student is presented with the opportunity to view a video war story about the tax and legal consequences that arise from incorrect journalization. He is also presented with links to the reference materials that describe the fundamentals of journalization. The Analysis-Interpretation cycle ends when any coach items that result in updates to the Domain Model have been posted and the interface is redrawn to represent the new domain data. In this case, the designer chose to highlight with a red check the transactions that the student journalized incorrectly.

The Functional Definition of the ICAT

This section describes the feedback processes in accordance with a preferred embodiment. For each process, there is a definition of the process and a high-level description of the knowledge model. This definition is intended to give the reader a baseline understanding of some of the key components/objects in the model, so that he can proceed with the remaining sections of this paper. Refer to the Detailed Components of the ICAT for a more detailed description of each of the components within each knowledge model. To gain a general understanding of the ICAT, read only the general descriptions. To understand the ICAT deeply, read this section and the detailed component section regarding knowledge models and algorithms. These processes and algorithms embody the feedback model in the ICAT. There are six main processes in the ICAT, described below and in more detail on the following pages.

Figure 19:
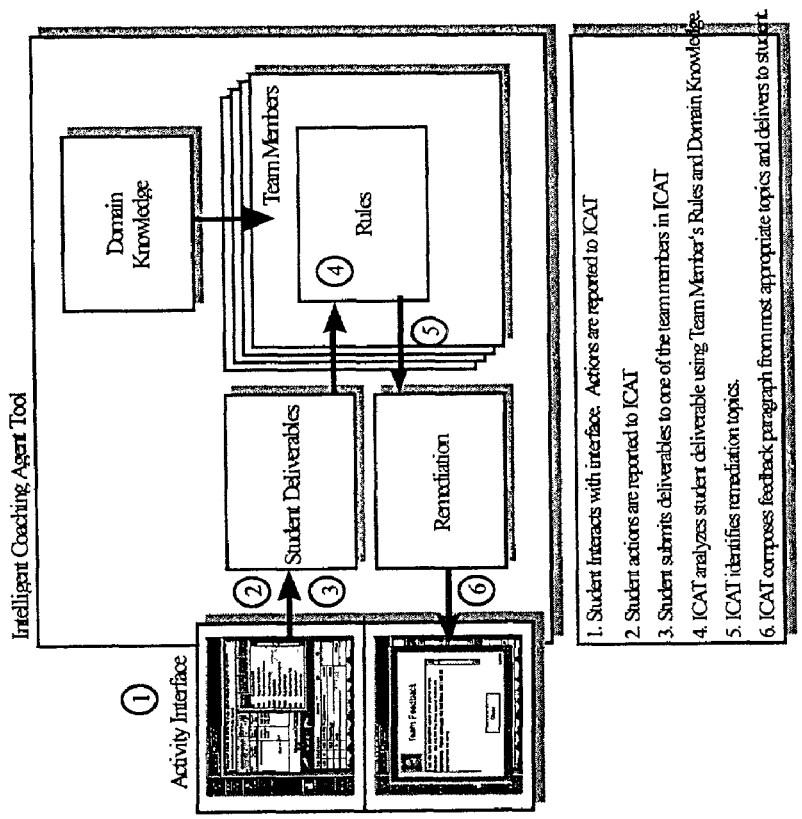
FIG. 19 illustrates the remediation process in accordance with a preferred embodiment.

FIG. 19 illustrates the remediation process in accordance with a preferred embodiment. Remediation starts as students interact with the application's interface (process #1). As the student tries to complete the business deliverable, the application sends messages to the ICAT about each action taken (process #2). When the student is done and submits work for review, the ICAT compares how the student completed the activity with how the designer stated the activity should be completed (this is called domain knowledge). From this comparison, the ICAT get a count of how many items are right, wrong or irrelevant (process #3). With the count complete, the ICAT tries to fire all rules (process #4). Any rules which fire activate a coach (process #5). The feedback algorithm selects pieces of feedback to show and composes them into coherent paragraphs of text (process #6). Finally, as part of creating feedback text paragraphs, the ICAT replaces all variables in the feedback with specifics from the student's work. This gives the feedback even more specificity, so that it is truly customized to each student's actions.

Knowledge Model—Interface Objects In any GBS Task, the student must manipulate controls on the application interface to complete the required deliverables. FIG. 20 illustrates the objects for the journalization task in accordance with a preferred embodiment. The following abstract objects are used to model all the various types of interface interactions. A SourceItem is an object the student uses to complete a task. In the journalization example, the student makes a debit and credit for each transaction. The student has a finite set of accounts with which to respond for each transaction. Each account that appears in the interface has a corresponding SourceItem object. In other words, the items the student can manipulate to complete the task (account names) are called SourceItem. A Source is an object that groups a set of SourceItem objects together. Source objects have a One-To-Many relationship with SourceItem objects. In the journalization example, there are four types of accounts: Assets, Liabilities and Equity, Revenues, and Expenses. Each Account is of one and only one of these types and thus appears only under the appropriate tab. For each of the Account type tabs, there is a corresponding Source Object. A Target is a fixed place where students place SourceItems to complete a task. In the journalization example, the student places accounts on two possible targets: debits and credits. The top two lines of the journal entry control are Debit targets and the bottom two lines are Credit targets. These two targets are specific to the twelfth transaction. A TargetPage is an object that groups a set of Target objects together. TargetPage objects have a One-To-Many relationship with Target objects (just like the Source to SourceItem relationship). In the journalization example, there is one journal entry for each of the twenty-two transactions. For each journal entry there is a corresponding TargetPage object that contains the Debits Target and Credits Target for that journal entry.

Figure 24:
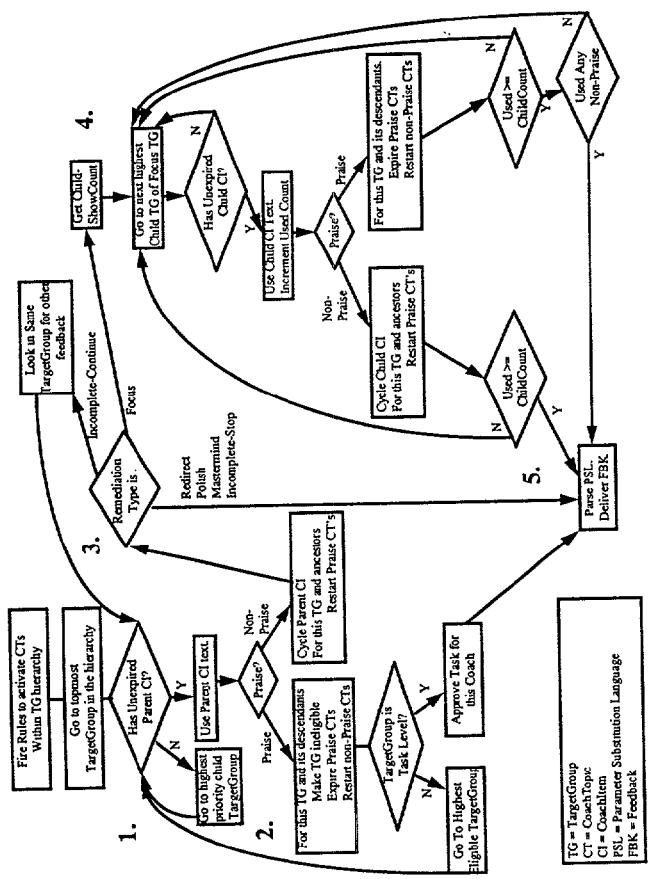
FIG. 24 is a flowchart of the feedback logic in accordance with a preferred embodiment.

As the student manipulates the application interface, each action is reported to the ICAT. In order to tell the ICAT what actions were taken, the application calls to a database and asks for a specific interface control's ID. When the application has the ID of the target control and the SourceItem control, the application notifies the ICAT about the Target to SourceItem mapping. In other words, every time a student manipulates a source item and associates it with a target (e.g., dragging an account name to a debit line in the journal), the user action is recorded as a mapping of the source item to the target. This mapping is called a UserSourceItemTarget. FIG. 21 illustrates the mapping of a source item to a target item in accordance with a preferred embodiment. When the student is ready, he submits his work to one of the simulated team members by clicking on the team member's icon. When the ICAT receives the student's work, it calculates how much of the work is correct by concept. Concepts in our journalization activity will include Debits, Credits, Asset Accounts, etc. For each of these concepts, the ICAT will review all student actions and determine how many of the student actions were correct. In order for the ICAT to understand which targets on the interface are associated with each concept, the targets are bundled into target groups and prioritized in a hierarchy. Once all possible coach topics are activated, a feedback selection analyzes the active pieces of remediation within the concept hierarchy and selects the most appropriate for delivery. The selected pieces of feedback are then assembled into a cohesive paragraph of feedback and delivered to the student. FIG. 23 illustrates a feedback selection in accordance with a preferred embodiment. After the ICAT has activated CoachTopics via Rule firings, the Feedback Selection Algorithm is used to determine the most appropriate set of CoachItems (specific pieces of feedback text associated with a CoachTopic) to deliver. The Algorithm accomplishes this by analyzing the concept hierarchy (TargetGroup tree), the active CoachTopics, and the usage history of the CoachItems. FIG. 24 is a flowchart of the feedback logic in accordance with a preferred embodiment. There are five main areas to the feedback logic which execute sequentially as listed below. First, the algorithm looks through the target groups and looks for the topmost target group with an active coach topic in it. Second, the algorithm then looks to see if that top-most coach item is praise feedback. If it is praise feedback, then the student has correctly completed the business deliverable and the ICAT will stop and return that coach item. Third, if the feedback is not Praise, then the ICAT will look to see if it is redirect, polish, mastermind or incomplete-stop. If it is any of these, then the algorithm will stop and return that feedback to the user. Fourth, if the feedback is focus, then the algorithm looks to the children target groups and groups any active feedback in these target groups with the focus group header. Fifth, once the feedback has been gathered, then the substitution language is run which replaces substitution variables with the proper names. Once the ICAT has chosen the pieces of feedback to return, the feedback pieces are assembled into a paragraph. With the paragraph assembled, the ICAT goes through and replaces all variables. There are specific variables for SourceItems and Targets. Variables give feedback specificity. The feedback can point out which wrong SourceItems were placed on which Targets. It also provides hints by providing one or two SourceItems which are mapped to the Target.

The Steps Involved in Creating Feedback in Accordance with a Preferred Embodiment The goal of feedback is to help a student complete a business deliverable. The tutor needs to identify which concepts the student understands and which he does not. The tutor needs to tell the student about his problems and help him understand the concepts. There are seven major steps involved in developing feedback for an application. First, creating a strategy—The designer defines what the student should know. Second, limit errors through interface—The designer determines if the interface will identify some low level mistakes. Third, creating a target group hierarchy—The designer represents that knowledge in the tutor. Fourth, sequencing the target group hierarchy—The designer tells the tutor which concepts should be diagnosed first. Fifth, writing feedback—The designer writes feedback which tells the student how he did and what to do next. Sixth, writing Levels of Feedback—The designer writes different levels of feedback in case the student makes the same mistake more than once. Seventh, writing rules—The designer defines patterns which fire the feedback.

A feedback strategy is a loose set of questions which guide the designer as he creates rules and feedback. The strategy describes what the student should learn, how he will try and create the business deliverable and how an expert completes the deliverable. The goal of the application should be for the student to transition from the novice model to the expert model. What should the student know after using the application? The first task a designer needs to complete is to define exactly what knowledge a student must learn by the end of the interaction. Should the student know specific pieces of knowledge, such as formulas? Or, should the student understand high level strategies and detailed business processes?

This knowledge is the foundation of the feedback strategy. The tutor needs to identify if the student has used the knowledge correctly, or if there were mistakes. An example is the journal task. For this activity, students need to know the purpose of the journalizing activity, the specific accounts to debit/credit, and how much to debit/credit. A student's debit/credit is not correct or incorrect in isolation, but correct and incorrect in connection with the dollars debited/credited. Because there are two different types of knowledge—accounts to debit/credit and amounts to debit/credit—the feedback needs to identify and provide appropriate feedback for both types of mistakes.

How will a novice try and complete the task? Designers should start by defining how they believe a novice will try and complete the task. Which areas are hard and which are easy for the student. This novice view is the mental model a student will bring to the task and the feedback should help the student move to an expert view. Designers should pay special attention to characteristic mistakes they believe the student will make. Designers will want to create specific feedback for these mistakes. An example is mixing up expense accounts in the journal activity. Because students may mix up some of these accounts, the designer may need to write special feedback to help clear up any confusion.

How does an expert complete the task? This is the expert model of completing the task. The feedback should help students transition to this understanding of the domain. When creating feedback, a designer should incorporate key features of the expert model into the praise feedback he writes. When a student completes portion of the task, positive reinforcement should be provided which confirms to the student that he is doing the task correctly and can use the same process to complete the other tasks. These four questions are not an outline for creating feedback, but they define what the feedback and the whole application needs to accomplish. The designer should make sure that the feedback evaluates all of the knowledge a student should learn. In addition, the feedback should be able to remediate any characteristic mistakes the designer feels the student will make. Finally, the designer should group feedback so that it returns feedback as if it were an expert. With these components identified, a designer is ready to start creating target group hierarchies. Because there are positive and negative repercussions, designers need to select the when to remediate through the interface carefully. The criteria for making the decision is if the mistake is a low level data entry mistake or a high level intellectual mistake. If the mistake is a low level mistake, such as miss-typing data, it may be appropriate to remediate via the interface. If the designer decides to have the interface point out the mistakes, it should look as if the system generated the message. System generated messages are mechanical checks, requiring no complex reasoning. In contrast, complex reasoning, such as why a student chose a certain type of account to credit or debit should be remediated through the ICAT.

System messages—It is very important that the student know what type of remediation he is going to get from each source of information. Interface based remediation should look and feel like system messages. They should use a different interface from the ICAT remediation and should have a different feel. In the journalization task described throughout this paper, there is a system message which states "Credits do not equal debits." This message is delivered through a different interface and the blunt short sentence is unlike all other remediation. The motivation for this is that low level data entry mistakes do not show misunderstanding but instead sloppy work. Sloppy-work mistakes do not require a great deal of reasoning about why they occurred instead, they simply need to be identified. High-level reasoning mistakes, however, do require a great deal of reasoning about why they occurred, and the ICAT provides tools, such as target groups, to help with complex reasoning. Target group hierarchies allow designers to group mistakes and concepts together and ensure that they are remediated at the most appropriate time (i.e., Hard concepts will be remediated before easy concepts). Timing and other types of human-like remediation require the ICAT; other low-level mistakes which do not require much reasoning include: Incomplete—If the task requires a number of inputs, the interface can check that they have all been entered before allowing the student to proceed. By catching empty fields early in the process, the student may be saved the frustration of having to look through each entry to try and find the empty one. Empty—A simple check for the system is to look and see if anything has been selected or entered. If nothing has been selected, it may be appropriate for the system to generate a message stating "You must complete X before proceeding". Numbers not matching—Another quick check is matching numbers. As in the journalization activity, is often useful to put a quick interface check in place to make sure numbers which must match do. Small data entry mistakes are often better remediated at the interface level than at the tutor or coach level (when they are not critical to the learning objectives of the course). There are two main issues which must be remembered when using the interface to remediate errors. First, make sure the interface is remediating low level data entry errors. Second, make sure the feedback looks and feels different from the ICAT feedback. The interface feedback should look and feel like it is generated from the system while the ICAT feedback must look as if it were generated from an intelligent coach who is watching over the student as he works.

Creating the Target Group Hierarchy—Target groups are sets of targets which are evaluated as one. Returning to the severity principle of the feedback theory, it is clear that the tutor needs to identify how much of the activity the student does not understand. Is it a global problem and the student does not understand anything about the activity? Or, is it a local problem and the student simply is confused over one concept? Using the feedback algorithm described earlier, the tutor will return the highest target group in which there is feedback. This algorithm requires that the designer start with large target groups and make sub-groups which are children of the larger groups. The ICAT allows students to group targets in more than one category. Therefore a debit target for transaction thirteen can be in a target group for transaction thirteen entries as well as a target group about debits and a target group which includes all source documents. Target should be grouped with four key ideas in mind. Target groups are grouped according to: Concepts taught; Interface constraints; Avoidance of information overload and Positive reinforcement.

The most important issue when creating target groups is to create them along the concepts students need to know to achieve the goal. Grouping targets into groups which are analogous to the concepts a student needs to know, allows the tutor to review the concepts and see which concepts confuse the student. As a first step, a designer should identify in an unstructured manner all of the concepts in the domain. This first pass will be a large list which includes concepts at a variety of granularities, from small specific concepts to broad general concepts. These concepts are most likely directly related to the learning objectives of the course. With all of the concepts defined, designers need to identify all of the targets which are in each target group. Some targets will be in more than one target group. When a target is in more than one target group, it means that there is some type of relationship such as a child relationship or a part to whole relationship. The point is not to create a structured list of concepts but a comprehensive list. Structuring them into a hierarchy will be the second step of the process.

```
* Notes: Loads from Database or Document based on values
*        of m_StorageTypeTask and m_StorageTypeStudent
*
******************************************
*/
extern "C"
{
long _export WINAPI TuResumeStudent(long StudentID, long TaskID,
int fromSubmissionSeqID); // Resumes a
Student's work for the Task at the specified Submission
}
extern "C"
{
long export WINAPI TuLoadArchivedSubmissions(long StudentID,
long TaskID, int fromSubmissionSeqID, int
toSubmissionSeqID);
// Loads Archived Submissions For a Student's work in a Task
}
extern "C"
{
long _export WINAPI TuUseArchivedSubmissions(int n);
// Replays n Archived submissions for debugging
}
extern "C"
{
long _export WINAPI TuSaveCurrentStudent( );
// Saves Current Student's work to DB
}
extern "C"
{
long export WINAPI KillEngine(long ITaskID);
// Delete all Dynamic objects before shutdown
* Function Return
* Variables: TUT_ERR_OK
*
* Notes:
******************************************
*/
extern "C"
{
long _export WINAPI TuSetTaskDocPathName(LPCSTR fnm);
}
/*
******************************************
* Name: TuSetFeedbackFileName
* Purpose: To set path and name of file to use for holding feedback
* Input
* Parameters: LPCSTR fnm
* Path and name of file to use for holding feedback
* Output
* Parameters: none
*
* Function Return
* Variables: TUT_ERR_OK
*
* Notes:
******************************************
*/
extern "C"
{
long _export WINAPI TuSetFeedbackFileName(LPCSTR fnm);
}
/*
******************************************
* Name: TuSetFeedbackPrevFileName
* Purpose: To set path and name of file to use for
   holding previous feedback
* Input
* Parameters: LPCSTR fnm
* Path and name of file to use for holding previous feedback
* Output
* Parameters: none
```

-continued

```
*
* Function Return
* Variables: TUT_ERR_OK
* Notes:
******************************************
*/
extern "C"
{
long _export WINAPI TuSetFeedbackPrevFileName(LPCSTR fnm);
/*
******************************************
* Name: TuSetLogFileName
* Purpose: To set path and name of file to use for full logging
* Input
* Parameters: LPCSTR fnm
* Path and name of file to use for full logging
* Output
* Parameters: none
*
* Function Return
* Variables: TUT_ERR_OK
* Notes:
******************************************
*/
extern "C"
{
long _export WINAPI TuSetLogFileName(LPCSTR fnm);
}
/*
******************************************
* Name: TuSetLogLoadFileName
* Purpose: To set path and name of file to use for load logging
* Input
* Parameters: LPCSTR fnm
* Path and name of file to use for load logging
* Output
* Parameters: none
*
* Function Return
* Variables: TUT_ERR_OK
*
* Notes:
******************************************
*/
extern "C"
{
long _export WINAPI TuSetLogLoadFileName(LPCSTR fnm);
}
/*
******************************************
* Name: TuSetLogStudentFileName
* Purpose: To set path and name of file to use for student logging
* Input
* Parameters: LPCSTR fnm
* Path and name of file to use for student logging
* Output
* Parameters: none
*
* Function Return
* Variables: TUT_ERR_OK
*
* Notes:
******************************************
*/
extern "C"
{
long _export WINAPI TuSetLogStudentFileName(LPCSTR fnm);
}
/*
******************************************
* Name: TuSetLogSubmissionFileName
* Purpose: To set path and name of file to use for submission logging
* Input
* Parameters: LPCSTR fnm
* Path and name of file to use for submission logging
* Output
* Parameters: none
*
* Function Return
```

-continued

```
* Variables: TUT_ERR_OK
*
* Notes:
******************************************
*/
extern "C"
{
long _export WINAPI TuSetLogSubmissionFileName(LPCSTR fnm);
}
/*
******************************************
* Name: TuSetLogErrFileName
* Purpose: To set path and name of file to use for error logging
* Input
* Parameters: LPCSTR fnm
* Path and name of file to use for error logging
* Output
* Parameters: none
*
* Function Return
* Variables: TUT_ERR_OK
*Notes:
******************************************
*/
extern "C"
{
long _export WINAPI TuSetLogErrFileName(LPCSTR fnm);
}
/*
******************************************
*Name: TuSetTrace
* Purpose: To turn Trace on and off
* Input
* Parameters: int TraceStatus
* TUT_TRACE_ON: Turn Trace On
* TUT_TRACE_OFF: Turn Trace Off
* Output
* Parameters: none
*
* Function Return
* Variables: Previous Trace Status Value
* TUT_TRACE_ON
* TUT_TRACE_OFF
*
* TUT_ERR_INVALID_TRACE_STATUS
* Notes:
******************************************
*/
extern "C"
{
long _export WINAPI TuSetTrace(int TraceStatus);
}
/*
******************************************
* Name: TuSetTrack
* Purpose: To turn Tracking on and off. While tracking is on
* all work the user does and all feedback the user receives
* is kept. While Tracking is off only the most recent work is kept.
* Input
* Parameters: int TrackStatus
* TUT_TRACK_ON: Turn Tracking On
* TUT_TRACK_OFF: Turn Tracking Off
* Output
* Parameters: none
*
* Function Return
* Variables: Previous Trace Status Value
* TUT_TRACK_ON
* TUT_TRACK_OFF
*
* TUT_ERR_INVALID_TRACK_STATUS
* Notes:
******************************************
*/
extern "C"
{
long _export WINAPI TuSetTrack(int TrackStatus);
}
```

Simulation Engine

The idea is for the designer to model the task that he wants a student to accomplish using an Excel spreadsheet. Then, have an algorithm or engine that reads all the significant cells of the spreadsheet and notifies the Intelligent Coaching Agent with the appropriate information (SourceItemID, TargetID and Attribute). This way, the spreadsheet acts as a central repository for student data, contains most of the calculations required for the task and in conjunction with the engine handles all the communication with the ICA. The task is self contained in the spreadsheet, therefore the designers no longer need a graphical user interface to functionally test their designs (smart spreadsheet. Once the model and feedback for it are completely tested by designers, developers can incorporate the spreadsheet in a graphical user interface, e.g., Visual Basic as a development platform. The simulation spreadsheet is usually invisible and populated using functions provided by the engine. It is very important that all modifications that the ICA needs to know about go through the engine because only the engine knows how to call the ICA. This significantly reduced the skill level required from programmers, and greatly reduced the time required to program each task. In addition, the end-product was less prone to bugs, because the tutor management was centralized. If there was a tutor problem, we only had to check on section of code. Finally, since the simulation engine loaded the data from a spreadsheet, the chance of data inconsistency between the tutor and the application was nil.

Figure 25:
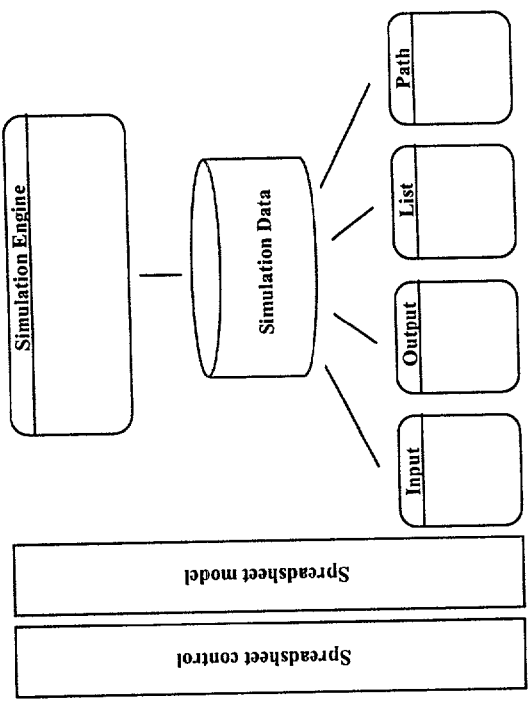
FIG. 25 is a block diagram setting forth the architecture of a simulation model in accordance with a preferred embodiment.

FIG. 25 is a block diagram setting forth the architecture of a simulation model in accordance with a preferred embodiment. The Simulation Object Model consists of a spreadsheet model, a spreadsheet control object, a simulation engine object, a simulation database, input objects, output objects, list objects and path objects. The first object in our discussion is the Spreadsheet object. The Spreadsheet is the support for all simulation models. A control object that is readily integrated with the Visual Basic development plat. The control supports printing and is compatible with Microsoft Excel spreadsheets. With that in mind, designers can use the power of Excel formulas to build the simulation. The different cells contained in the spreadsheet model can be configured as Inputs, Outputs or Lists and belong to a simulation Path. All cells in the spreadsheet that need to be manually entered by the designer or the student via the GBS application are represented by input objects. Every input has the following interface:

| Field Name | Data Type | Description |
| --- | --- | --- |
| InputID | long | Primary Key for the table |
| TaskID | long | TaskID of the task associated with the input |
| PathID | long | PathID of the path associated with the input |
| InputName | string*50 | Name of the input |
| InputDesc | string*255 | Description of the input |
| ReferenceName | string*50 | Name of the spreadsheet cell associated with the input |
| TutorAware | boolean | Whether the ICA should be notified of any changes to the input |
| SourceItemID | long | SourceItemID if input is a distinct input; 0 if input is a drag drop input |
| TargetID | long | TargetID of the input |
| Row | long | Spreadsheet row number of the input → speed optimization |

-continued

| Field Name | Data Type | Description |
|---|---|---|
| Column | long | Spreadsheet column number of the input → speed optimization |
| SheetName | string*50 | Sheet name were the input is located → speed optimization |

This information is stored for every input in the Input table of the simulation database (ICASim.mdb). Refer to the example below. When designers construct their simulation model, they must be aware of the fact that there are 2 types of Inputs: Distinct Input & Drag & Drop Input. The Distinct Input consists of a single spreadsheet cell that can be filled by the designer at design time or by the GBS application at run time via the simulation engine object's methods. The purpose of the cell is to provide an entry point to the simulation model. This entry point can be for example an answer to a question or a parameter to an equation. If the cell is TutorAware (all inputs are usually TutorAware), the ICA will be notified of any changes to the cell. When the ICA is notified of a change two messages are in fact sent to the ICA: An ICANotifyDestroy message with the input information i.e., SourceItemID, TargetID and null as Attribute. This message is to advise the ICA to remove this information from its memory. An ICANotifyCreate message with the input information i.e., SourceItemID, TargetID, Attribute (cell numeric value). This message is to advise the ICA to add this information to its memory. A Distinct Input never requires that a user answer a mathematics question.

These are the steps required to configure that simulation: Define a name for cell C2 in Excel. Here we have defined "Distinct_Input". In the ICA, define a task that will be assigned to the simulation. Ex: a TaskID of 123 is generated by the ICA. In the ICA, define a Target for the input. Ex: a TargetID of 4001 is generated by the ICA. In the ICA, define a SourceItem for the input. Ex: a SourceItemID of 1201 is generated by the ICA. Associate the input to a path (refer to Path object discussion). Add the information in the Input table of the simulation engine database. A record in an Input table is presented below.

| | |
|---|---|
| InputID: | 12345 |
| TaskID: | 123 |
| PathID: | 1234 |
| InputName: | Question 1 input |
| InputDesc: | Distinct input for Question 1 |
| ReferenceName: | Distinct_Input |
| TutorAware: | True |
| SourceItemID | 1201 |
| TargetID: | 4001 |
| Row: | 2 |
| Column: | 3 |
| SheetName: | Sheet1 |

The Row, Column and SheetName are filled in once the user clicks "Run Inputs/Outputs". The simulation engine decodes the defined name (Reference Name) that the designer entered, and populates the table accordingly. This is an important step. We had several occasions when a designer would change the layout of a spreadsheet, i.e., move a defined name location, then forget to perform this step. As such, bizarre data was being passed to the tutor; whatever data happened to reside in the old row and column. Once the configuration is completed, the designer can now utilize the ICA Utilities to test the simulation.

The drag & drop input consist of two consecutive spreadsheet cells. Both of them have to be filled by the designer at design time or by the GBS application at run time via the simulation engine object's methods. This type of input is used usually when the user must choose one answer among a selection of possible answers. Drag & drop inputs are always TutorAware. The left most cell contains the SourceItemID of the answer picked by the user (every possible answer needs a SourceItemID) and the rightmost cell can contain a numeric value associated to that answer. You need to define a name or ReferenceName in the spreadsheet for the rightmost cell. ICA will be notified of any changes to either one of the cells. When the ICA is notified of a change two messages are in fact sent to the ICA: An ICANotifyDestroy message with the input information i.e., SourceItemID before the change occurred, TargetID of the input and the Attribute value before the change occurred. An ICANotifyCreate message with the input information i.e., SourceItemID after the change occurred, TargetID of the input and the Attribute value after the change occurred.

These are the steps required to configure that section of the simulation: Define a name for cell C11 in Excel. Here we have defined "DragDrop_Input"; Let's use the same TaskID as before since Question 2 is part of the same simulation as Question 1. Ex: TaskID is 123; In the ICA, define a Target for the input. Ex: a TargetID of 4002 is generated by the ICA; In ICA, define a SourceItem for every possible answer to the question. Ex: SourceItemIDs 1202 to 1205 are generated by the ICA; Associate the input to a path (refer to Path object discussion); and Add the information in the Input table of the simulation engine database. A record in the Input table in accordance with a preferred embodiment is presented below.

| | |
|---|---|
| InputID: | 12346 |
| TaskID: | 123 |
| PathID: | 1234 |
| InputName: | Question 2 input |
| InputDesc: | Drag & Drop input for Question 2 |
| ReferenceName: | DragDrop_Input |
| TutorAware: | True |
| SourceItemID | 0*** |
| TargetID: | 4002 |
| Row: | 11 |
| Column: | 3 |
| SheetName: | Sheet1 |

The list object consists of one cell identifying the list (cell #1) and a series of placeholder rows resembling drag & drop inputs (cells #1.1-1.n to cells #n.1-n.n). The list is used usually when the user must choose multiple elements am selection of possible answers. Cell #1 must have a uniquely defined name also called the list name. Cells #1.1 to #n.1 can contain the SourceItemID of one possible answer picked by the user (every possible answer needs a SourceItemID). The content of these cells must follow this format: ~ListName~SourceItemID. Cells #1.2 to #n.2 will hold the numeric value (attribute) associated with the SourceItemID in the cell immediately to the left. Cells #1.3-1.n to #n.3-n.n are optional placeholders for data associated with the answer. KEY NOTE: When implementing a list object the designer must leave all the cells under #n.1 to #n.n blank because this range will shift up every time an item is removed from the list.

| Field Name | Data Type | Description |
| --- | --- | --- |
| ListID | long | Primary Key for the table |
| TaskID | long | TaskID of the task associated with the list |
| PathID | long | PathID of the path associated with the list |
| ListName | string*50 | Name of the list |
| ListDesc | string*255 | Description of the list |
| ReferenceName | string*50 | Name of the spreadsheet cell associated with the list |
| TutorAware | boolean | Whether the ICA should be notified of any changes to the list |
| TargetID | long | TargetID of the output |
| TotalColumns | long | Total number of data columns |
| Row | long | Spreadsheet row number of the output → speed optimization |
| Column | long | Spreadsheet column number of the output → speed optimization |
| SheetName | string*50 | Sheet name were the input is located → speed optimization |

Figures 26, 27:
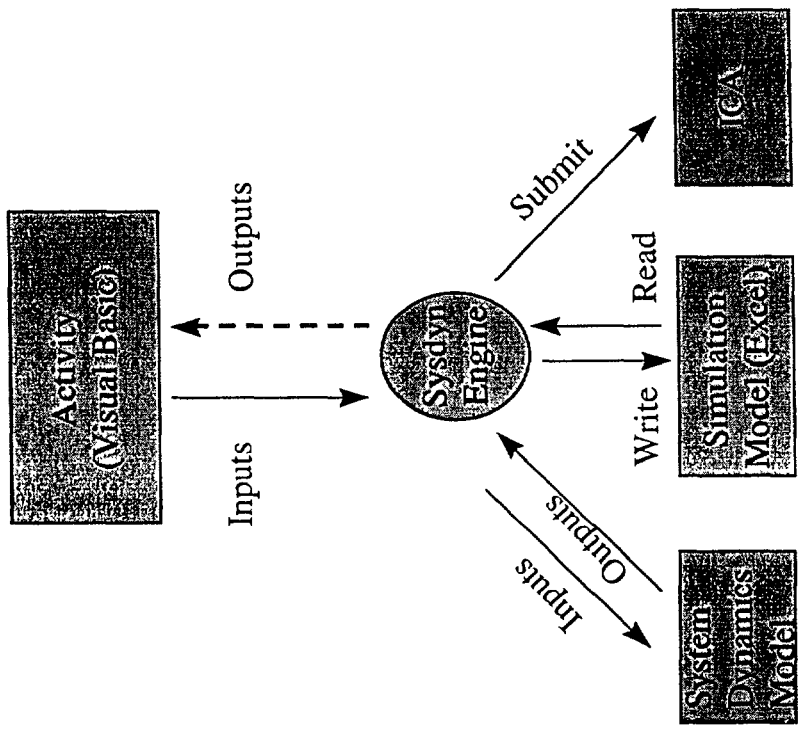
FIG. 26 illustrates the steps for configuring a simulation in accordance with a preferred embodiment.
FIG. 27 is a block diagram presenting the detailed architecture of a system dynamics model in accordance with a preferred embodiment.

Use of a list is demonstrated by continuing our math test. The math question in this example invites the user to select multiple elements to construct the answer. These are the steps required to configure that section of the simulation. FIG. 26 illustrates the steps for configuring a simulation in accordance with a preferred embodiment. Define a name for cell C23 in Excel. Here we have defined "The_List". Let's use the same TaskID as before since Question 3 is part of the same simulation as Question 1 and 2. Ex: TaskID is 123. In the ICA, define a Target for the list. Ex: a TargetID of 4006 is generated by the ICA. In the ICA, define a SourceItem for every item that could be placed in the list. Ex: the following SourceItemIDs 1209, 1210, 1211, 1212, 1213, 1214 are generated by the ICA. Associate the list to a path (refer to Path object discussion). Add the information in the List table of the simulation engine database.

A record in the List table in accordance with a preferred embodiment is presented in the table appearing below.

| | |
| --- | --- |
| ListID: | 12346 |
| TaskID: | 123 |
| PathID: | 1234 |
| ListName: | Question 3 list |
| ListDesc: | List for Question 3 |
| ReferenceName: | The_List |
| TutorAware: | True |
| TargetID: | 4006 |
| TotalColumns: | 1 |
| Row: | 23 |
| Column: | 3 |
| SheetName: | Sheet1 |

All cells in the spreadsheet that are result of calculations (do not require any external input) can be represented by output objects. Every output has an interface as outlined in the table below.

| Field Name | Data Type | Description |
| --- | --- | --- |
| OutputID | long | Primary Key for the table |
| TaskID | long | TaskID of the task associated with the output |
| PathID | long | PathID of the path associated with the output |
| OutputName | string*50 | Name of the output |
| OutputDesc | string*255 | Description of the output |
| ReferenceName | string*50 | Name of the spreadsheet cell associated with the output |
| TutorAware | boolean | Whether the CA should be notified of any changes to the output |
| SourceItemID | long | SourceItemID of the output |
| TargetID | long | TargetID of the output |
| Row | long | Spreadsheet row number of the output → speed optimization |
| Column | long | Spreadsheet column number of the output → speed optimization |
| SheetName | string*50 | Sheet name were the input is located → speed optimization |

All this information is stored for every output in the Output table of the simulation database (ICASim.mdb). When designers construct their simulation model, they must be aware of the fact that there is only 1 type of Outputs: the Distinct Output. A Distinct Output consists of one and only one spreadsheet cell that contains a formula or a result of calculations. The existence of Output cells is the main reason to have a simulation model. If the cell is TutorAware, the ICA will be notified of any changes to the cell when all outputs are processed otherwise the ICA will be unaware of any changes. When the ICA is notified of a change two messages are in fact sent to the ICA: An ICANotifyDestroy message with the output information i.e., SourceItemID, TargetID and null as Attribute. This message is to advise the ICA to remove this information from its memory. An ICANotifyCreate message with the output information i.e., SourceItemID, TargetID, Attribute (cell numeric value). This message is to advise the ICA to add this information to its memory. As opposed to Distinct Inputs and Drag & Drop Inputs which notify the ICA on every change, Distinct Outputs are processed in batch just before asking the ICA for feedback. To notify the ICA of the total dollar amount of the items in the list. We definitely need a Distinct Output for that. The output will contain a sum formula. Define a name for cell C24 in Excel. Here we have defined "Distinct_Output". Let's use the same TaskID as before since Question 3 is part of the same simulation as Question 1 and 2. Ex: TaskID is 123. In the ICA, define a Target for the output. Ex a TargetID of 4005 is generated by the ICA. In the ICA, define a SourceItem for the output. Ex: a SourceItemID of 1215 is generated by the ICA. Associate the output to a path (refer to Path object discussion). Add the information in the Output table of the simulation engine database.

A record in an Output table in accordance with a preferred embodiment is presented below.

| | |
| --- | --- |
| OutputID: | 12347 |
| TaskID: | 123 |
| PathID: | 1234 |
| OutputName: | Question 3 output |
| OutputDesc: | Distinct Output for Question 3 |
| ReferenceName: | Distinct_Output |
| TutorAware: | True |
| SourceItemID | 1215 |
| TargetID: | 4005 |
| Row: | 24 |
| Column: | 6 |
| SheetName: | Sheet1 |

Paths are used to divide a simulation model into sub-Simulations meaning that you can group certain inputs, outputs and lists together to form a coherent subset or path. Every path has the following interface:

| Field Name | Data Type | Description |
| --- | --- | --- |
| PathID | long | Primary Key for the table |
| TaskID | long | TaskID of the task associated with the path |
| PathNo | long | Numeric value associated to a path |
| PathName | string*50 | Name of the path |
| PathDesc | string*255 | Description of the path |

All this information is stored for every path in the path table of the simulation database (ICASim.mdb).

The simulation engine is the interface between the model, the simulation database and the Intelligent Coaching Agent. The simulation engine is of interest to the designer so that he can understand the mechanics of it all. But it is the developer of applications using the engine that should know the details of the interface (methods & properties) exposed by the engine and the associated algorithms. Once the designer has constructed the simulation model (Excel Spreadsheet) and configured all the inputs, outputs & lists, he is ready to test using the test bench included in the ICA Utilities (refer to ICA Utilities documentation). The developer, in turn, needs to implement the calls to the simulation engine in the GBS application he's building. The following list identifies the files that need to be included in the Visual Basic project to use the simulation workbench:

| | |
| --- | --- |
| wSimEng.cls | Simulation Engine class |
| wSimEng.bas | Simulation Engine module (this module was introduced only for speed purposes because all the code should theoretically be encapsulated in the class) |
| wConst.bas | Intelligent Coaching Agent constant declaration |
| wDeclare.bas | Intelligent Coaching Agent DLL interface |
| wlca.cls | Intelligent Coaching Agent class |
| wlca.bas | Intelligent Coaching Agent module (this module was introduced only for speed purposes because all the code should theoretically be encapsulated in the class) |

To have a working simulation, a developer places code in different strategic areas or stages of the application. There's the Initial stage that occurs when the form containing the simulation front-end loads. This is when the simulation model is initialized. There's the Modification stages that take place when the user makes changes to the front-end that impacts the simulation model. This is when the ICA is notified of what's happening. There's the Feedback stage when the user requests information on the work done so far. This is when the simulation notifies the ICA of all output changes. Finally, there's the Final stage when the simulation front-end unloads. This is when the simulation is saved to disk.

The different stages of creating a simulation, including the Visual Basic code involved, are presented below. Initial stage; 1. Creating the ICA & the simulation engine object: Code: Set moSimEngine=New classSimEngine; Set moICA=New classICA; Description: The first step in using the simulation engine is to create an instance of the class classSimEngine and also an instance of the class classICA. Note that the engine and ICA should be module level object "mo" variables. 2. Loading the simulation; Code: IRet=moSimEngine.OpenSimulation(App.Path & DIR_DATA & FILE_SIMULATION, Me.bookSimulation); IRet=moSimEngine.LoadSimulation(mIICATaskID, App.Path & DIR_DATABASE & DB_SIMULATION, 1); Description: After the object creation, the OpenSimulation and LoadSimulation methods of the simulation engine object must be called. The OpenSimulation method reads the specified Excel 5.0 spreadsheet file into a spreadsheet control. The LoadSimulation method opens the simulation database and loads into memory a list of paths, a list of inputs, a list of outputs and a list of lists for the specific task. Every method of the simulation engine will return 0 if it completes successfully otherwise an appropriate error number is returned. 3. Initializing and loading the Intelligent Coaching Agent; Code:IRet=moICA.Initialize(App.Path & "\" & App.EXEName & ".ini", App.Path & DIR_DATABASE, App.Path & DIR_ICADOC, App.Path & "\"); IRet=moICA.LoadTask (mIICATaskID, ICAStudentStartNew); Description: The simulation engine only works in conjunction with the ICA. The Initialize method of the ICA object reads the application .ini file and sets the Tutor32.dll appropriately. The LoadTask method tells the ICA (Tutor32.dll) to load the tut document associated to a specific task in memory. From that point on, the ICA can receive notifications. Note: The .tut document contains all the element and feedback structure of a task. Ex: SourcePages, SourceItems, TargetPages, Targets, etc. . . . 4. Restoring the simulation; Code: <<Code to reset the simulation when starting over>>; <<Code to load the controls on the simulation front-end>>; IRet=moSimEngine.RunInputs (sPaths, True); IRet=moSimEngine.RunOutputs(sPaths, True); IRet=moSimEngine.RunLists(sPaths, True); Call moICA.Submit(0); Call moICA.SetDirtyFlag(0, False); Description: Restoring the simulation involves many things: clearing all the inputs and lists when the user is starting over; loading the interface with data from the simulation model; invoking the RunInputs, RunOutputs and RunLists methods of the simulation engine object in order to bring the ICA to it's original state; calling the Submit method of the ICA object with zero as argument to trigger all the rules; calling the SetDirtyFlag of the ICA object with 0 and false as arguments in order to reset the user's session. Running inputs involves going through the list of TutorAware inputs and notifying the ICA of the SourceItemID, TargetID and Attribute value of every input. Running lists involves going through the list of TutorAware lists and notifying the ICA of the SourceItemID, TargetID and Attribute value of every item in every list. The TargetID is unique for every item in a list.

Running outputs involves going through the list of TutorAware outputs and notifying the ICA of the SourceItemID, TargetID and Attribute value of every output. Modification stage 1. Reading inputs & outputs; Code: Dim sDatarray(2) as string; Dim vAttribute as variant; Dim ISourceItemID as long; Dim ITargetID as long; IRet=moSimEngine.ReadReference("Distinct_Input", vAttribute, ISourceItemID, ITargetID, sDataArray)

Description: The ReadReference method of the simulation object will return the attribute value of the input or output referenced by name and optionally retrieve the SourceItemID, TargetID and related data. In the current example, the attribute value, the SourceItemID, the TargetID and 3 data cells will be retrieved for the input named Distinct_Input.

Description: The simulation engine object provides basic functionality to manipulate lists.

The ListAdd method appends an item(SourceItemID, Attribute, Data array) to the list. Let's explain the algorithm. First, we find the top of the list using the list name. Then, we seek the first blank cell underneath the top cell. Once the destination is determine, the data is written to the appropriate cells and the ICA is notified of the change. The ListCount method returns the number of items in the specified list. The algorithm works exactly like the ListAdd method but returns the total number of items instead of inserting another element. The ListModify method replaces the specified item with the provided data. Let's explain the algorithm. First, we find the top of the list using the list name. Second, we calculate the row offset based on the item number specified. Then, the ICA is notified of the removal of the existing item. Finally, the data related to the new item is written to the appropriate cells and the ICA is notified of the change. The ListDelete method removes the specified item. The algorithm works exactly like the ListModify method but no new data is added and the cells (width of the list set by 'Total Columns') are deleted with the 'move cells up' parameter set to true. Keep this in mind, as designers often enter the wrong number of columns in the Total Columns parameter. When they overestimate the Total Columns, ListDelete will modify portions of the neighboring list, which leads to erratic behavior when that list is displayed.

System Dynamics in Accordance with a Preferred Embodiment

To use system dynamics models in the architecture, an engine had to be created that would translate student work into parameters for these models. A complex system dynamics model to interact with an existing simulation architecture is discussed below. The system dynamics model provides the following capabilities. Allow designers to build and test their system dynamics models and ICA feedback before the real interface is built. Reduce the programming complexity of the activities. Centralize the interactions with the system dynamics models. System Dynamics Engine As with the simulation engine, the designer models the task that he/she wants a student to accomplish using a Microsoft Excel spreadsheet. Here, however, the designer also creates a system dynamics model (described later). The system dynamics engine will read all of the significant cells within the simulation model (Excel) and pass these values to the system dynamics model and the ICA. After the system dynamics model runs the information, the output values are read by the engine and then passed to the simulation model and the ICA.

FIG. 27 is a block diagram presenting the detailed architecture of a system dynamics model in accordance with a preferred embodiment. Once the simulation model, system dynamics model and feedback are completely tested by designers, developers can incorporate the spreadsheet in a graphical user interface, e.g., Visual Basic as a development platform. FIG. 27 illustrates that when a student completes an activity, the values are passed to the system dynamics engine where the values are then passed to the system dynamics model (as an input), written to the simulation model and submitted to the ICA. When the system dynamics model is played, the outputs are pulled by the engine and then passed to the simulation model and the ICA. Note that the simulation model can analyze the output from the system dynamics model and pass the results of this analysis to the ICA as well. The simulation model can then be read for the output values and used to update on-screen activity controls (such as graphs or reports). It is very important that all modifications that the ICA and system dynamics model need to know about go through the engine because only the engine knows how to call these objects. This significantly reduces the skill level required from programmers, and greatly reduces the time required to program each task. In addition, the end-product is less prone to bugs, because the model and tutor management will be centralized. If there is a problem, only one section of code needs to be checked. Finally, since the engine loads the data from the spreadsheet, the chance of data inconsistency between the ICA, the system dynamics model and the application is insignificant.

The system dynamics model generates simulation results over time, based on relationships between the parameters passed into it and other variables in the system. A system dynamics object is used to integrate with Visual Basic and the spreadsheet object. The object includes logic that controls the time periods as well as read and write parameters to the system dynamics model. With Visual Basic, we can pass these parameters to and from the model via the values in the simulation object. The system dynamics object also controls the execution of the system dynamics model. What this means is that after all of the parameter inputs are passed to the system dynamics model, the engine can run the model to get the parameter outputs. The system dynamics object allows for the system dynamics models to execute one step at a time, all at once, or any fixed number of time periods. When the system dynamics model runs, each step of the parameter input and parameter output data is written to a 'backup' sheet for two reasons. First, the range of data that is received over time (the model playing multiple times) can be used to create trend graphs or used to calculate statistical values. Second, the system dynamics model can be restarted and this audit trail of data can be transmitted into the model up to a specific point in time. What this means is that the engine can be used to play a simulation back in time. When any event occurs within the system dynamics engine, a log is created that tells the designers what values are passed to the simulation model, system dynamics model and ICA as well as the current time and the event that occurred. The log is called "SysDyn.log" and is created in the same location as the application using the engine. As with the spreadsheet object, the system dynamics object allows a large amount of the calculations to occur in the system dynamics model and not in the activity code, again placing more control with the activity designers. Model objects are used to configure the system dynamics models with regard to the time periods played. Models are what the parameter inputs and parameter outputs (discussed later) relate to, so these must be created first. Every model has the following application programming interface:

| Field Name | Data Type | Description |
| --- | --- | --- |
| ModelID | Long | Primary Key for the table |
| TaskID | Long | TaskID of the task associated with the model |
| ModelName | String*50 | Name of the model (informational purposes) |
| ModelDesc | String*50 | Description of the model (informational purposes) |
| SysDynModel | String*50 | Filename of the actual system dynamics model |
| Start | Long | Start time to play modal |
| Stop | Long | Stop time to play model |
| Step | Long | Interval at which to play one model step and record data |

This information is stored in the model table of the simulation database (ICASim.mdb). All of the values that will need to be manually entered by the student that are passed into the system dynamics model are configured as parameter inputs (PInputs) objects. Every PInput has an interface as detailed below.

| Field Name | Data Type | Description |
| --- | --- | --- |
| PInputID | long | Primary Key for the table |
| TaskID | long | TaskID of the task associated with the parameter input |
| ModelID | long | ID of the model associated with the parameter input |
| InputName | string*50 | Name of the parameter input (informational purposes) |
| InputDesc | string*255 | Description (informational purposes) |
| ReferenceName | string*50 | Name of the spreadsheet cell associated with the parameter input[1] |
| SimReferenceName | string*50 | Name of the associated parameter in the system dynamics model |
| TutorAware | boolean | Whether the ICA should be notified of any input CHANGES |
| SourceItemID | ong | SourceItemID of the parameter input |
| TargetID | long | TargetID of the parameter input |
| Row | long | Spreadsheet row number of the parameter input |
| Column | long | Spreadsheet column number of the parameter input |
| SheetName | string*50 | Sheet name were the parameter input is located |

All of this information is stored for every parameter input in the PInput table of the simulation database (ICASim.mdb). PInputs consist of one spreadsheet cell that can be populated by a designer at design time or by the GBS application at run time via the system dynamics engine object's methods. The purpose of the cell is to provide an entry point to the simulation and via system dynamics models. An example of an entry point would be the interest rate parameter in the interest calculation example. The ICA is notified of any changes to the cell when an appropriate activity transpires. When the ICA is notified of a change two messages are sent to the ICA. The first is an ICANotifyDestroy message with the parameter input information i.e., SourceItemID, TargetID and null as an attribute. This message is sent to inform the ICA to remove information from its memory. The second message is an ICANotifyCreate message with the parameter input information i.e., SourceItemID, TargetID, Attribute (cell numeric value). This message advises the ICA to add this information to its memory. A PInput table record in accordance with a preferred embodiment is presented below.

```
PInputID:        12345
TaskID:          123
ModelID:         1
InputName:       Interest Rate input
InputDesc:       Interest Rate input into interest calculation model
ReferenceName:   Interest_Rate
SimReferenceName Param_Interest_Rate
TutorAware:      True
SourceItemID:    \1201
TargetID:        4001
Row:             6
Column:          3
SheetName:       Sheet1
```

Once the configuration is completed, the designer can also use the ICA Utilities to test the simulation. The Row, Column and SheetName values are automatically populated when the designer runs the parameters in the System Dynamics Workbench in the ICA Utilities. The following information provides details describing the interaction components in accordance with a preferred embodiment.

| Title | Description |
| --- | --- |
| Procedural tasks (w/drag drop) | Tasks which require the construction of some kind of report with evidence dragged and dropped to justify conclusions |
| Procedural tasks (w/o drag drop) | New task designs that are procedural in nature, have very little branching, and always have a correct answer. |
| Ding Dong task | Tasks that interrupt the student while working on something else. This template includes interviewing to determine the problem, and a simple checkbox form to decide how to respond to the situation. |
| Analyze and Decide (ANDIE) task | Most commonly used for static root cause analysis, or identification tasks. Developed on SBPC as a result of 3 projects of experience redesigning for the same skill. |
| Evaluate Options (ADVISE) | Used for tasks that require learner to evaluate how different options meet stated goals or requirements. Developed at SBPC after 4 projects experience redesigning for the same skill. Does not allow drag drop as evidence. |
| Run a company task | Time based simulation where student "chooses own adventure". Each period the student selects from a pre-determined list of actions to take. Developed on SBPC as a simplified version of the BDM manage task. |
| Use a model task | When user needs to interact with a quantitative model to perform what if analysis. May be used for dynamic root cause analysis - running tests on a part to analyze stress points. |
| ICA Dynamic Meeting Task | Developed on BDM to mimic interaction styles from Coach and ILS EPA. Supports dynamic-rule based branching - will scale to support interactions like EnCORE defense meetings and YES. |
| Manage Task | Time based simulation where student manages resources. Human Resources Management, managing a budget, manage an FX portfolio. |
| QVID Static Meeting Task | Developed on Sim2 to support agenda-driven meetings where user is presented with up to 5 levels of follow-up questions to pursue a line of questioning. As they ask each question, it's follow-ups appear. |
| Flow Chart Task | Will support most VISIO diagrams. Developed on Sim2 to support simple flow chart decision models. |
| QVID Gather Data Component | Static flat list of questions to ask when interviewing someone. Not used when interviewing skills are being taught (use QVID Static meeting task). Supports hierarchical questions and timed transcripts. |
| Journalize Task | Created to support simple journal entry tasks with up to 2 accounts per debit or credit. |
| New Complex Task | A new task that requires a simulation component |

The system dynamics engine is the interface between the simulation model, the system dynamics model, the simulation database and the Intelligent Coaching Agent. The system dynamics engine is of interest to the designer so that she can understand the mechanics of it. Once the designer has constructed the simulation model (Excel Spreadsheet), built the system dynamics model (PowerSim) and configured all of the parameter inputs and parameter outputs, a test can be performed using the workbench included in the ICA Utilities (refer to ICA Utilities documentation). The developers, in turn, need to implement the calls to the system dynamics engine in the GBS application that is being built. The following list identifies the files that need to be included in the Visual Basic project to use the system dynamics engine.

| | |
| --- | --- |
| WSysDynEng.cls | System dynamics Engine class |
| wSysDynEng.bas | System dynamics Engine module (this module was introduced only for speed purposes because all the code should theoretically be encapsulated in the class) |

| | |
|---|---|
| wConst.bas | Intelligent Coaching Agent constant declaration |
| wDeclare.bas | Intelligent Coaching Agent DLL interface |
| wlca.cls | Intelligent Coaching Agent class |
| wlca.bas | Intelligent Coaching Agent module (this module was introduced only for speed purposes because all of the code should theoretically be encapsulated in the class) |

To utilize the system dynamics engine fully, the developer must place code in different strategic areas or stages of the application. Initial stage—the loading of the form containing the simulation front-end. This is when the simulation model and system dynamic engine are initialized. Modification stage—Takes place when the user makes changes to the front-end that impacts the simulation model PInputs). This is when the ICA is notified of what's happening. Run stage—The system dynamics model is run and parameter outputs are received. Feedback stage—The user requests feedback on the work that they have performed. This is when the simulation notifies the ICA of all output changes. Final stage—The simulation front-end unloads. This is when the simulation model is saved. These stages will be explained by including the Visual Basic code involved as well as a short description of that code.

Initial Stage Code in Accordance with a Preferred Embodiment

1. Creating the ICA & the simulation engine objects: Code: Set moSysDynEngine=New classSysDynEngine; Set moICA=New classICA; Description: The first step in using the system dynamics engine is to create an instance of the classSysDynEngine class and also an instance of the classICA class. Note that the engine and ICA should be module level object "mo" variables. 2. Loading the simulation: Code: IRet=moSysDynEngine.OpenSimulation(FILE_SIM, Me.bookSim, True); IRet=moSysDynEngine.LoadSysDyn (mIICATaskID, DB_SIMULATION, 1); IRet=moSysDynEngine.LoadModel(MODEL_NAME,mb-TaskStarted); Description: After the object creation, the OpenSimulation, LoadSimulation and LoadModel methods of the system dynamics engine object must be called. The OpenSimulation method reads the specified Excel 5.0 spreadsheet file (FILE_SIM) into a spreadsheet control (bookSim). The LoadSysDyn method opens the simulation database (DB_SIMULATION) and loads into memory a list of parameter inputs and a list of parameter outputs. The LoadModel method opens a system dynamics model (MODEL_NAME). Every method of the system dynamics engine will return 0 if it completes successfully otherwise an appropriate error number is returned. 3. Initializing and loading the Intelligent Coaching Agent; Code: IRet=moICA.Initialize(App.Path & "\" & App.EXEName & ".ini", App.Path & DIR_DATABASE, App.Path & DIR_ICADOC, App.Path & "\"); IRet=moICA.LoadTask(mIICATaskID, ICAStudentStart-New); Description: The system dynamics engine only works in conjunction with the ICA. The Initialize method of the ICA object reads the application .ini file and sets the Tutor32.dll appropriately. The LoadTask method tells the ICA (Tutor32.dll) to load the .tut document associated to a specific task in memory. From that point on, the ICA can receive notifications. Note: The .tut document contains all the element and feedback structure of a task. Ex: SourcePages, SourceItems, TargetPages, Targets, etc. . . . 4. Restoring the simulation—Code: IRet=moSysDynEngine.RunPInputs (MODEL_NAME, True); IRet=moSysDynEngine. RunPOutputs(MODEL_NAME, True); IRet=moSysDynEngine.PassPInputsAll; Call moICA.Submit(0); Call moICA.SetDirtyFlag(0, False) Description: Restoring the simulation involves many things: clearing all of the parameter inputs and outputs when the user is starting over; loading the interface with data from the simulation model; invoking the PassPInputsAll method of the system dynamics engine object in order to bring the ICA to its original state; invoking the RunPInputs and RunPOutputs methods of the system dynamics engine object in order to bring the system dynamics model to it's original state; calling the Submit method of the ICA object to trigger the ICA to play all of the rules; calling the SetDirtyFlag of the ICA object to reset the user's session. Running parameters involves going through the list of TutorAware PInputs and POutputs and notifying the ICA of the SourceItemID, TargetID and Attribute value of every one. Modification Stage; 1. Reading parameter inputs & outputs; Code: Dim sDataArray(2) as string; Dim vAttribute as variant; Dim ISourceItemID as long, ITargetID as long IRet=moSysDynEngine.ReadReference("Input_Name", vAttribute, ISourceItemID, ITargetID, sDataArray). Description: The ReadReference method of the system dynamics object will return the attribute value of the parameter input or output referenced by name and optionally retrieve the SourceItemID, TargetID and related data. In the current example, the attribute value, the SourceItemID, the TargetID and 3 data cells will be retrieved for the parameter input named Input_Name. 2. Modifying parameter inputs Code: Dim vAttribute as variant; Dim ISourceItemID as long; Dim sDataArray(2) as string; vAttribute=9999; sDataArray(0)="Data Cell #1"; sDataArray(1)="Data Cell #2"; sDataArray(2)="Data Cell #3"; IRet=moSysDynEngine. WriteReference ("Input_Name", vAttribute, sDataArray). Description: To modify a parameter input, call the WriteReference method of the system dynamics object and pass the PInput reference name, the new attribute value and optionally a data array (an additional information to store in the simulation model). The system dynamics engine notifies the ICA of the change. Run Stage 1. Playing the System Dynamics Model; Code: IRet=moSysDynEngine.PlayModel(SYSDYN_PLAY-STEP); lblCurrentTime.Caption= moSysDynEngine.CurrentTime; and lblLastTime.Caption= moSysDynEngine.LastTime; Description: Playing the system dynamics model is also handled by the system dynamics engine. There are three ways that the models can be played, all at once, one step at a time (shown above) or until a specific point in time. These are the parameters that are passed into the PlayModel method. Playing of the model generates the parameter output values and passes the TutorAware POutputs to the ICAT. The engine also keeps track of time and these values can be read using the CurrentTime and LastTime properties. 2. Jumping Back in a System Dynamics Model Code: IRet=moiCA.LoadTask(mIICATaskID, ICAStudentStart-New); IRet=moSysDynEngine.JumpBack(TIME_TO_JUMP_TO). Description: Because the system dynamics engine writes backup copies of the parameters passed to and from it, it can start over and resubmit these values back to the system dynamics model until a given period of time. To do this, the code would need to restart the ICA and then call the system dynamics engine to jump back to a given time (TIME_TO_JUMP_TO). Feedback stage 1. Triggering the ICA Rule engine; Code: IRet=moICA.Submit(ICoachID); Description: Once the simulation has been processed, the Submit method of the ICA object must be called to trigger all the rules and deliver the feedback. This feedback will be written by the Tutor32.dll to two RTF formatted files. One file for previous feedback and one file for the current feedback.

ICA Configuration in Accordance with a Preferred Embodiment

Figure 29:
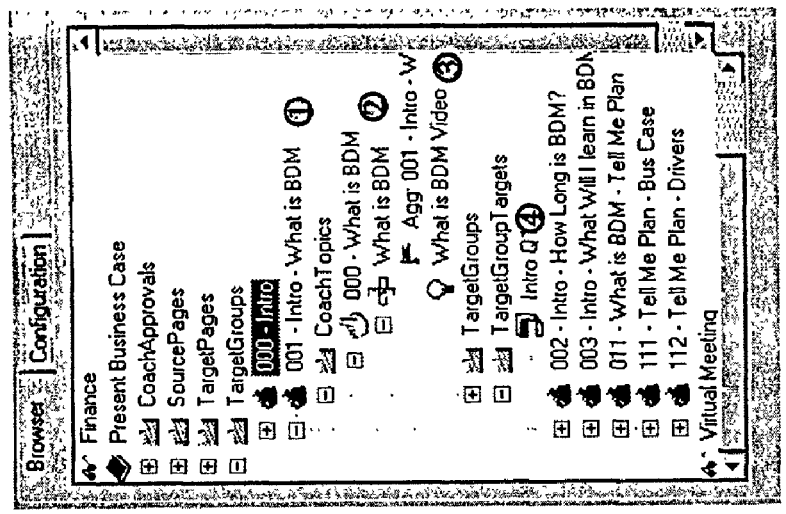
FIG. 29 is a display of video information in accordance with a preferred embodiment.
Figure 28:
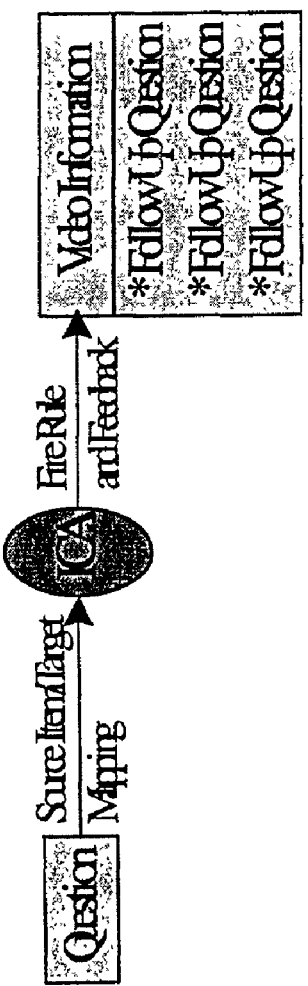
FIG. 28 is an overview diagram of the logic utilized for initial configuration in accordance with a preferred embodiment.
Figure 30:
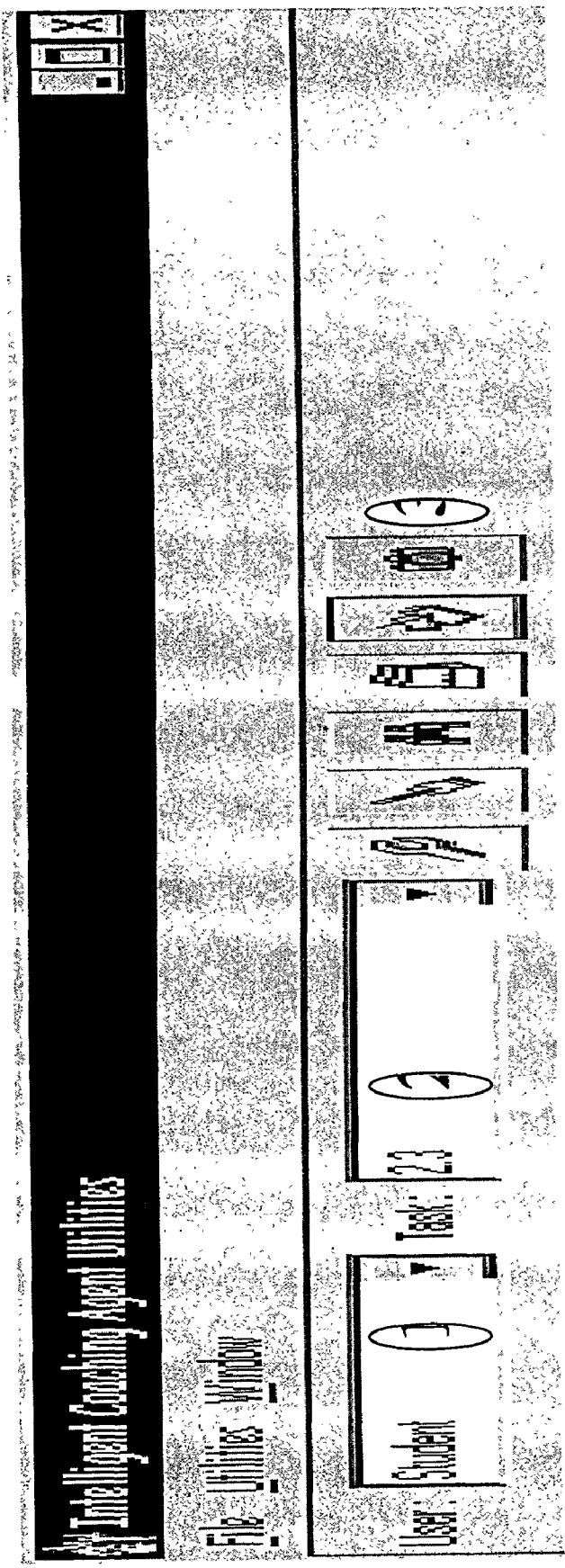
FIG. 30 illustrates an ICA utility in accordance with a preferred embodiment.

FIG. 28 is an overview diagram of the logic utilized for initial configuration in accordance with a preferred embodiment. Since the structure of the feedback is the same as other on-line activities, the ICA can also be configured in the same manner. For ease of creation and maintenance of ICA feedback, it is recommended that the feedback is constructed so that only one rule fires at any point in time. Note that the organization of the example is one of many ways to structure the feedback. Step 1: Create a map of questions and follow-up questions; Before designers start configuring the ICA, they should draw a map of the questions, videos and follow-up questions that they wish to use in the on-line meeting. This will give them a good understanding of the interactions as they configure the ICA. Step 2: Create a coach; All feedback is given by a coach. Create a specific coach for the on-line meeting. Step 3: Create the Source Items and Targets Every question will have one Source Item (1) and Target (2) associated with it. These will be used by the ICA to show videos and follow-up questions. For organizational purposes and ease of reading, it is recommended that each Source Page ("0 Intro") contain all of the follow up questions ("Intro Q1", "Intro Q2", "Intro Q3"). Targets can be created one per Source Item (shown here) or one per many Source Items. This is not very important, so long as there are distinct Source Item and Target associations. Once the Source Items and Targets have been created, associate them into SourceItemTargets (3) and give them a relevance of one. These are the unique identifiers which the ICA will use to fire rules and to provide feedback to the student. Step 4: Create the Parent Header (Video Information) FIG. 29 is a display of video information in accordance with a preferred embodiment. Feedback (Coach Items) are organized into Target Groups (1). In FIG. 29, each on-line question has one Target Group for ease of maintenance. Each TargetGroup must have at least one related Target (4). These are the SourceItemTarget mappings that were made at the end of Step 3. Next, Rules (2) are created to fire when the SourceItemTarget is mapped (a question is clicked). Coach Items (3) are associated to a rule and represent the feedback which will be shown if the rule is fired. The ICA Utilities incorporate business simulation into a multimedia application. What this means is that there is now a middle layer between the application and the ICAT. These utilities, along with the simulation engine (described later), allow the architecture to be a front end to the simulation. Now, any changes to a simulation model do not need to be incorporated into code. The ICA Utilities and simulation engine work with simulation models created in Microsoft Excel. After the model is created, the designer uses the Defined Name function in Excel to flag specific cells that are to be used by the application and the ICA Utilities in accordance with a preferred embodiment. FIG. 30 illustrates an ICA utility in accordance with a preferred embodiment. The ICA Utilities consist of six utilities that work with the Intelligent Coaching Agent Tool (ICAT) to incorporate business simulation with the multimedia application.

What is claimed is:

1. A computer-readable medium for creating a presentation and having computer-executable instructions for performing the steps comprising:
   (a) receiving an indicia representative of a store goal, the indicia identifying training that is associated with the store goal, the store goal corresponding to a student being trained in an aspect of inventory administration for a store;
   (b) integrating retail information that provides assistance with achieving the store goal;
   (c) monitoring progress of the student toward the store goal;
   (d) providing feedback assisting the student in accomplishing the store goal; and
   (e) comprising indexing media information to enhance the integration of the media information into the presentation.

2. A computer-readable medium for creating a presentation and having computer-executable instructions for performing the steps comprising:
   (a) receiving an indicia representative of a store goal, the indicia identifying training that is associated with the store goal, the store goal corresponding to a student being trained in an aspect of inventory administration for a store;
   (b) integrating retail information that provides assistance with achieving the store goal;
   (c) monitoring progress of the student toward the store goal; and
   (d) providing feedback assisting the student in accomplishing the store goal,
   wherein inventory control is integrated into the presentation.

3. A computer-readable medium for creating a presentation and having computer-executable instructions for performing the steps comprising:
   (a) receiving an indicia representative of a store goal, the indicia identifying training that is associated with the store goal, the store goal corresponding to a student being trained in an aspect of inventory administration for a store;
   (b) integrating retail information that provides assistance with achieving the store goal;
   (c) monitoring progress of the student toward the store goal; and
   (d) providing feedback assisting the student in accomplishing the store goal,
   wherein pricing strategy is integrated into the presentation.

4. A computer-readable medium for creating a presentation and having computer-executable instructions for performing the steps comprising:
   (a) receiving an indicia representative of a store goal, the indicia identifying training that is associated with the store goal, the store goal corresponding to a student being trained in an aspect of inventory administration for a store;
   (b) integrating retail information that provides assistance with achieving the store goal;
   (c) monitoring progress of the student toward the store goal; and
   (d) providing feedback assisting the student in accomplishing the store goal,
   wherein return on revenue is integrated into the presentation.

5. A computer-readable medium for creating a presentation and having computer-executable instructions for performing the steps comprising:
   (a) receiving an indicia representative of a store goal, the indicia identifying training that is associated with the store goal, the store goal corresponding to a student being trained in an aspect of inventory administration for a store;
   (b) integrating retail information that provides assistance with achieving the store goal;

(c) monitoring progress of the student toward the store goal; and
(d) providing feedback assisting the student in accomplishing the store goal,
wherein markdown is integrated into the presentation.

6. A computer-readable medium for creating a presentation and having computer-executable instructions for performing the steps comprising:
(a) receiving an indicia representative of a store goal, the indicia identifying training that is associated with the store goal, the store goal corresponding to a student being trained in an aspect of inventory administration for a store;
(b) integrating retail information that provides assistance with achieving the store goal;
(c) monitoring progress of the student toward the store goal; and
(d) providing feedback assisting the student in accomplishing the store goal,
wherein stocking is integrated into the presentation.

7. A computer-readable medium for creating a presentation and having computer-executable instructions for performing the steps comprising:
(a) receiving an indicia representative of a store goal, the indicia identifying training that is associated with the store goal, the store goal corresponding to a student being trained in an aspect of inventory administration for a store;
(b) integrating retail information that provides assistance with achieving the store goal;
(c) monitoring progress of the student toward the store goal; and
(d) providing feedback assisting the student in accomplishing the store goal,
wherein assortment strategy is integrated into the presentation.

8. A computer-readable medium for creating a presentation and having computer-executable instructions for performing the steps comprising:
(a) receiving an indicia representative of a store goal, the indicia identifying training that is associated with the store goal, the store goal corresponding to a student being trained in an aspect of inventory administration for a store;
(b) integrating retail information that provides assistance with achieving the store goal;
(e) monitoring progress of the student toward the store goal;
(d) providing feedback assisting the student in accomplishing the store goal; and
(e) adjusting an example based on the student's progress.

9. An apparatus that creates a presentation, comprising:
(a) a processor;
(b) a memory that stores information under the control of the processor;
(c) logic that receives indicia representative of a store goal, the indicia identifying training that is associated with the store goal, the store goal corresponding to a student being trained in an aspect of inventory administration for a store;
(d) logic that integrates retail information that provides assistance with achieving the store goal; and
(e) logic that monitors progress of the student toward the store goal and provides feedback that assists the student in accomplishing the store goal,
wherein advertising information is integrated into the presentation.

10. An apparatus that creates a presentation, comprising:
(a) a processor;
(b) a memory that stores information under the control of the processor;
(c) logic that receives indicia representative of a store goal, the indicia identifying training that is associated with the store goal, the store goal corresponding to a student being trained in an aspect of inventory administration for a store;
(d) logic that integrates retail information that provides assistance with achieving the store goal; and
(e) logic that monitors progress of the student toward the store goal and provides feedback that assists the student in accomplishing the store goal,
wherein inventory control is integrated into the presentation.

11. An apparatus that creates a presentation, comprising:
(a) a processor;
(b) a memory that stores information under the control of the processor;
(c) logic that receives indicia representative of a store goal, the indicia identifying training that is associated with the store goal, the store goal corresponding to a student being trained in an aspect of inventory administration for a store;
(d) logic that integrates retail information that provides assistance with achieving the store goal; and
(e) logic that monitors progress of the student toward the store goal and provides feedback that assists the student in accomplishing the store goal,
wherein pricing strategy is integrated into the presentation.

12. An apparatus that creates a presentation, comprising:
(a) a processor;
(b) a memory that stores information under the control of the processor;
(c) logic that receives indicia representative of a store goal, the indicia identifying training that is associated with the store goal, the store goal corresponding to a student being trained in an aspect of inventory administration for a store;
(d) logic that integrates retail information that provides assistance with achieving the store goal; and
(e) logic that monitors progress of the student toward the store goal and provides feedback that assists the student in accomplishing the store goal,
wherein return on revenue is integrated into the presentation.

13. An apparatus that creates a presentation, comprising:
(a) a processor;
(b) a memory that stores information under the control of the processor;
(c) logic that receives indicia representative of a store goal, the indicia identifying training that is associated with the store goal, the store goal corresponding to a student being trained in an aspect of inventory administration for a store;
(d) logic that integrates retail information that provides assistance with achieving the store goal; and
(e) logic that monitors progress of the student toward the store goal and provides feedback that assists the student in accomplishing the store goal,
wherein markdown is integrated into the presentation.

14. An apparatus that creates a presentation, comprising:
(a) a processor;
(b) a memory that stores information under the control of the processor;

(c) logic that receives indicia representative of a store goal, the indicia identifying training that is associated with the store goal, the store goal corresponding to a student being trained in an aspect of inventory administration for a store;
(d) logic that integrates retail information that provides assistance with achieving the store goal; and
(e) logic that monitors progress of the student toward the store goal and provides feedback that assists the student in accomplishing the store goal,
wherein stocking is integrated into the presentation.

15. An apparatus that creates a presentation, comprising:
(a) a processor;
(b) a memory that stores information under the control of the processor;
(c) logic that receives indicia representative of a store goal, the indicia identifying training that is associated with the store goal, the store goal corresponding to a student being trained in an aspect of inventory administration for a store;
(d) logic that integrates retail information that provides assistance with achieving the store goal; and
(e) logic that monitors progress of the student toward the store goal and provides feedback that assists the student in accomplishing the store goal,
wherein assortment strategy is integrated into the presentation.

16. An apparatus that creates a presentation, comprising:
(a) a processor;
(b) a memory that stores information under the control of the processor;
(c) logic that receives indicia representative of a store goal, the indicia identifying training that is associated with the store goal, the store goal corresponding to a student being trained in an aspect of inventory administration for a store;
(d) logic that integrates retail information that provides assistance with achieving the store goal; and
(e) logic that monitors progress of the student toward the store goal and provides feedback that assists the student in accomplishing the store goal,
wherein the apparatus includes logic that adjusts an example based on the student's progress.

17. A computer-readable medium for creating a presentation and having computer-executable instructions for performing the steps comprising:
(a) receiving information indicative of a goal, the information identifying training that is associated with the goal, the goal corresponding to a student being trained in an aspect of inventory administration for a store;
(b) integrating information that motivates accomplishment of the goal;
(c) evaluating the progress toward the goal and providing feedback that further motivates accomplishment of the goal; and
(d) linking information that motivates accomplishment of the goal to fee presentation.

18. A computer-readable medium for creating a presentation and having computer-executable instructions for performing the steps comprising:
(a) receiving information indicative of a goal, the information identifying training that is associated with the goal, the goal corresponding to a student being trained in an aspect of inventory administration for a store;
(b) integrating information that motivates accomplishment of the goal; and
(c) evaluating the progress toward the goal and providing feedback that further motivates accomplishment of the goal,
wherein the information includes electronic mail information.

19. A computer-readable medium for creating a presentation and having computer-executable instructions for performing the steps comprising:
(a) receiving information indicative of a goal, the information identifying training that is associated with the goal, the goal corresponding to a student being trained in an aspect of inventory administration for a store;
(b) integrating information that motivates accomplishment of the goal; and
(c) evaluating the progress toward the goal and providing feedback that further motivates accomplishment of the goal,
wherein the information includes simulation information.

20. A computer-readable medium for creating a presentation and having computer-executable instructions for performing the steps comprising:
(a) receiving information indicative of a goal, the information identifying training that is associated with the goal, the goal corresponding to a student being trained in an aspect of inventory administration for a store;
(b) integrating information that motivates accomplishment of the goal; and
(c) evaluating the progress toward the goal and providing feedback that further motivates accomplishment of the goal,
wherein the information includes time-synchronized multimedia information.

21. A computer-readable medium for creating a presentation and having computer-executable instructions for performing the steps comprising:
(a) receiving information indicative of a goal, the information identifying training that is associated with the goal, the goal corresponding to a student being trained in an aspect of inventory administration for a store;
(b) integrating information that motivates accomplishment of the goal; and
(c) evaluating the progress toward the goal and providing feedback that further motivates accomplishment of the goal,
wherein the information includes video conference information.

22. A computer-readable medium for creating a presentation and having computer-executable instructions for performing the steps comprising:
(a) receiving information indicative of a goal, the information identifying training that is associated with the goal, the goal corresponding to a student being trained in an aspect of inventory administration for a store;
(b) integrating information that motivates accomplishment of the goal; and
(c) evaluating the progress toward the goal and providing feedback that further motivates accomplishment of the goal,
wherein the information emanates from the Internet.

23. A computer-readable medium for creating a presentation and having computer-executable instructions for performing the steps comprising:
(a) receiving information indicative of a goal, the information identifying training that is associated with the goal, the goal corresponding to a student being trained in an aspect of inventory administration for a store;

(b) integrating information that motivates accomplishment of the goal; and
(c) evaluating the progress toward the goal and providing feedback that further motivates accomplishment of the goal,
wherein the information includes telephony information.

24. A computer-readable medium for creating a presentation and having computer-executable instructions for performing the steps comprising:
   (a) receiving information indicative of a goal, the information identifying training that is associated with the goal, the goal corresponding to a student being trained in an aspect of inventory administration for a store;
   (b) integrating information that motivates accomplishment of the goal; and
   (c) evaluating the progress toward the goal and providing feedback that further motivates accomplishment of the goal,
wherein the information includes chat room information.

25. An apparatus that creates a presentation, comprising;
   (a) a processor;
   (b) a memory that stores information under the control of the processor;
   (c) logic that receives information indicative of a goal, the information identifying training that is associated with the goal, the goal corresponding to a student being trained in an aspect of inventory administration for a store;
   (d) logic that integrates information that motivates accomplishment of the goal; and
   (e) logic that evaluates the progress toward the goal and provides feedback that further motivates accomplishment of the goal,
wherein the information includes video information.

26. An apparatus that creates a presentation, comprising;
   (a) a processor;
   (b) a memory that stores information under the control of the processor;
   (c) logic that receives information indicative of a goal, the information identifying training that is associated with the goal, the goal corresponding to a student being trained in an aspect of inventory administration for a store;
   (d) logic that integrates information that motivates accomplishment of the goal; and
   (e) logic that evaluates the progress toward the goal and provides feedback that further motivates accomplishment of the goal,
wherein the information includes electronic mail information.

27. An apparatus that creates a presentation, comprising;
   (a) a processor;
   (b) a memory that stores information under the control of the processor;
   (c) logic that receives information indicative of a goal, the information identifying training that is associated with the goal, the goal corresponding to a student being trained in an aspect of inventory administration for a store;
   (d) logic that integrates information that motivates accomplishment of the goal; and
   (e) logic that evaluates the progress toward the goal and provides feedback that further motivates accomplishment of the goal,
wherein the information includes time-synchronized multimedia information.

28. An apparatus that creates a presentation, comprising;
   (a) a processor;
   (b) a memory that stores information under the control of the processor;
   (c) logic that receives information indicative of a goal, the information identifying training that is associated with the goal, the goal corresponding to a student being trained in an aspect of inventory administration for a store;
   (d) logic that integrates information that motivates accomplishment of the goal; and
   (e) logic that evaluates the progress toward the goal and provides feedback that further motivates accomplishment of the goal,
wherein the information includes video conference information.

29. An apparatus that creates a presentation, comprising;
   (a) a processor;
   (b) a memory that stores information under the control of the processor;
   (c) logic that receives information indicative of a goal, the information identifying training that is associated with the goal, the goal corresponding to a student being trained in an aspect of inventory administration for a store;
   (d) logic that integrates information that motivates accomplishment of the goal; and
   (e) logic that evaluates the progress toward the goal and provides feedback that further motivates accomplishment of the goal,
wherein the information emanates from the Internet.

30. An apparatus that creates a presentation, comprising;
   (a) a processor;
   (b) a memory that stores information under the control of the processor;
   (c) logic that receives information indicative of a goal, the information identifying training that is associated with the goal, the goal corresponding to a student being trained in an aspect of inventory administration for a store;
   (d) logic that integrates information that motivates accomplishment of the goal; and
   (e) logic that evaluates the progress toward the goal and provides feedback that further motivates accomplishment of the goal,
wherein the information include telephone information.

31. An apparatus that creates a presentation, comprising:
   (a) a processor;
   (b) a memory that stores information under the control of the processor;
   (c) logic that receives information indicative of a goal, the information identifying training that is associated with the goal, the goal corresponding to a student being trained in an aspect of inventory administration for a store;
   (d) logic that integrates information that motivates accomplishment of the goal; and
   (e) logic that evaluates the progress toward the goal and provides feedback that further motivates accomplishment of the goal,
wherein the information includes chat room information.

32. A computer-readable medium for creating a presentation and having computer-executable instructions for performing the steps comprising:
   (a) presenting information indicative of a goal, the information identifying training that is associated with the goal, the goal corresponding to a student being trained in an aspect of inventory administration for a store;

(b) integrating information that motivates accomplishment of the goal;

(c) querying a user for answers to one or more questions based on one or more learning objectives of the presentation using a simulated human conversation;

(d) monitoring progress toward the goal and providing feedback that further motivates accomplishment of the goal; and (e) indexing media information to enhance the integration of fee media information into the presentation.

33. A computer-readable medium for creating a presentation and having computer-executable instructions for performing the steps comprising:

(a) presenting information indicative of a goal, the information identifying training that is associated with the goal, the goal corresponding to a student being trained in an aspect of inventory administration for a store;

(b) integrating information that motivates accomplishment of the goal;

(c) querying a user for answers to one or more questions based on one or more learning objectives of the presentation using a simulated human conversation;

(d) monitoring progress toward the goal and providing feedback that further motivates accomplishment of the goal; and (e) synchronizing the media information with other information in the presentation utilizing time and the indexing.

34. A computer-readable medium for creating a presentation and having computer-executable instructions for performing the steps comprising:

(f) presenting information indicative of a goal, the information identifying training that is associated with the goal, the goal corresponding to a student being trained in an aspect of inventory administration for a store;

(a) integrating information that motivates accomplishment of the goal;

(b) querying a user for answers to one or more questions based on one or more learning objectives of the presentation using a simulated human conversation; and (c) monitoring progress toward the goal and providing feedback that further motivates accomplishment of the goal, wherein the media information comprises telephone information.

35. A computer-readable medium for creating a presentation and having computer-executable instructions for performing the steps comprising:

(a) presenting information indicative of a goal, the information identifying training that is associated with the goal, the goal corresponding to a student being trained in an aspect of inventory administration for a store;

(b) integrating information that motivates accomplishment of the goal;

(c) querying a user for answers to one or more questions based on one or more learning objectives of the presentation using a simulated human conversation; and (d) monitoring progress toward the goal and providing feedback that further motivates accomplishment of the goal, wherein the media information comprises video information.

36. A computer-readable medium for creating a presentation and having computer-executable instructions for performing the steps comprising:

(a) presenting information indicative of a goal, the information identifying training that is associated with the goal, the goal corresponding to a student being trained in an aspect of inventory administration for a store;

(b) integrating information that motivates accomplishment of the goal;

(c) querying a user for answers to one or more questions based on one or more learning objectives of the presentation using a simulated human conversation; and (d) monitoring progress toward the goal and providing feedback that further motivates accomplishment of the goal, wherein the media information comprises audio information.

37. A computer-readable medium for creating a presentation and having computer-executable instructions for performing the steps comprising:

(a) presenting information indicative of a goal, the information identifying training that is associated with the goal, the goal corresponding to a student being trained in an aspect of inventory administration for a store;

(b) integrating information that motivates accomplishment of the goal;

(c) querying a user for answers to one or more questions based on one or more learning objectives of the presentation using a simulated human conversation; and (d) monitoring progress toward the goal and providing feedback that further motivates accomplishment of the goal, wherein the media information comprises dialog information.

38. A computer-readable medium for creating a presentation and having computer-executable instructions for performing the steps comprising:

(a) presenting information indicative of a goal, the information identifying training that is associated with the goal, the goal corresponding to a student being trained in an aspect of inventory administration for a store;

(b) integrating information that motivates accomplishment of the goal;

(c) querying a user for answers to one or more questions based on one or more learning objectives of the presentation using a simulated human conversation; and (d) monitoring progress toward the goal and providing feedback that further motivates accomplishment of the goal, wherein the media information comprises Internet information.

39. A computer-readable medium for creating a presentation and having computer-executable instructions for performing the steps comprising:

(a) presenting information indicative of a goal, the information identifying training that is associated with the goal, the goal corresponding to a student being trained in an aspect of inventory administration for a store;

(b) integrating information that motivates accomplishment of the goal;

(c) querying a user for answers to one or more questions based on one or more learning objectives of the presentation using a simulated human conversation; and (d) monitoring progress toward the goal and providing feedback that further motivates accomplishment of the goal, wherein the media information comprises text information.

40. An apparatus that creates a presentation, comprising;
(a) a processor;
(b) a memory that stores information under the control of the processor;
(c) logic that presents information indicative of a goal, the information identifying training that is associated with the goal, the goal corresponding to a student being trained in an aspect of inventory administration for a store;
(d) logic that integrates information that motivates accomplishment of the goal;
(e) logic that queries a user for answers to one or more questions based on more or more learning objectives of the presentation using a simulated human conversation;
(f) logic that monitors progress toward the goal and provides feedback that further motivates accomplishment of the goal; and
(g) logic that indexes media information to enhance fee integration of the media information into the presentation.

41. An apparatus that creates a presentation, comprising;
(a) a processor;
(b) a memory that stores information under the control of the processor;
(c) logic that presents information indicative of a goal, the information identifying training that is associated with the goal, the goal corresponding to a student being trained in an aspect of inventory administration for a store;
(d) logic that integrates information that motivates accomplishment of the goal;
(e) logic that queries a user for answers to one or more questions based on more or more learning objectives of the presentation using a simulated human conversation;
(f) logic that monitors progress toward the goal and provides feedback that further motivates accomplishment of the goal; and
(g) logic that synchronizes the media information with offer information in the presentation utilizing time and the indexing.

42. An apparatus that creates a presentation, comprising;
(a) a processor;
(b) a memory that stores information under the control of the processor;
(c) logic that presents information indicative of a goal, the information identifying training that is associated with the goal, the goal corresponding to a student being trained in an aspect of inventory administration for a store;
(d) logic that integrates information that motivates accomplishment of the goal;
(e) logic that queries a user for answers to one or more questions based on more or more learning objectives of the presentation using a simulated human conversation; and
(f) logic that monitors progress toward the goal and provides feedback that further motivates accomplishment of the goal;
wherein the media information comprises telephone information.

43. An apparatus that creates a presentation, comprising;
(a) a processor;
(b) a memory that stores information under the control of the processor;
(c) logic that presents information indicative of a goal, the information identifying training that is associated with the goal, the goal corresponding to a student being trained in an aspect of inventory administration for a store;
(d) logic that integrates information that motivates accomplishment of the goal; and
(e) logic that queries a user for answers to one or more questions based on more or more learning objectives of the presentation using a simulated human conversation;
wherein the media information comprises video information.

44. An apparatus that creates a presentation, comprising;
(a) a processor;
(b) a memory that stores information under the control of the processor;
(c) logic that presents information indicative of a goal, the information identifying training that is associated with the goal, the goal corresponding to a student being trained in an aspect of inventory administration for a store;
(d) logic that integrates information that motivates accomplishment of the goal; and
(e) logic that queries a user for answers to one or more questions based on more or more learning objectives of the presentation using a simulated human conversation;
wherein the media information comprises audio information.

45. An apparatus that creates a presentation, comprising;
(a) a processor;
(b) a memory that stores information under the control of the processor;
(c) logic that presents information indicative of a goal, the information identifying training that is associated with the goal, the goal corresponding to a student being trained in an aspect of inventory administration for a store;
(d) logic that integrates information that motivates accomplishment of the goal; and
(e) logic that queries a user for answers to one or more questions based on more or more learning objectives of the presentation using a simulated human conversation;
wherein the media information comprises dialog information.

46. An apparatus that creates a presentation, comprising;
(a) a processor;
(b) a memory that stores information under the control of the processor;
(c) logic that presents information indicative of a goal, the information identifying training that is associated with the goal, the goal corresponding to a student being trained in an aspect of inventory administration for a store;
(d) logic that integrates information that motivates accomplishment of the goal; and
(e) logic that queries a user for answers to one or more questions based on more or more learning objectives of the presentation using a simulated human conversation;
wherein the media information comprises Internet information.

47. An apparatus that creates a presentation, comprising;
(a) a processor;
(b) a memory that stores information under the control of the processor;
(c) logic that presents information indicative of a goal, the information identifying training that is associated with the goal, the goal corresponding to a student being trained in an aspect of inventory administration for a store;

(d) logic that integrates information that motivates accomplishment of the goal; and (e) logic that queries a user for answers to one or more questions based on more or more learning objectives of the presentation using a simulated human conversation; wherein the media information comprises text information.

48. A computer-readable medium for creating a presentation and having computer-executable instructions for performing the steps comprising:

(a) presenting information indicative of a goal, the information identifying training that is associated with the goal, the goal corresponding to a student being trained in an aspect of inventory administration for a store;

(b) integrating information that motivates accomplishment of the goal;

(c) monitoring progress toward the goal and providing feedback that further motivates accomplishment of the goal; and (d) linking information feat motivates accomplishment of the goal to fee presentation.

49. A computer-readable medium for creating a presentation and having computer-executable instructions for performing the steps comprising:

(a) presenting information indicative of a goal, the information identifying training that is associated with the goal, the goal corresponding to a student being trained in an aspect of inventory administration for a store;

(b) integrating information that motivates accomplishment of the goal;

(c) monitoring progress toward the goal and providing feedback that further motivates accomplishment of the goal; and (d) monitoring user interactions to determine progress toward the goal.

50. A computer-readable medium for creating a presentation and having computer-executable instructions for performing the steps comprising:

(a) presenting information indicative of a goal, the information identifying training that is associated with the goal, the goal corresponding to a student being trained in an aspect of inventory administration for a store;

(b) integrating information that motivates accomplishment of the goal;

(c) monitoring progress toward the goal and providing feedback that further motivates accomplishment of the goal; and (d) organizing objects according to relevancy to progress toward the goal.

51. A computer-readable medium for creating a presentation and having computer-executable instructions for performing the steps comprising:

(a) presenting information indicative of a goal, the information identifying training that is associated with the goal, the goal corresponding to a student being trained in an aspect of inventory administration for a store;

(b) integrating information that motivates accomplishment of the goal;

(c) monitoring progress toward the goal and providing feedback that further motivates accomplishment of the goal; and (d) calculating a quantitative degree of correctness to determine the progress toward the goal.

52. A computer-readable medium for creating a presentation and having computer-executable instructions for performing the steps comprising:

(a) presenting information indicative of a goal, the information identifying training that is associated with the goal, the goal corresponding to a student being trained in an aspect of inventory administration for a store;

(b) integrating information that motivates accomplishment of the goal;

(c) monitoring progress toward the goal and providing feedback that further motivates accomplishment of the goal; and (d) comprising organizing feedback categorically.

53. A computer-readable medium for creating a presentation and having computer-executable instructions for performing the steps comprising:

(a) presenting information indicative of a goal, the information identifying training that is associated with the goal, the goal corresponding to a student being trained in an aspect of inventory administration for a store;

(b) integrating information that motivates accomplishment of the goal; and (c) monitoring progress toward the goal and providing feedback that further motivates accomplishment of the goal, wherein the feedback is based on a dynamic orientation factor.

54. A computer-readable medium for creating a presentation and having computer-executable instructions for performing the steps comprising:

(a) presenting information indicative of a goal, the information identifying training that is associated with the goal, the goal corresponding to a student being trained in an aspect of inventory administration for a store;

(b) integrating information that motivates accomplishment of the goal; and (c) monitoring progress toward the goal and providing feedback that further motivates accomplishment of the goal, wherein the feedback is based on past information presented.

55. A computer-readable medium for creating a presentation and having computer-executable instructions for performing the steps comprising:

(a) presenting information indicative of a goal, the information identifying training that is associated with the goal, the goal corresponding to a student being trained in an aspect of inventory administration for a store;

(b) integrating information that motivates accomplishment of the goal;

(c) monitoring progress toward the goal and providing feedback that further motivates accomplishment of the goal; and (d) concluding the presentation when the goal is achieved.

56. An apparatus that creates a presentation, comprising;

(a) a processor;

(b) a memory that stores information under the control of the processor;

(c) logic that presents information indicative of a goal, the information identifying training that is associated with the goal, the goal corresponding to a student being trained in an aspect of inventory administration for a store;

(d) logic that integrates information that motivates accomplishment of the goal;

(e) monitoring progress toward the goal and providing feedback that further motivates accomplishment of the goal; and (f) logic that links information feat motivates accomplishment of fee goal to fee presentation.

57. An apparatus that creates a presentation, comprising;
(a) a processor;
(b) a memory that stores information under the control of the processor;
(c) logic that presents information indicative of a goal, the information identifying training that is associated with the goal, the goal corresponding to a student being trained in an aspect of inventory administration for a store;
(d) logic that integrates information that motivates accomplishment of the goal;
(e) monitoring progress toward the goal and providing feedback that further motivates accomplishment of the goal; and
(f) logic that monitors user interactions to determine progress toward the goal.

58. An apparatus that creates a presentation, comprising;
(a) a processor;
(b) a memory that stores information under the control of the processor;
(c) logic that presents information indicative of a goal, the information identifying training that is associated with the goal, the goal corresponding to a student being trained in an aspect of inventory administration for a store;
(d) logic that integrates information that motivates accomplishment of the goal;
(e) monitoring progress toward the goal and providing feedback that further motivates accomplishment of the goal; and
(f) logic that organizes objects according to relevancy to progress toward the goal.

59. An apparatus that creates a presentation, comprising;
(g) a processor;
(h) a memory that stores information under the control of the processor;
(i) logic that presents information indicative of a goal, the information identifying training that is associated with the goal, the goal corresponding to a student being trained in an aspect of inventory administration for a store;
(j) logic that integrates information that motivates accomplishment of the goal;
(k) monitoring progress toward the goal and providing feedback that further motivates accomplishment of the goal; and
(l) logic that calculates a quantitative degree of correctness to determine the progress toward the goal.

60. An apparatus that creates a presentation, comprising;
(a) a processor;
(b) a memory that stores information under the control of the processor;
(c) logic that presents information indicative of a goal, the information identifying training that is associated with the goal, the goal corresponding to a student being trained in an aspect of inventory administration for a store;
(d) logic that integrates information that motivates accomplishment of the goal;
(e) monitoring progress toward the goal and providing feedback that further motivates accomplishment of the goal; and
(f) logic that organizes feedback categorically.

61. An apparatus that creates a presentation, comprising;
(a) a processor;
(b) a memory that stores information under the control of the processor;
(c) logic that presents information indicative of a goal, the information identifying training that is associated with the goal, the goal corresponding to a student being trained in an aspect of inventory administration for a store;
(d) logic that integrates information that motivates accomplishment of the goal; and
(e) monitoring progress toward the goal and providing feedback that further motivates accomplishment of the goal;
wherein the feedback is based on a dynamic orientation factor.

62. An apparatus that creates a presentation, comprising;
(a) a processor;
(b) a memory that stores information under the control of the processor;
(c) logic that presents information indicative of a goal, the information identifying training that is associated with the goal, the goal corresponding to a student being trained in an aspect of inventory administration for a store;
(d) logic that integrates information that motivates accomplishment of the goal; and
(e) monitoring progress toward the goal and providing feedback that further motivates accomplishment of the goal;
wherein the feedback is based on past information presented.

63. An apparatus that creates a presentation, comprising;
(a) a processor;
(b) a memory that stores information under the control of the processor;
(c) logic that presents information indicative of a goal, the information identifying training that is associated with the goal, the goal corresponding to a student being trained in an aspect of inventory administration for a store;
(d) logic that integrates information that motivates accomplishment of the goal; and
(e) monitoring progress toward the goal and providing feedback that further motivates accomplishment of the goal;
(f) logic that completes the presentation when the goal is achieved.

64. A computer-readable medium for creating a presentation and having computer-executable instructions for performing the steps comprising:
(a) receiving indicia representative of a goal, the indicia identifying training that is associated with the store goal, the goal corresponding to a student being trained in an aspect of inventory administration for a store;
(b) integrating examples into the presentation to provide assistance with achieving the goal;
(c) monitoring progress of the student toward the goal;
(d) providing feedback that further assists the student in accomplishing the goal;
(e) providing information to assist with a next step in achieving the goal; and
(f) linking information feat motivates accomplishment of the goal to fee presentation.

65. A computer-readable medium for creating a presentation and having computer-executable instructions for performing the steps comprising:
(a) receiving indicia representative of a goal, the indicia identifying training that is associated with the store goal, the goal corresponding to a student being trained in an aspect of inventory administration for a store;

(b) integrating examples into the presentation to provide assistance with achieving the goal;
(c) monitoring progress of the student toward the goal;
(d) providing feedback that further assists the student in accomplishing the goal;
(e) providing information to assist with a next step in achieving the goal; and
(f) providing information that explains why the next step should be done.

66. A computer-readable medium for creating a presentation and having computer-executable instructions for performing the steps comprising:
(a) receiving indicia representative of a goal, the indicia identifying training that is associated with the store goal, the goal corresponding to a student being trained in an aspect of inventory administration for a store;
(b) integrating examples into the presentation to provide assistance with achieving the goal;
(c) monitoring progress of the student toward the goal;
(d) providing feedback that further assists the student in accomplishing the goal;
(e) providing information to assist with a next step in achieving the goal; and
(f) providing information that explains how the next step should be done.

67. A computer-readable medium for creating a presentation and having computer-executable instructions for performing the steps comprising:
(a) receiving indicia representative of a goal, the indicia identifying training that is associated with the store goal, the goal corresponding to a student being trained in an aspect of inventory administration for a store;
(b) integrating examples into the presentation to provide assistance with achieving the goal;
(c) monitoring progress of the student toward the goal;
(d) providing feedback that further assists the student in accomplishing the goal;
(e) providing information to assist with a next step in achieving the goal; and
(f) utilizing video clips as feedback.

68. A computer-readable medium for creating a presentation and having computer-executable instructions for performing the steps comprising:
(a) receiving indicia representative of a goal, the indicia identifying training that is associated with the store goal, the goal corresponding to a student being trained in an aspect of inventory administration for a store;
(b) integrating examples into the presentation to provide assistance with achieving the goal;
(c) monitoring progress of the student toward the goal;
(d) providing feedback that further assists the student in accomplishing the goal;
(e) providing information to assist with a next step in achieving the goal; and
(f) organizing feedback categorically.

69. A computer-readable medium for creating a presentation and having computer-executable instructions for performing the steps comprising:
(a) receiving indicia representative of a goal, the indicia identifying training that is associated with the store goal, the goal corresponding to a student being trained in an aspect of inventory administration for a store;
(b) integrating examples into the presentation to provide assistance with achieving the goal;
(c) monitoring progress of the student toward the goal;
(d) providing feedback that further assists the student in accomplishing the goal; and
(e) providing information to assist with a next step in achieving the goal;
wherein the feedback is based on a dynamic orientation factor.

70. A computer-readable medium for creating a presentation and having computer-executable instructions for performing the steps comprising:
(a) receiving indicia representative of a goal, the indicia identifying training that is associated with the store goal, the goal corresponding to a student being trained in an aspect of inventory administration for a store;
(b) integrating examples into the presentation to provide assistance with achieving the goal;
(c) monitoring progress of the student toward the goal;
(d) providing feedback that further assists the student in accomplishing the goal; and
(e) providing information to assist with a next step in achieving the goal;
wherein the feedback is based on past information presented.

71. A computer-readable medium for creating a presentation and having computer-executable instructions for performing the steps comprising:
(a) receiving indicia representative of a goal, the indicia identifying training that is associated with the store goal, the goal corresponding to a student being trained in an aspect of inventory administration for a store;
(b) integrating examples into the presentation to provide assistance with achieving the goal;
(c) monitoring progress of the student toward the goal;
(d) providing feedback that further assists the student in accomplishing the goal;
(e) providing information to assist with a next step in achieving the goal; and
providing information based on the presentation context.

72. An apparatus that creates a presentation, comprising;
(a) a processor;
(b) a memory that stores information under the control of the processor;
(c) logic that integrates examples into the presentation to provide assistance with achieving the goal, the examples providing training that is associated with the goal, the goal corresponding to a student being trained in an aspect of inventory administration for a store;
(d) logic that monitors progress of the student toward the goal and provides feedback that further provides the student assistance in accomplishing the goal;
(e) logic that provides information to assist with a next step in achieving the goal; and
(f) logic that links information feat motivates accomplishment of the goal to the presentation.

73. An apparatus that creates a presentation, comprising;
(a) a processor;
(b) a memory that stores information under the control of the processor;
(c) logic that integrates examples into the presentation to provide assistance with achieving the goal, the examples providing training that is associated with the goal, the goal corresponding to a student being trained in an aspect of inventory administration for a store;
(d) logic that monitors progress of the student toward the goal and provides feedback that further provides the student assistance in accomplishing the goal;
(e) logic that provides information to assist with a next step in achieving the goal; and
(f) logic that explains why the next step should be done.

74. An apparatus that creates a presentation, comprising;
(a) a processor;
(b) a memory that stores information under the control of the processor;
(c) logic that integrates examples into the presentation to provide assistance with achieving the goal, the examples providing training that is associated with the goal, the goal corresponding to a student being trained in an aspect of inventory administration for a store;
(d) logic that monitors progress of the student toward the goal and provides feedback that further provides the student assistance in accomplishing the goal;
(e) logic that provides information to assist with a next step in achieving the goal; and
(f) logic that explains how the next step should be done.

75. An apparatus that creates a presentation, comprising;
(a) a processor;
(b) a memory that stores information under the control of the processor;
(c) logic that integrates examples into the presentation to provide assistance with achieving the goal, the examples providing training that is associated with the goal, the goal corresponding to a student being trained in an aspect of inventory administration for a store;
(d) logic that monitors progress of the student toward the goal and provides feedback that further provides the student assistance in accomplishing the goal;
(e) logic that provides information to assist with a next step in achieving the goal; and
(f) a code segment that utilizes video clips as feedback.

76. An apparatus that creates a presentation, comprising;
(a) a processor;
(b) a memory that stores information under the control of the processor;
(c) logic that integrates examples into the presentation to provide assistance with achieving the goal, the examples providing training that is associated with the goal, the goal corresponding to a student being trained in an aspect of inventory administration for a store;
(d) logic that monitors progress of the student toward the goal and provides feedback that further provides the student assistance in accomplishing the goal;
(e) logic that provides information to assist with a next step in achieving the goal; and
(f) logic that organizes feedback categorically.

77. An apparatus that creates a presentation, comprising;
(a) a processor;
(b) a memory that stores information under the control of the processor;
(c) logic that integrates examples into the presentation to provide assistance with achieving the goal, the examples providing training that is associated with the goal, the goal corresponding to a student being trained in an aspect of inventory administration for a store;
(d) logic that monitors progress of the student toward the goal and provides feedback that further provides the student assistance in accomplishing the goal and;
(e) logic that provides information to assist with a next step in achieving the goal,
wherein the feedback is based on a dynamic orientation factor.

78. An apparatus that creates a presentation, comprising;
(a) a processor;
(b) a memory that stores information under the control of the processor;
(c) logic that integrates examples into the presentation to provide assistance with achieving the goal, the examples providing training that is associated with the goal, the goal corresponding to a student being trained in an aspect of inventory administration for a store;
(d) logic that monitors progress of the student toward the goal and provides feedback that further provides the student assistance in accomplishing the goal and;
(e) logic that provides information to assist with a next step in achieving the goal,
wherein the feedback is based on past information presented.

79. An apparatus that creates a presentation, comprising;
(a) a processor;
(b) a memory that stores information under the control of the processor;
(c) logic that integrates examples into the presentation to provide assistance with achieving the goal, the examples providing training that is associated with the goal, the goal corresponding to a student being trained in an aspect of inventory administration for a store;
(d) logic that monitors progress of the student toward the goal and provides feedback that further provides the student assistance in accomplishing the goal;
(e) logic that provides information to assist with a next step in achieving the goal; and
(f) logic that provides information based on the presentation context.

* * * * *